(12) United States Patent
Ikeda et al.

(10) Patent No.: US 10,146,167 B2
(45) Date of Patent: Dec. 4, 2018

(54) SHAFT MEMBER, END MEMBER, PHOTORECEPTOR DRUM UNIT, DEVELOPING ROLLER UNIT, AND PROCESS CARTRIDGE

(71) Applicant: Mitsubishi Chemical Corporation, Chiyoda-ku (JP)

(72) Inventors: Shuichi Ikeda, Kanagawa (JP); Yohei Matsuoka, Kanagawa (JP); Susumu Taguchi, Kanagawa (JP); Shinichi Iijima, Glendale, CA (US)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/371,594

(22) Filed: Dec. 7, 2016

(65) Prior Publication Data

US 2017/0082966 A1 Mar. 23, 2017

Related U.S. Application Data

(63) Continuation of application No. PCT/JP2015/066532, filed on Jun. 8, 2015.

(30) Foreign Application Priority Data

Jun. 9, 2014 (JP) .................. 2014-119070
Aug. 5, 2014 (JP) .................. 2014-159782

(51) Int. Cl.
*G03G 15/00* (2006.01)
*F16C 13/00* (2006.01)
(Continued)

(52) U.S. Cl.
CPC .......... *G03G 15/751* (2013.01); *F16C 13/00* (2013.01); *G03G 15/00* (2013.01);
(Continued)

(58) Field of Classification Search
CPC ...... G03G 15/751; G03G 21/16; G03G 21/18; F16C 13/00
See application file for complete search history.

(56) References Cited

U.S. PATENT DOCUMENTS 4,065,941 A * 1/1978 Aoki ................. F16D 3/207
464/115
5,903,803 A 5/1999 Kawai et al.
(Continued)

FOREIGN PATENT DOCUMENTS

CN 101916055 A 12/2010
CN 103513534 A 1/2014
(Continued)

OTHER PUBLICATIONS

Extended European Search Report dated May 23, 2017 in Paten Application No. 15807316.3.
(Continued)

*Primary Examiner* — Gregory H Curran
(74) *Attorney, Agent, or Firm* — Oblon, McClelland, Maier & Neustadt, L.L.P.

(57) ABSTRACT

An end member which is disposed in an end portion of a columnar rotating body mounted on an image forming apparatus main body, comprises: a tubular bearing member; and a shaft member held by the bearing member, wherein the shaft member includes a rotating shaft which is disposed in the bearing member, and moves in an axial direction, and a rotating force receiving member which is provided with an engagement hook that is disposed in one end portion of the rotating shaft, swings with respect to an axis of the rotating shaft, and is engaged with a driving shaft of the image forming apparatus main body.

16 Claims, 53 Drawing Sheets

(51) Int. Cl.
*G03G 21/16* (2006.01)
*G03G 21/18* (2006.01)
*G03G 15/08* (2006.01)

(52) U.S. Cl.
CPC ......... *G03G 15/0808* (2013.01); *G03G 21/16* (2013.01); *G03G 21/18* (2013.01)

(56) References Cited

U.S. PATENT DOCUMENTS

| | | | |
|---|---|---|---|
| 6,226,478 B1 | 5/2001 | Watanabe et al. | |
| 6,240,266 B1 | 5/2001 | Watanabe et al. | |
| 9,329,517 B2 * | 5/2016 | Morgan | G03G 15/00 |
| 2005/0191092 A1 * | 9/2005 | Toso | G03G 15/757 399/167 |
| 2008/0260428 A1 | 10/2008 | Ueno et al. | |
| 2011/0217073 A1 | 9/2011 | He | |
| 2012/0183331 A1 | 7/2012 | Huang et al. | |
| 2012/0243905 A1 | 9/2012 | Uratani et al. | |
| 2013/0071141 A1 | 3/2013 | Ueno et al. | |
| 2013/0164031 A1 | 6/2013 | Ueno et al. | |
| 2014/0064783 A1 | 3/2014 | Ueno et al. | |
| 2014/0086634 A1 | 3/2014 | Ueno et al. | |
| 2016/0259290 A1 * | 9/2016 | Ikeda | G03G 15/757 |

FOREIGN PATENT DOCUMENTS

| | | |
|---|---|---|
| JP | 7-121088 | 5/1995 |
| JP | 11-52715 A | 2/1999 |
| JP | 2875203 | 3/1999 |
| JP | 2000-214646 A | 8/2000 |
| JP | 2000-338842 A | 12/2000 |
| JP | 2002-116623 A | 4/2002 |
| JP | 2002-235763 A | 8/2002 |
| JP | 2005-157113 A | 6/2005 |
| JP | 2008-170945 A | 7/2008 |
| JP | 2008-233867 A | 10/2008 |
| JP | 2008-233868 | 10/2008 |
| JP | 2009-300516 A | 12/2009 |
| JP | 2010-144881 A | 7/2010 |
| JP | 2011-95604 | 5/2011 |
| JP | 2011-145670 | 7/2011 |

OTHER PUBLICATIONS

International Search Report dated Aug. 25, 2015 in PCT/JP2015/066532, filed on Jun. 8, 2015 ( with English Translation).
Written Opinion dated Aug. 25, 2015 in PCT/JP2015/066532, filed on Jun. 8, 2015.
Technical Disclosure No. 2010-502197 dated Apr. 22, 2010, 18 pages.
Office Action dated Dec. 5, 2017 in Japanese Patent Application No. 2014-159782 (with English language translation).
Japanese Office Action dated Oct. 10, 2017 in Patent Application No. 2014-159782 (with English Translation).

* cited by examiner

Fig. 13A
Fig. 13B
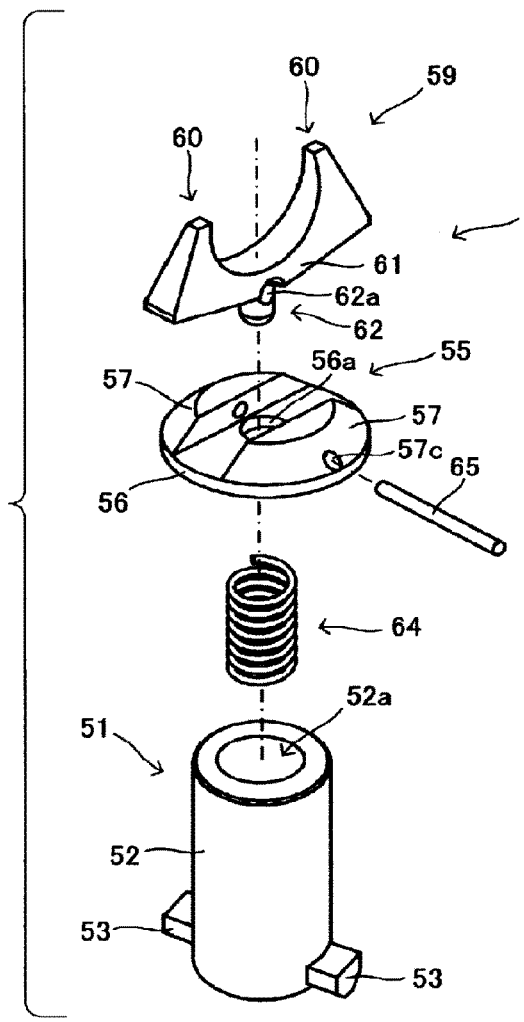
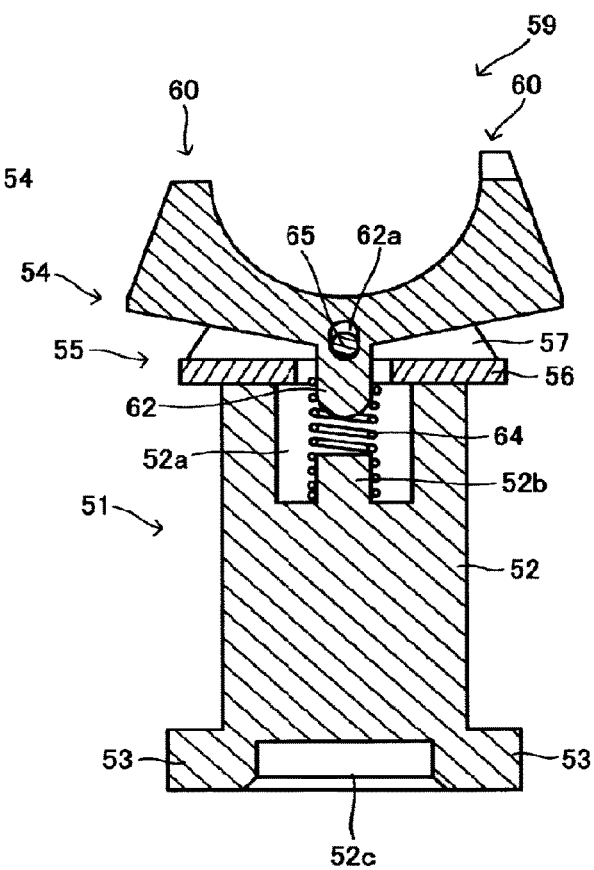

Fig. 31A
Fig. 31B
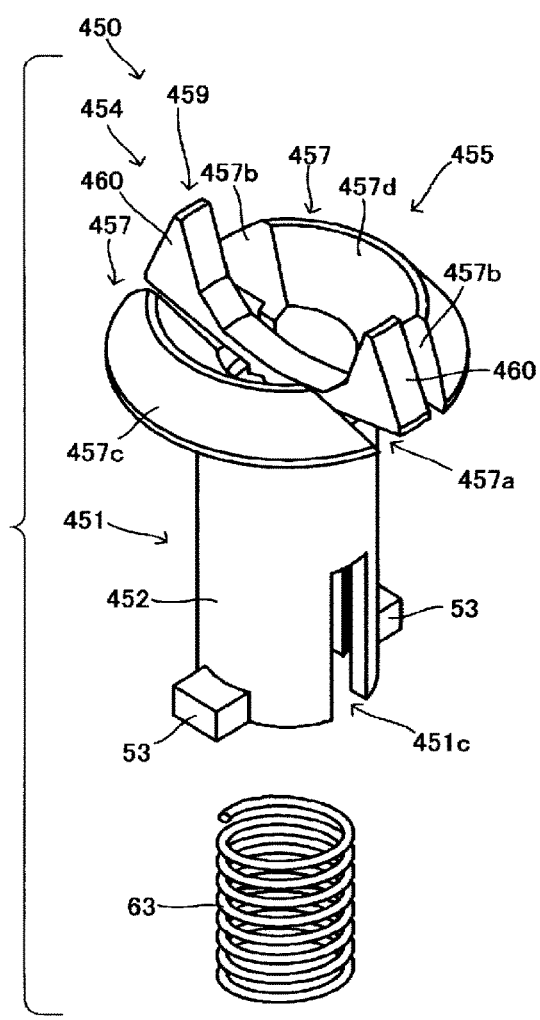
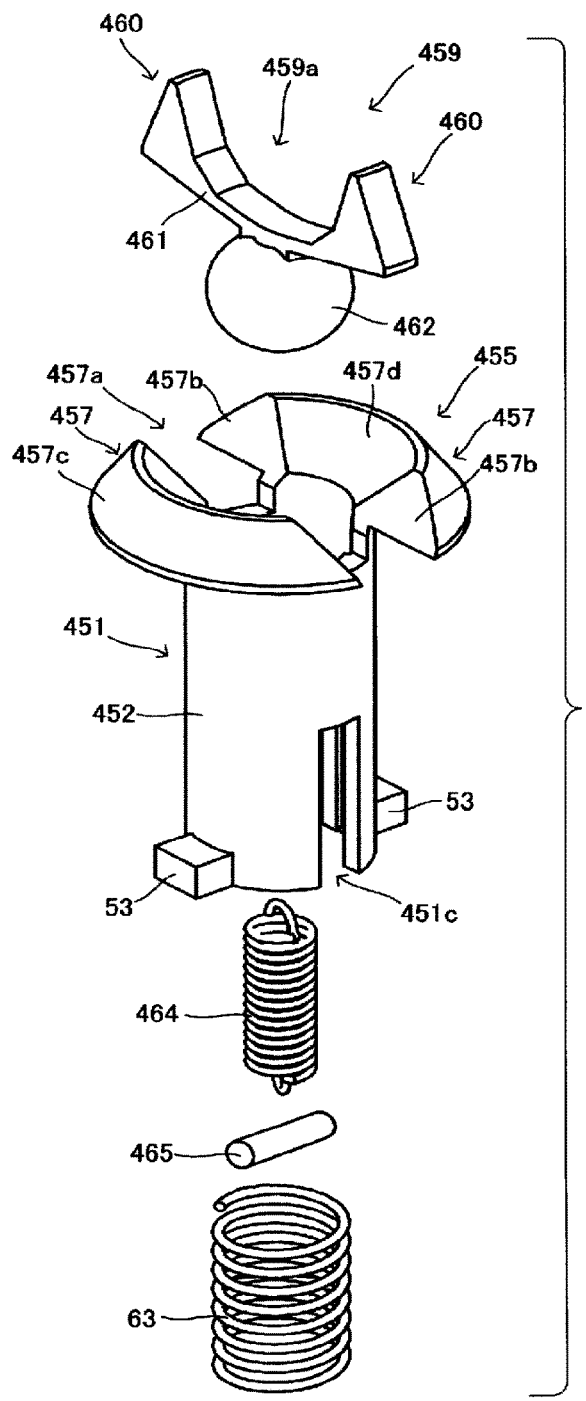

Fig. 38A  Fig. 38B
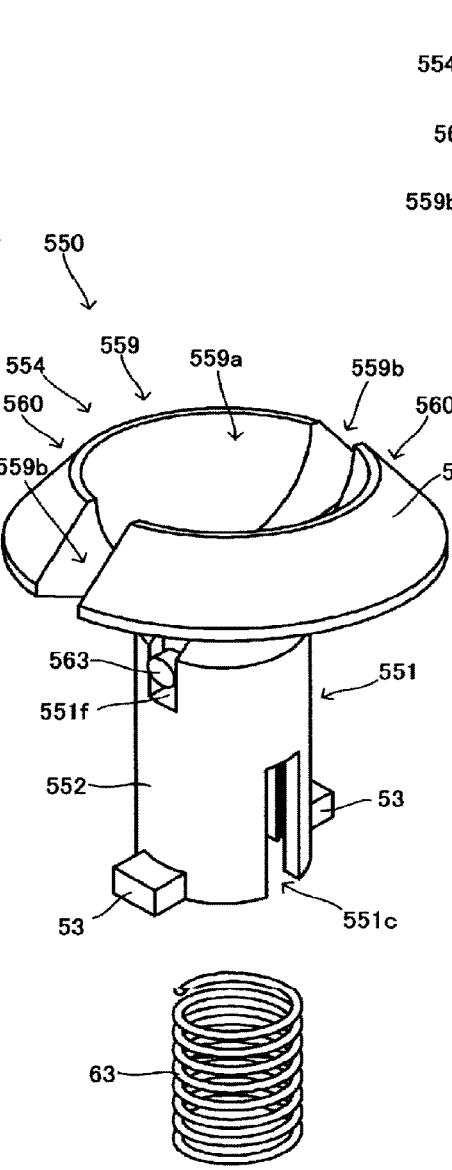
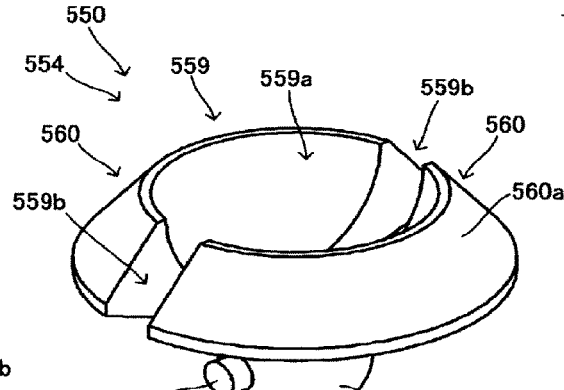
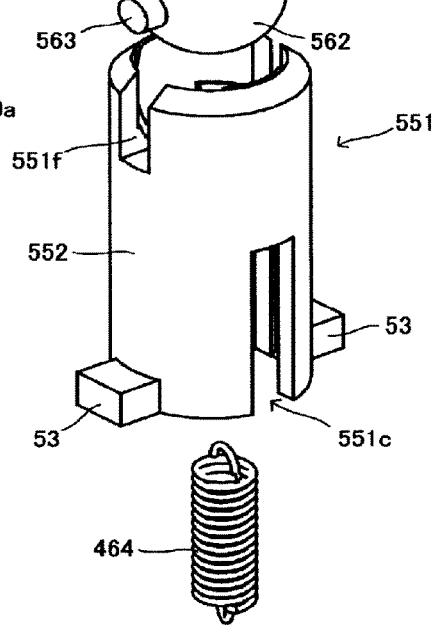
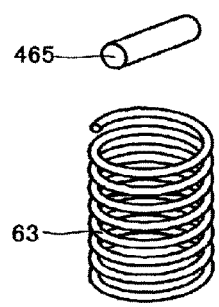

SHAFT MEMBER, END MEMBER, PHOTORECEPTOR DRUM UNIT, DEVELOPING ROLLER UNIT, AND PROCESS CARTRIDGE

TECHNICAL FIELD

The present invention relates to a process cartridge which is mounted on an image forming apparatus, such as a laser printer or a copying machine, a photoreceptor drum unit which is disposed in the process cartridge, a developing roller unit, an end member, and a shaft member.

BACKGROUND ART

In an image forming apparatus represented by a laser printer or a copying machine, a process cartridge which is attachable to and detachable from a main body of the image forming apparatus (hereinafter, referred to as an "apparatus main body") is provided.

The process cartridge is a member which forms content to be expressed, such as letters or figures and transfers the content to a recording medium, such as a paper sheet. Here, in the process cartridge, a photoreceptor drum in which the content to be transferred is formed, is included, and various means for forming the content to be transferred by acting on the photoreceptor drum are also disposed. Examples thereof include means for performing developing, charging, and cleaning.

In regard to the process cartridge, the same process cartridge is attached to and detached from the apparatus main body in maintenance, or a new process cartridge for replacement is mounted on the apparatus main body after an old process cartridge is disengaged from the apparatus main body. The attachment and detachment of the process cartridge are performed by users of the image forming apparatus manually, and thus, it is desirable that the attachment and detachment can be easily performed as much as possible.

Meanwhile, it is necessary that the photoreceptor drum included in the process cartridge rotates around an axis during the operation thereof. Therefore, a driving shaft of an apparatus main body is engaged with the photoreceptor drum directly or via another member at least during the operation, and the photoreceptor drum is configured to receive a rotating force from the driving shaft and rotate. Therefore, in order to attach and detach the process cartridge to and from the apparatus main body, it is necessary to release (disengage) the engagement between the driving shaft of the apparatus main body and the photoreceptor drum, and to mount the process cartridge again for every attachment and detachment.

Here, if it is possible to attach and detach the photoreceptor drum by moving the photoreceptor drum (process cartridge) in an axial direction of the driving shaft of the apparatus main body, a structure for the above-described attachment and detachment is relatively simple. However, from the viewpoint of reducing the size of the image forming apparatus and ensuring space for the attachment and detachment of the process cartridge, it is preferable that the process cartridge is disengaged from the apparatus main body by pulling out the process cartridge in a direction different from the axial direction of the driving shaft, and that the process cartridge is mounted on the apparatus main body by pushing the process cartridge in this direction.

In PTL 1, a technique in which a driving force can be transmitted to a photoreceptor drum from an apparatus main body side when a cover of the apparatus main body is closed, and movement of separating a rotating body is performed such that the driving force is not transmitted to the photoreceptor drum when the cover is open, is disclosed. Accordingly, it is possible to attach and detach a process cartridge to and from the apparatus main body in the direction different from the axial direction of the driving shaft.

In PTL 2, a technique in which a gear is provided in a photoreceptor drum, and the photoreceptor drum rotates with the gear meshing with a gear driven by the apparatus main body, is disclosed.

In addition, in PTL 3, an invention in which a driving shaft of an apparatus main body and a photoreceptor drum are engaged with each other via a rotating force transmission component having a trunnion structure and attached to the photoreceptor drum, and the photoreceptor drum rotates, is disclosed. Since the angle of the rotating force transmission component with respect to an axis of the photoreceptor drum can be changed by using the trunnion structure, the engagement and disengagement between the driving shaft of the apparatus main body and the photoreceptor drum are easily performed.

In PTL 4, a coupling which has a hook-like part engaged with a driving shaft, swings around two axes orthogonal to an axis of the driving shaft, and can move in an axial direction of the driving shaft, is disclosed. PTL 4 discloses that the engagement and disengagement between the driving shaft of the apparatus main body and the photoreceptor drum becomes easy due to this structure.

In NPL 1, a technology in which a bearing member engaged with a driving shaft is provided to be movable in an axial direction by using an elastic member, such as a spring, is disclosed. Accordingly, when attaching and detaching the bearing member and the driving shaft to and from each other, the bearing member moves and retreats in the axial direction while being biased by the elastic member so that the attachment and detachment are smoothly performed.

CITATION LIST

Patent Literature

[PTL 1] Japanese Patent Application No. 2875203
[PTL 2] JP-A-7-121088
[PTL 3] JP-A-2008-233868
[PTL 4] JP-A-2011-145670

Non Patent Literature

[NPL 1] Technical Disclosure No. 2010-502197, published by Japan Institute of Invention and Innovation

SUMMARY OF INVENTION

Technical Problem

However, in the invention described in PTL 1, attaching and detaching the process cartridge includes a process of moving the rotating body in an axial direction of the rotating body along with opening and closing of a lid, and a mechanism therefor is necessary. In addition, in the invention described in PTL 2, it is possible to directly move the process cartridge in the direction different from the axial direction of the photoreceptor drum, but there is a case where unevenness of rotation of the photoreceptor drum is generated due to the characteristics of the gear.

In the invention described in PTL 3, it is possible to directly move the process cartridge in the direction (substantially orthogonal direction) different from the axial direction of the photoreceptor drum, but it is necessary to configure the rotating force transmission component to be freely inclined, high component accuracy is demanded, and the structure becomes complicated. Accordingly, there is a case where it is difficult to match an axis of a driving transmission shaft and an axis of a driven transmission shaft.

In the invention described in PTL 4, since the swing and the movement in the axial direction are realized by using the single elastic member (spring), it is difficult to independently control a repulsive force (hardness) in a swing direction and a repulsive force (hardness) in an axial moving direction, and further, there is a restriction in design (for example, to increase the repulsive force of the movement in the axial direction, a spring having a large spring constant is necessary, and in this case, the repulsive force in the swing direction also increases so that it is not possible to achieve an appropriate swing). In addition, in the invention, a shaft tip end tends to become large due to the structure, and there is a case where it is not possible to employ the invention due to a limited installation space.

In the invention described in NPL 1, since the shaft member is movable only in the axial direction, the engagement between a groove of a rotating force transmission portion and a rotating force transmission portion on the driving shaft side is weak, and further, there is also a case where a tapered part is provided, and there is a case where the transmission of the rotating force is not appropriately performed. In addition, in particular, when disengaging the process cartridge, there is a case where it is difficult to disengage the process cartridge since a hook portion is caught by the driving shaft depending on a posture of the shaft member in a rotational direction. When an inclined surface is provided to avoid the catching, a problem occurs in transmission of the rotation.

Here, considering the above-described problems, an object of the present invention is to provide an end member which can transmit a rotating force appropriately, and can be smoothly attached to and detached from an apparatus main body. In addition, another object of the present invention is to provide a photoreceptor drum unit provided with the end member, a developing roller unit, a process cartridge, and a shaft member provided in the end member.

Solution to Problem

Hereinafter, the present invention will be described.

The present invention is an end member which is disposed in an end portion of a columnar rotating body mounted on an image forming apparatus main body, comprising: a tubular bearing member; and a shaft member held by the bearing member, wherein the shaft member includes a rotating shaft which is disposed in the bearing member, and moves in an axial direction, and a rotating force receiving member which is provided with an engagement hook that is disposed in one end portion of the rotating shaft, swings with respect to an axis of the rotating shaft, and is engaged with a driving shaft of the image forming apparatus main body.

Here, the "columnar rotating body" is a concept including a solid rotating body which has a shape of a so-called round rod and rotates around the axis, and a hollow rotating body which has a so-called cylinder shape, and rotates around the axis.

The end member according to an aspect of the present invention, for example, further includes a rotating shaft elastic member which biases the rotating shaft in the axial direction; and a hook member elastic member which is provided to be separated from the rotating shaft elastic member, and biases the engagement hook in a swing direction.

In the end member according to an aspect of the present invention, for example, the rotating force receiving member swings in all directions with respect to the axis of the rotating shaft.

In the end member according to an aspect of the present invention, for example, the rotating force receiving member includes a tip end member disposed in one end portion of the rotating shaft, and a hook member which is held by the tip end member and is provided with the engagement hook, and the hook member swings being held by the tip end member.

In the end member according to an aspect of the present invention, for example, the hook member is biased by an elastic member in the axial direction, and swings being held by the tip end member with a pin passing through a hole provided in the hook member and a hole provided in the tip end member.

In the end member according to an aspect of the present invention, for example, the pin is disposed on the outside of the bearing member.

In the end member according to an aspect of the present invention, for example, two engagement hooks which extend in one direction are formed to have a predetermined interval, each engagement hook has an opposing surface with which the two engagement hooks face each other, an outer surface opposite to the opposing surface, a first side surface which is one of two side surfaces that link the opposing surface and the outer surface, and a second side surface opposite to the first side surface, and the first side surface extends in parallel to a direction in which the axis of the rotating shaft extends, or is inclined in a direction of being separated from the second side surface toward a tip end.

According to the present invention, there is provided a photoreceptor drum unit including: a photoreceptor drum which is the columnar rotating body; and the above-described end member which is attached to at least one end portion in an axial direction of the photoreceptor drum.

According to the present invention, there is provided a developing roller unit including: a developing roller which is the columnar rotating body; and the above-described end member which is attached to at least one end portion in an axial direction of the developing roller.

According to the present invention, there is provided a process cartridge including: a housing; and the above-described photoreceptor drum unit which is held by the housing.

According to the present invention, there is provided a process cartridge including a housing; and the above-described developing roller unit which is held by the housing.

According to the present invention, there is provided a shaft member which is provided in an end member disposed in an end portion of a columnar rotating body, including: a rotating shaft; and a rotating force receiving member which is provided with an engagement hook that is disposed in one end portion of the rotating shaft, swings with respect to an axis of the rotating shaft, and is engaged with a driving shaft of an image forming apparatus main body.

The shaft member according to an aspect of the present invention, for example, further includes a rotating shaft elastic member which biases the rotating shaft in an axial direction; and a hook member elastic member which is provided to be separated from the rotating shaft elastic member, and biases the engagement hook in a swing direction.

In the shaft member according to an aspect of the present invention, for example, the rotating force receiving member swings in all directions with respect to the axis of the rotating shaft.

In the shaft member according to an aspect of the present invention, for example, the rotating force receiving member includes a tip end member disposed in one end portion of the rotating shaft, and a hook member which is held by the tip end member and is provided with the engagement hook, and the hook member swings being held by the tip end member.

In the shaft member according to an aspect of the present invention, for example, two engagement hooks which extend in one direction are formed to have a predetermined interval, each engagement hook has an opposing surface with which the two engagement hooks face each other, an outer surface opposite to the opposing surface, a first side surface which is one of two side surfaces that link the opposing surface and the outer surface, and a second side surface opposite to the first side surface, and the first side surface extends in parallel to a direction in which the axis of the rotating shaft extends, or is inclined in a direction of being separated from the second side surface toward a tip end.

Advantageous Effects of Invention

According to the present invention, the transmission of the rotating force which is equivalent to that in the related art is possible, and more smooth attachment and detachment to and from the apparatus main body can be performed.

BRIEF DESCRIPTION OF DRAWINGS

FIG. 13A is an exploded perspective view of a shaft member 50, and FIG. 13B is a sectional view of the shaft member 50.

FIG. 31A is a perspective view of a shaft member 450, and FIG. 31B is an exploded perspective view of the shaft member 450.

FIG. 38A is a perspective view of a shaft member 550, and FIG. 38B is an exploded perspective view of the shaft member 550.

FIG. 44I1 is a view illustrating another situation in which the driving shaft 70 and the photoreceptor drum unit 510 are engaged with each other.

DESCRIPTION OF EMBODIMENTS

Figure 1:
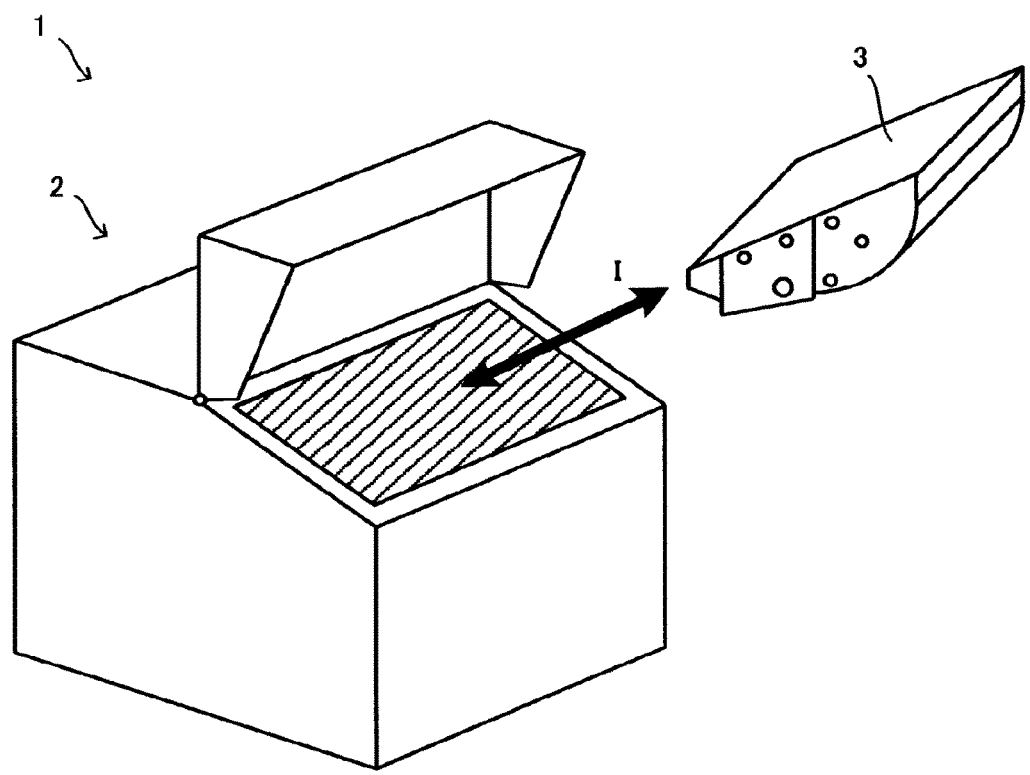
FIG. 1 is a conceptual view of an image forming apparatus main body 2 and a process cartridge 3.

Hereinafter, the present invention will be described based on the embodiments illustrated in the drawings. However, the present invention is not limited to the embodiments.

FIG. 1 is a view illustrating a first embodiment, and is a perspective view schematically illustrating an image forming apparatus 1 which includes a process cartridge 3 and an image forming apparatus main body 2 (hereinafter, referred to as "apparatus main body 2" in some cases) which is used by mounting the process cartridge 3 thereon. The process cartridge 3 can be mounted on the apparatus main body 2 and disengaged from the apparatus main body 2 by being moved in the direction illustrated by I in FIG. 1.

Figure 2:
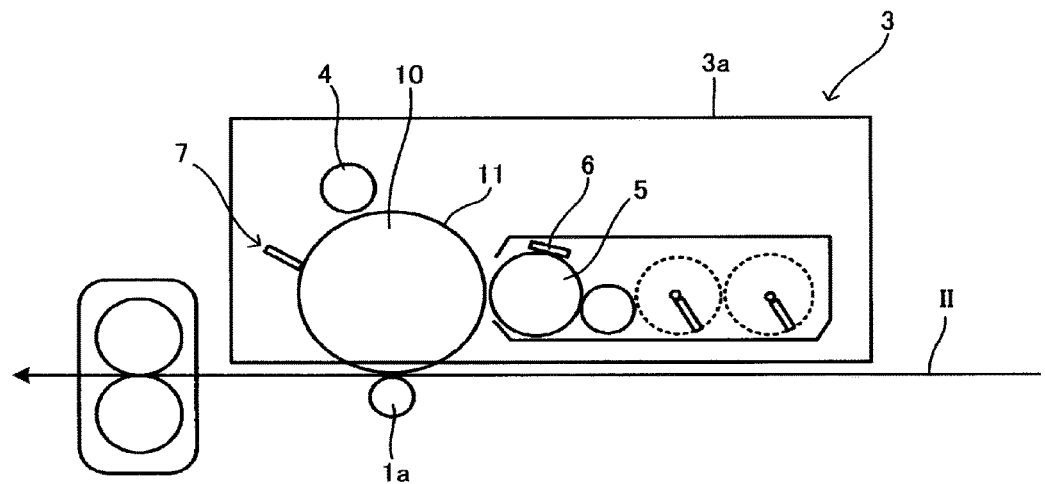
FIG. 2 is a conceptual view illustrating a configuration of the process cartridge 3.

In FIG. 2, a structure of the process cartridge 3 is schematically illustrated. As can be ascertained from FIG. 2, the process cartridge 3 includes a photoreceptor drum unit 10 (refer to FIG. 3), a charging roller unit 4, a developing roller unit 5, a regulating member 6, and a cleaning blade 7, on an inner side of a housing 3a. In a posture in which the process cartridge 3 is mounted on the apparatus main body 2, as a recording medium, such as a paper sheet, moves along line illustrated by II in FIG. 2, an image is transferred to the recording medium.

In addition, attachment and detachment of the process cartridge 3 to and from the apparatus main body 2 are performed as in the following. Since the photoreceptor drum unit 10 provided in the process cartridge 3 receives a rotation driving force from the apparatus main body 2 and rotates, a state where the driving shaft 70 (refer to FIG. 16A) of the apparatus main body 2 and an end member 30 (refer to FIG. 3) of the photoreceptor drum unit 10 are engaged with each other at least during the operation, and the rotating force can be transmitted, is achieved (refer to FIG. 17).

Meanwhile, when attaching and detaching the process cartridge 3 to and from the apparatus main body 2, it is necessary that the driving shaft 70 and the end member 30 are rapidly engaged and disengaged to and from each other not to interfere with the movement on the other side regardless of the posture.

In this manner, the end member 30 of the photoreceptor drum unit 10 is appropriately engaged with the driving shaft 70 of the apparatus main body 2, and the rotation driving force is transmitted.

Hereinafter, each configuration will be described.

In the process cartridge 3, the charging roller unit 4, the developing roller unit 5, the regulating member 6, the cleaning blade 7, and the photoreceptor drum unit 10 are provided, and these members are included in the housing 3a. Each member will be described in the following.

The charging roller unit 4 charges a photoreceptor drum 11 of the photoreceptor drum unit 10 by applying voltage from the apparatus main body 2. The charging is performed as the charging roller unit 4 rotates following the photoreceptor drum 11 and comes into contact with an outer circumferential surface of the photoreceptor drum 11.

The developing roller unit 5 is a roller which supplies developer to the photoreceptor drum 11. In addition, an electrostatic latent image formed in the photoreceptor drum 11 is developed by the developing roller unit 5. In addition, in the developing roller unit 5, a fixing magnet is embedded.

The regulating member 6 is a member which adjusts an amount of the developer which adheres to the outer circumferential surface of the above-described developing roller unit 5, and imparts a triboelectric charge to the developer itself.

The cleaning blade 7 is a blade which comes into contact with the outer circumferential surface of the photoreceptor drum 11 and removes the developer remaining after the transfer by a tip end thereof.

Figure 3:
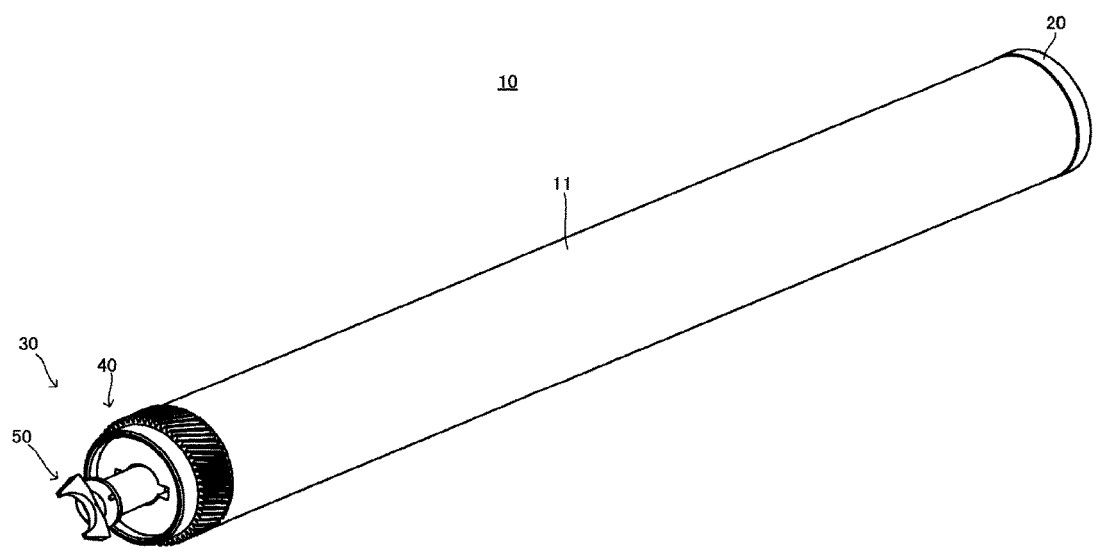
FIG. 3 is an external perspective view of a photoreceptor drum unit 10.

The photoreceptor drum unit 10 is provided with the photoreceptor drum 11, and letters or figures to be transferred to the recording medium are formed thereon. FIG. 3 illustrates an external perspective view of the photoreceptor drum unit 10. As can be ascertained from FIG. 3, the photoreceptor drum unit 10 is provided with the photoreceptor drum 11, a lid material 20, and the end member 30.

The photoreceptor drum 11 is a member which is covered with a photoreceptor layer on an outer circumferential surface of a base body which is a columnar rotating body. On the photoreceptor layer, the letters or figures to be transferred to the recording medium, such as a paper sheet, are formed.

The base body is formed of a conductive material of aluminum or aluminum alloy in a cylindrical shape. The type of the aluminum alloy used in the base body is not particularly limited, but 6000 series, 5000 series, and 3000 series aluminum alloys which are defined by JIS standard (JIS H 4140) which are used as the base body of the photoreceptor drum in many cases, are preferable.

In addition, the photoreceptor layer formed on the outer circumferential surface of the base body is not particularly limited, and a known material can be employed according to the purpose.

It is possible to manufacture the base body by forming the cylindrical shape by a cutting process, an extrusion processing, or a drawing processing. In addition, it is possible to manufacture the photoreceptor drum 11 by laminating by coating the outer circumferential surface of the base body with the photoreceptor layer.

As will be described later, in order to rotate the photoreceptor drum 11 around an axis, at least two end members are attached to one end of the photoreceptor drum 11. In the aspect, one end member is the lid material 20, and the other end member is the end member 30. Here, the base body has a hollow cylindrical shape, but may have a shape of a solidly round rod. However, at least the lid material 20 and the end member 30 are formed to be appropriately attached to the end portion of the drum cylinder.

The lid material 20 is an end member which is disposed in an end portion on a side on which the driving shaft 70 of the apparatus main body 2 is not engaged, among the end portions in the axial direction of the photoreceptor drum 11. The lid material 20 is formed of a resin, and a fitting portion which is fitted to the inside of the cylinder of the photoreceptor drum 11, and a bearing portion which is disposed to cover one end surface of the photoreceptor drum 11 are formed coaxially. The bearing portion has a shape of a disk which covers the end surface of the photoreceptor drum 11, and is provided with a part that receives a shaft provided in the housing 3a. In addition, an earth plate made of a conductive material is disposed in the lid material 20, and according to this, the photoreceptor drum 11 and the apparatus main body 2 are electrically connected to each other.

In addition, in the embodiment, an example of the lid material is described, but the lid material is not limited thereto, and it is possible to employ a lid material which can be generally obtained according to another embodiment. For example, a gear for transmitting the rotating force may be disposed in the lid material.

In addition, the above-described conductive material (earth plate) may be provided on the end member 30 side.

Figure 4:
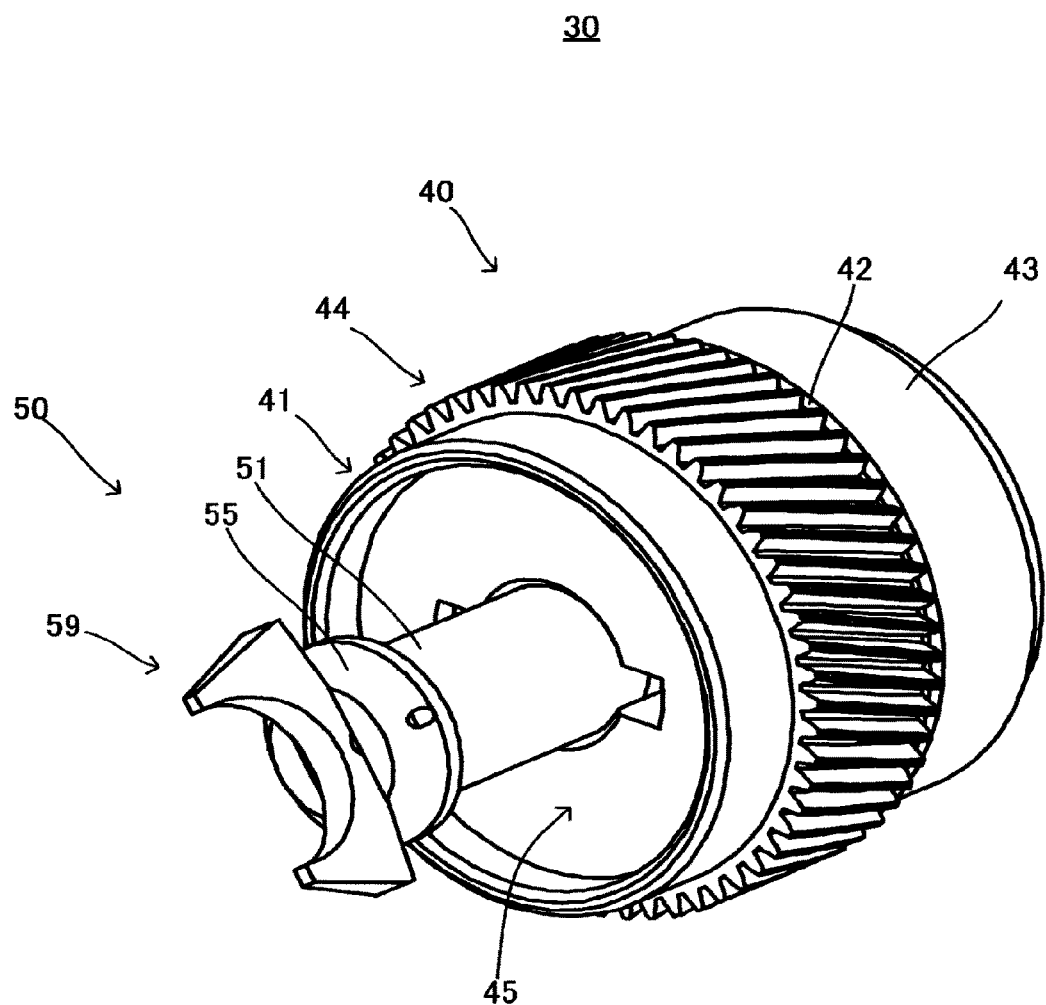
FIG. 4 is a perspective view of an end member 30.
Figure 5:
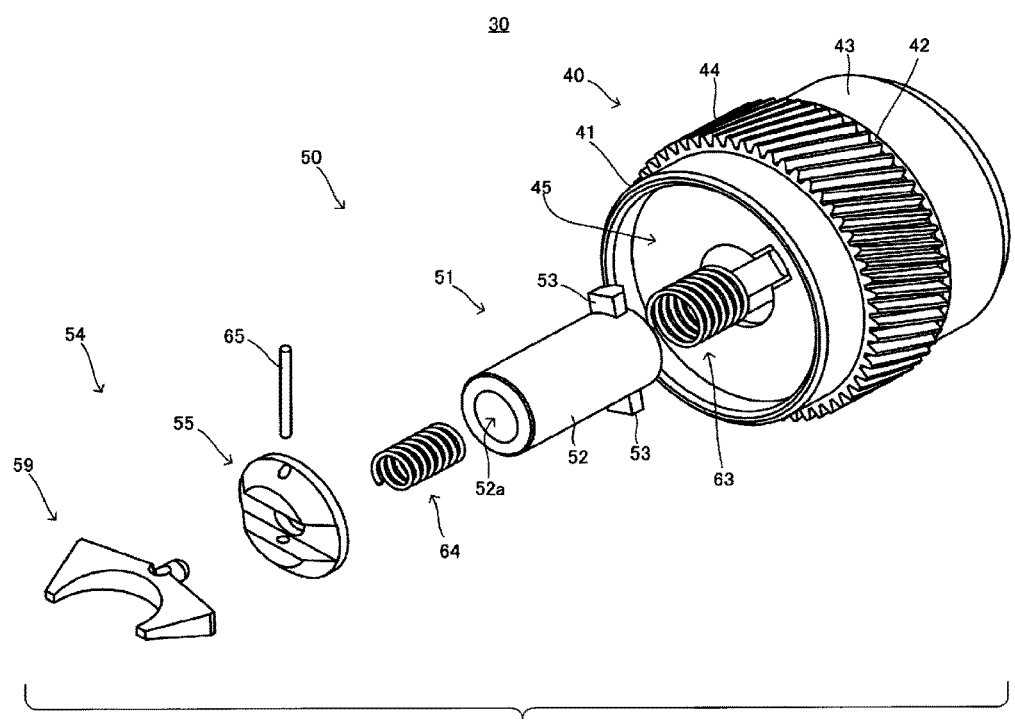
FIG. 5 is an exploded perspective view of the end member 30.

The end member 30 is a member attached to the end portion opposite to the lid material 20 among the end portions of the photoreceptor drum 11, and is a member which receives the rotation driving force from the apparatus main body 2. In the aspect, the end member 30 is provided with a bearing member 40 and a shaft member 50. FIG. 4 illustrates a perspective view of the end member 30, and FIG. 5 illustrates an exploded perspective view of the end member 30.

Figure 6A:
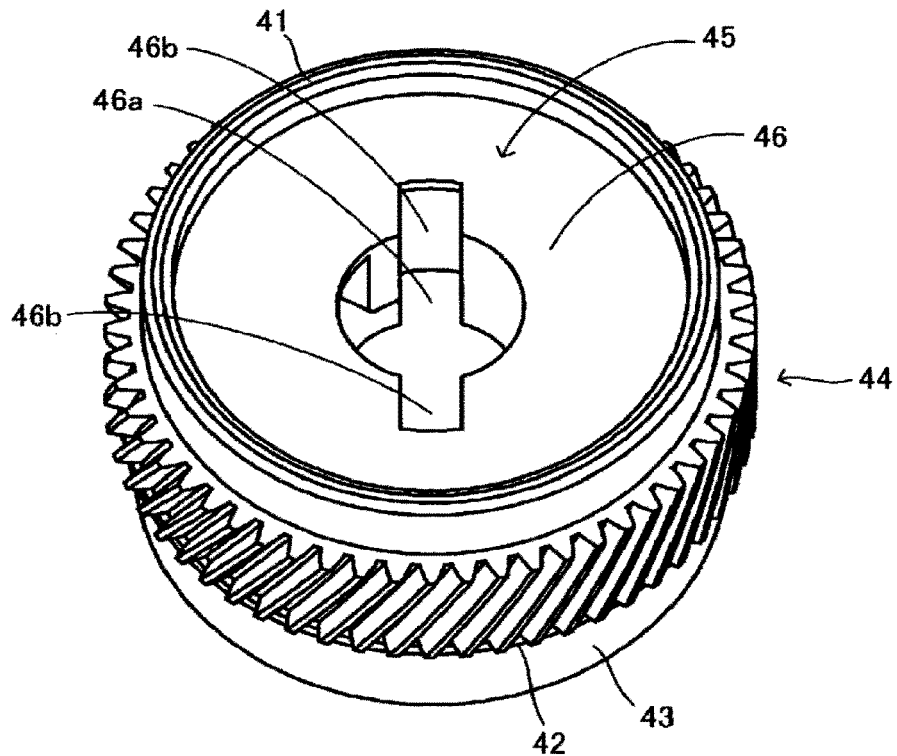
FIG. 6A is a perspective view of a bearing member 40.
Figure 6B:
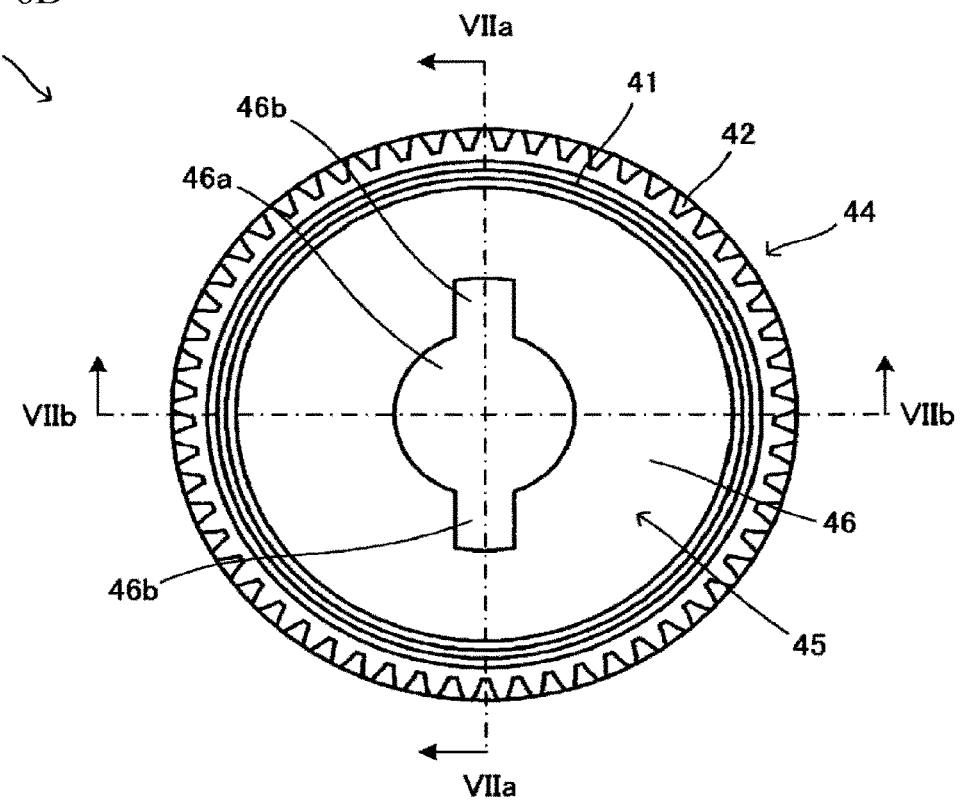
FIG. 6B is a plan view of the bearing member 40.
Figure 7A:
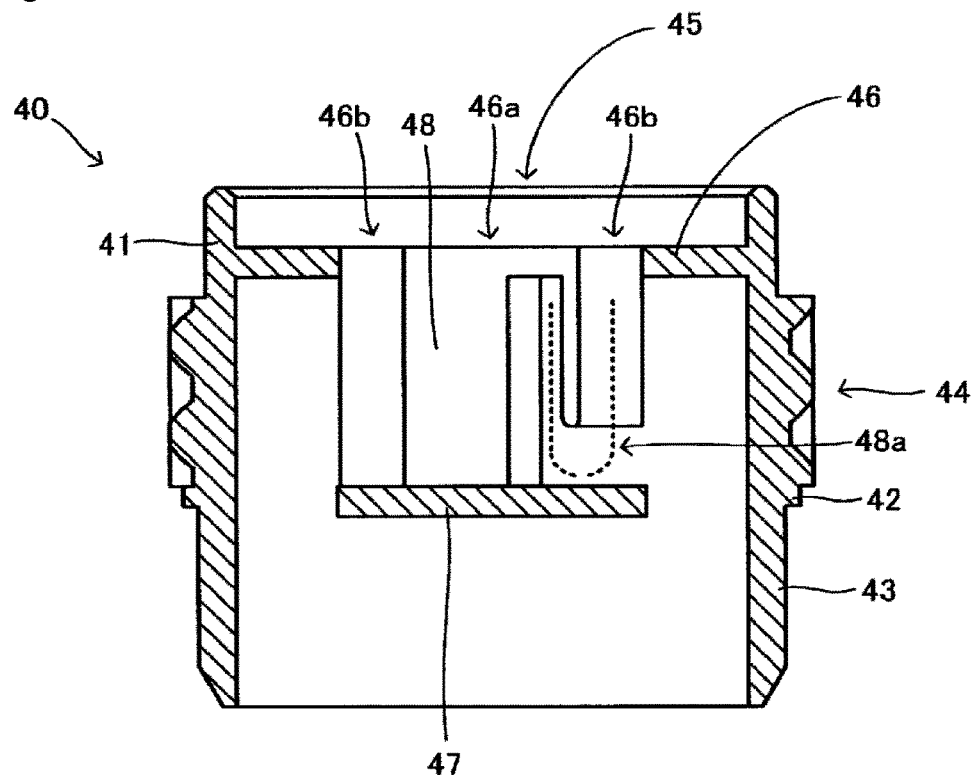
FIG. 7A is a sectional view of the bearing member 40.
Figure 7B:
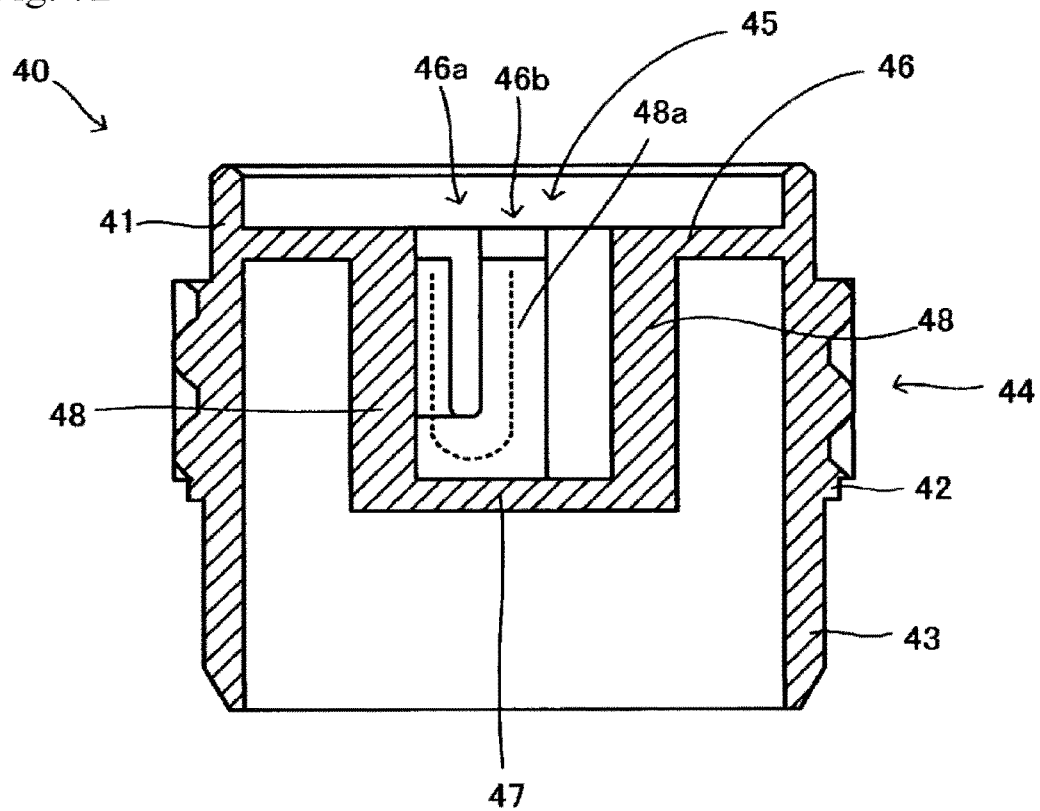
FIG. 7B is another sectional view of the bearing member 40.

The bearing member 40 is a member which is bonded to the end portion of the photoreceptor drum 11 in the end member 30. FIG. 6A illustrates a perspective view of the bearing member 40, and FIG. 6B illustrates a plan view of the bearing member 40 from a side on which the shaft member 50 is inserted. Furthermore, FIG. 7A is a sectional view along a line illustrated by VIIa-VIIa in FIG. 6B, and FIG. 7B is a sectional view along a line illustrated by VIIb-VIIb in FIG. 6B. In addition, in each drawing which will be described later, there is a case where hatching is illustrated in the end surface (cut surface) in the sectional view.

As can be ascertained from FIGS. 4 to 7B, the bearing member 40 is configured to include a tubular body 41, a contact wall 42, a fitting portion 43, a gear portion 44, and a shaft member holding portion 45.

The tubular body 41 is an overall tubular member, and the contact wall 42 and the gear portion 44 are disposed on the outer circumference thereof, and the shaft member holding portion 45 is formed on the inner side of the tubular body 41.

The contact wall 42 which comes into contact with and is locked to the end surface of the photoreceptor drum 11, stands from a part of the outer circumferential surface of the tubular body 41. Accordingly, as illustrated in FIG. 3, the depth of insertion of the end member 30 into the photoreceptor drum 11 is regulated when the end member 30 is mounted on the photoreceptor drum 11.

In addition, by nipping the contact wall 42 of the tubular body 41, the fitting portion 43 of which one side is inserted into the photoreceptor drum 11 is made. The fitting portion 43 is inserted into the photoreceptor drum 11, and is fixed to the inner surface of the photoreceptor drum 11 by an adhesive. Accordingly, the end member 30 is fixed to the end portion of the photoreceptor drum 11. Therefore, the outer diameter of the fitting portion 43 is substantially the same as the inner diameter of the photoreceptor drum 11 within a range in which insertion into the cylindrical inner side of the photoreceptor drum 11 is possible. A groove may be formed on the outer circumferential surface in the fitting portion 43. Accordingly, the groove is filled with the adhesive, and adhesiveness between the tubular body 41 (end member 30) and the photoreceptor drum 11 is improved by an anchor effect or the like.

By nipping the contact wall 42, the gear portion 44 is formed on the outer circumferential surface of the tubular body 41 opposite to the fitting portion 43. The gear portion 44 is a gear which transmits the rotating force to another member, such as the developing roller, and in the aspect, the gear portion 44 is a helical gear. However, the type of the gear is not particularly limited, and may be a spur gear. Otherwise, both the helical gear and the spur gear may be disposed being aligned along the axial direction of the tubular body. In addition, it is not necessary to provide the gear.

The shaft member holding portion 45 is a part which is formed on the inner side of the tubular body 41, and which has a function of holding the shaft member 50 in the bearing member 40. As can be ascertained from FIGS. 6A to 7B, the shaft member holding portion 45 includes a rotating shaft holding member 46, a support member 47, and a guide wall 48.

The rotating shaft holding member 46 is a plate-like member which is formed to block the inner side of the tubular body 41, but a hole 46a which is coaxial to the axis of the tubular body 41 is formed. Since a rotating shaft 51 (refer to FIGS. 8A and 8B) penetrates the hole 46a as will be described later, the rotating shaft 51 has the size and the shape by which the rotating shaft 51 can penetrate. However, in order to prevent the rotating shaft 51 from falling out, a main body 52 of the rotating shaft 51 can penetrate the hole 46a, but cannot penetrate a part on which a projection 53 is disposed. In addition, from the viewpoint of stabilized movement of the rotating shaft 51, it is preferable that the hole 46a has the shape and the size which are substantially the same as the outer circumference of the main body 52 of the rotating shaft 51 within a range in which the hole 46a does not interrupt the movement of the rotating shaft 51 in the axial direction.

In addition, in the rotating shaft holding member 46, two slits 46b extend from the hole 46a. The two slits 46b are provided at symmetrical positions nipping the center of the hole 46a. In addition, the size and the shape of the slit 46b are formed so that the projection 53 of the rotating shaft 51 (refer to FIGS. 8A and 8B) can penetrate the slit 46b.

The support member 47 is a plate-like member which is provided further on the fitting portion 43 side than the rotating shaft holding member 46, and which is formed to block at least a part of the inner side of the tubular body 41. The support member 47 is formed to have the size and the shape by which at least a rotating shaft elastic member 63 which will be described later can be supported.

The guide wall 48 is a tubular member which extends in parallel to the axial direction of the tubular body 41 from an edge of the hole 46a of the rotating shaft holding member 46, and of which an end portion is connected to the support member 47. In the aspect, the sectional shape of the inner side of the guide wall 48 is the same as that of the hole 46a. However, as will be described later, since the main body 52 of the rotating shaft 51 is inserted into the guide wall 48, and the rotating shaft 51 moves in the axial direction, the guide wall 48 has the shape and the size by which the guide wall 48 does not interrupt the movement.

In addition, a slit 48a is formed in the guide wall 48. In FIGS. 7A and 7B, in order to make it easy to understand, a dotted line is illustrated along the direction in which the slit 48a extends. One end side of the slit 48a passes through the slit 46b of the rotating shaft holding member 46 in the longitudinal direction, the slit 48a extends in parallel to the axis of the tubular body 41, and the slit 48a reaches the support member 47. After this, the slit 48a extends in parallel to the axial direction similar to a U-turn, and one end portion (the other end side) of the slit 48a reaches the rotating shaft holding member 46. Therefore, the other end side is blocked by the rotating shaft holding member 46. The slit width of the slit 48a is formed so that the projection 53 of the rotating shaft 51 (refer to FIGS. 8A and 8B) can move in the slit 48a.

A material which configures the bearing member 40 is not particularly limited, but a resin, such as polyacetal, polycarbonate, or PPS, or metal can be used. Here, in a case where the resin is used, in order to improve rigidity of the member, glass fibers, carbon fibers, or the like, may be mixed in the resin in accordance with a loading torque. In addition, in order to smoothly attach and move the shaft member, sliding properties may be improved by containing at least one of fluorine, polyethylene, and silicon rubber in the resin. In addition, the resin may be coated with fluorine, and may be coated with a lubricant.

In a case where the metal is used, it is possible to use scraping by cutting, aluminum die cast, zinc die cast, a metal powder injection molding method (so-called MIM method), or a metal powder sintering lamination method (so-called 3D print). In addition, regardless of the quality of material of metal, iron, stainless steel, aluminum, brass, copper, zinc, or an alloy of these materials, may be used. In addition, it is possible to improve functionality (lubricative properties or corrosion resistance) of the front surface by performing various types of soldering.

Returning to FIGS. 4 and 5, the shaft member 50 in the end member 30 will be described. As can be ascertained from FIG. 5, the shaft member 50 is provided with the rotating shaft 51 and a rotating force transmission member 54, and the rotating force transmission member 54 is configured to include a tip end member 55, a hook member 59, and a pin 65. Furthermore, the shaft member 50 is provided with the rotating shaft elastic member 63 and a hook member elastic member 64. Both of the rotating shaft elastic member 63 and the hook member elastic member 64 in the aspect are coiled springs.

Hereinafter, each of the members will be described.

Figure 8A:
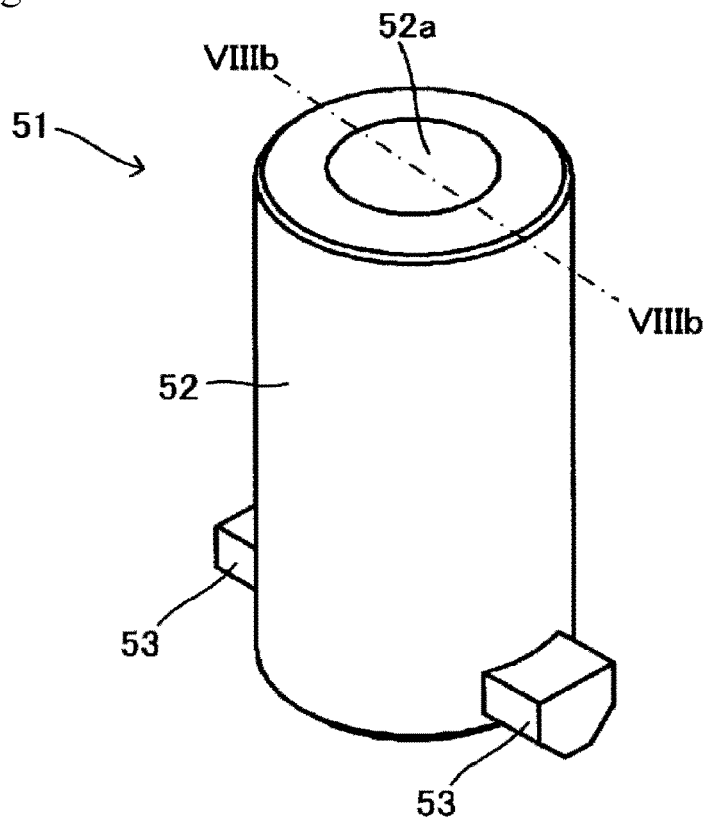
FIG. 8A is a perspective view of a rotating shaft 51.

The rotating shaft 51 is a shaft-like member which transmits the rotating force received by the rotating force transmission member 54 to the bearing member 40. FIG. 8A is a perspective view of the rotating shaft 51, and FIG. 8B is a sectional view when cut along the axial direction including a line illustrated by VIIIb-VIIIb in FIG. 8A.

Figure 8B:
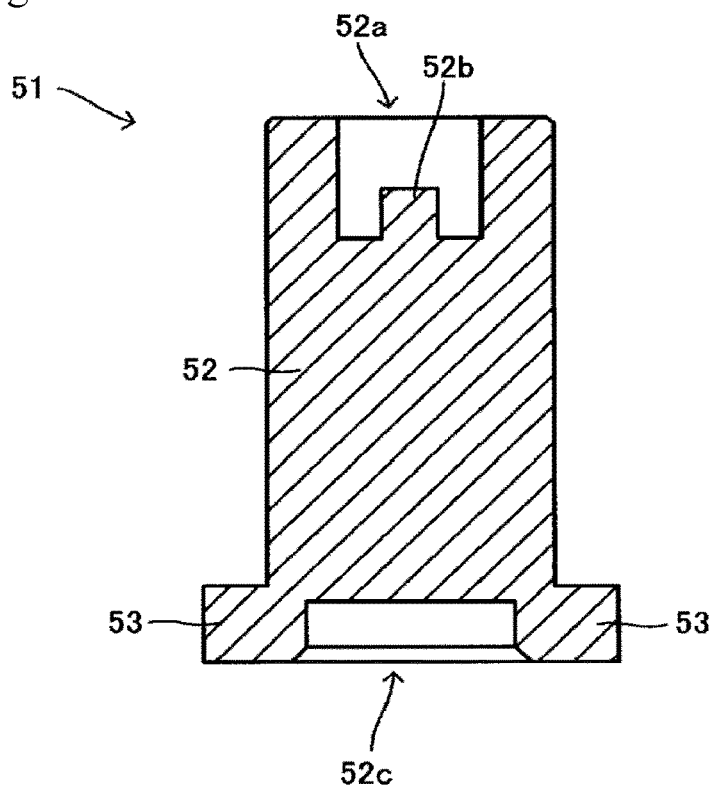
FIG. 8B is a sectional view of the rotating shaft 51.

As can be ascertained from FIGS. 8A and 8B, the rotating shaft 51 includes the columnar main body 52, and recessed portions 52a and 52c are formed on each of the columnar end surfaces.

The recessed portion 52a is a recessed portion which is formed on one end surface of the main body 52 of the rotating shaft 51, and one end side of the hook member elastic member 64 is inserted thereto. In addition, a holding projection 52b for fixing the hook member elastic member 64 is provided on a bottom portion of the recessed portion 52a. In the aspect, as will be described later, the hook member elastic member 64 is held as the holding projection 52b is inserted into the hook member elastic member 64.

The recessed portion 52c is a recessed portion which is formed on the other end surface of the main body 52 of the rotating shaft 51, that is, on an end surface opposite to the side on which the recessed portion 52a is formed. One end of the rotating shaft elastic member 63 is inserted into the recessed portion 52c, and one end of the rotating shaft elastic member 63 comes into contact with the bottom portion of the recessed portion 52c. Therefore, the recessed portion 52c is formed to have the size by which the insertion is possible.

Two projections 53 are disposed in the end portion on the side on which the recessed portion 52c is disposed in the outer circumferential portion of the main body 52. Two projections 53 are provided on the same line in one diameter direction of the column of the main body 52 to be opposite to each other nipping the axis of the main body 52. The two projections 53 have a function of holding the rotating shaft 51 by the bearing member 40 as will be described later, regulating the movement of the main body 52, and transmitting the rotating force of the main body 52 to the bearing member 40.

Figure 9A:
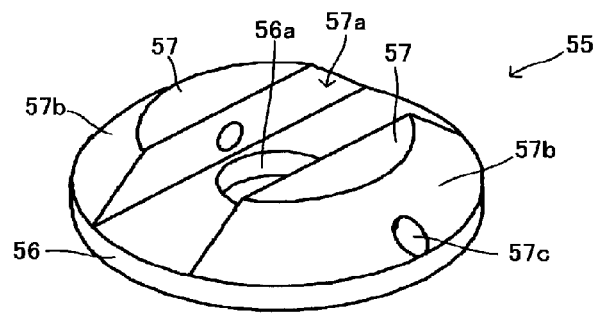
FIG. 9A is a perspective view of a tip end member 55.
Figure 9B:
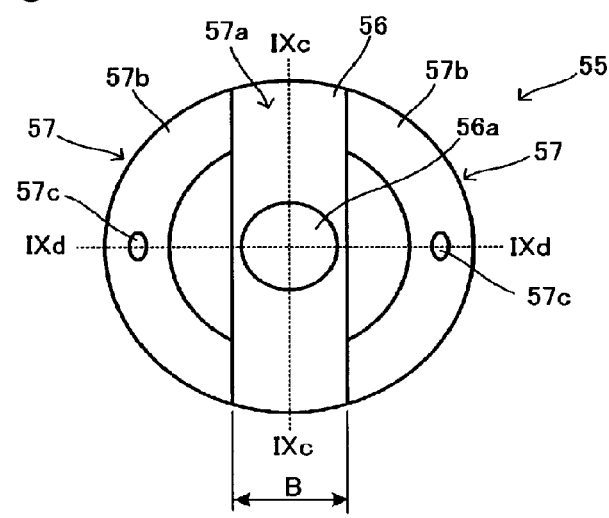
FIG. 9B is a plan view of the tip end member 55.
Figure 9C:
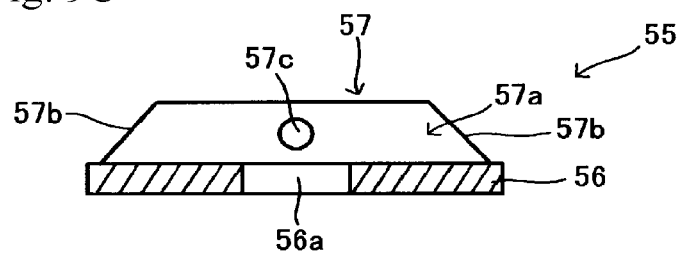
FIG. 9C is one sectional view of the tip end member 55.
Figure 9D:
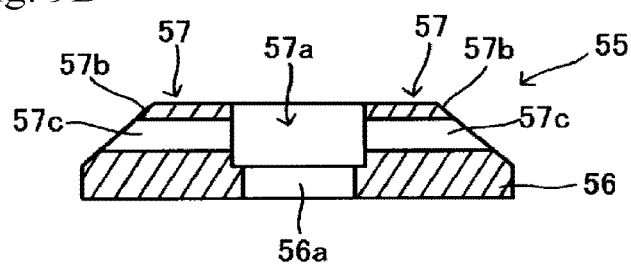
FIG. 9D is another sectional view of the tip end member 55.

Returning to FIG. 5, other members will be continuously described. The tip end member 55 is one member which configures the rotating force transmission member 54, and is a member which holds an engagement hook 60 to be swingable, and transmits the rotating force from the engagement hook 60 to the rotating shaft 51. FIG. 9A is a perspective view of the tip end member 55, FIG. 9B is a plan view of the tip end member 55 when viewed from the side on which the engagement hook 60 is disposed, FIG. 9C is a sectional view by a line illustrated by IXc-IXc in FIG. 9B, and FIG. 9D is a sectional view by a line illustrated by IXd-IXd in FIG. 9B, respectively.

As can be ascertained from FIGS. 4, 5, and 9A to 9D, the tip end member 55 is configured to include a disk-like base portion 56 and two holding members 57 disposed on one surface of the base portion 56.

In the aspect, the base portion 56 has a shape of a disk, and a hole 56a which penetrates the base portion 56 in the thickness direction is formed at the center thereof.

The holding members 57 are two members which are disposed on one surface of the base portion 56, and are disposed on one side and on the other side nipping the hole 56a of the base portion 56 in a plan view (FIG. 9B), and being provided with a void in which the hole 56a is exposed. Therefore, a groove 57a is formed between two holding members 57, and the hole 56a is formed in a bottom portion of the groove 57a. In addition, on a side surface other than the surface on which the groove 57a is formed in the holding member 57, an inclined surface 57b is formed to approach the axis of the base portion 56 according to the separation from the base portion 56.

In addition, in the holding member 57, a hole 57c which passes through the center of the hole 56a of the base portion 56 in a plan view (FIG. 9B), and is orthogonal to the direction in which the groove 57a extends, is provided. As will be described later, the pin 65 is inserted into the hole 57c.

Figure 10A:
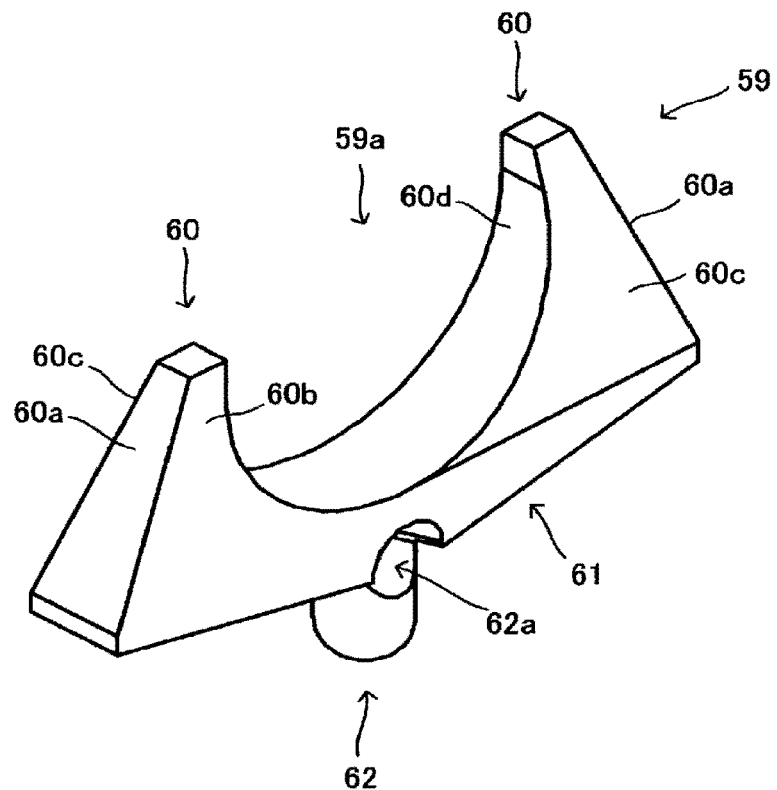
FIG. 10A is a perspective view of a hook member 59.
Figure 10B:
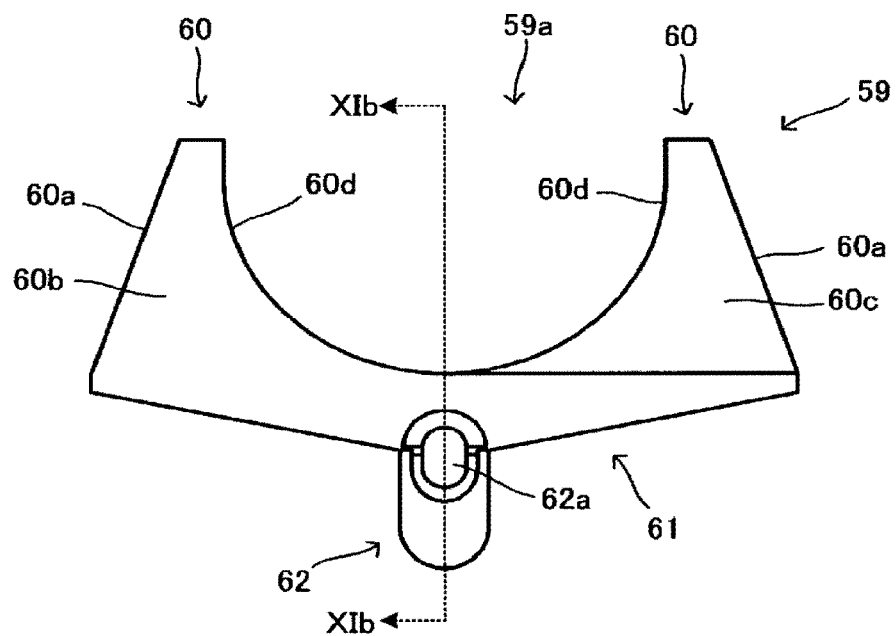
FIG. 10B is a front view of the hook member 59.
Figure 11A:
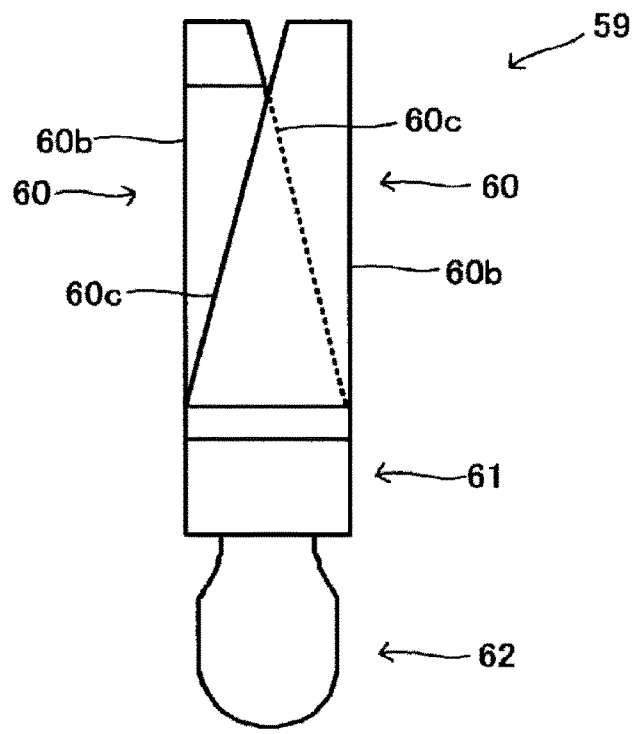
FIG. 11A is a side view of the hook member 59.
Figure 11B:
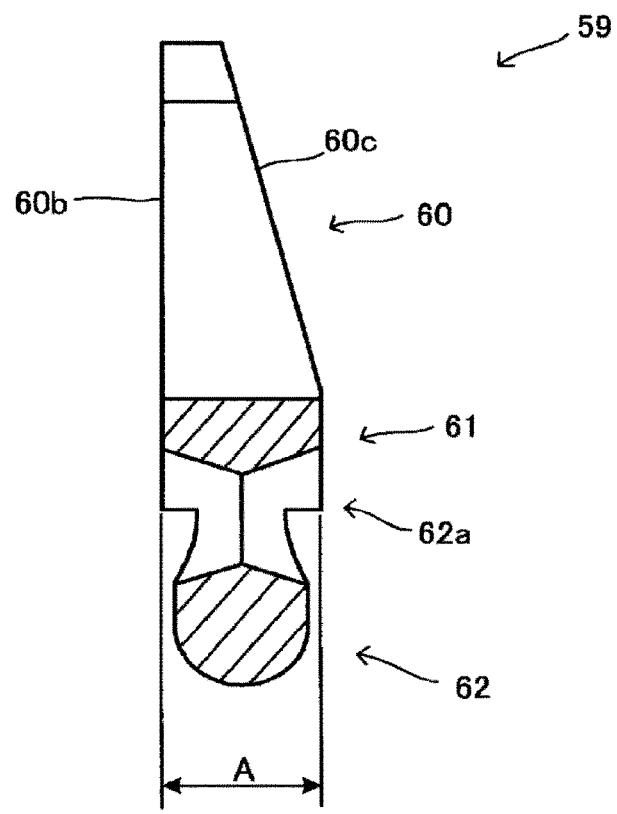
FIG. 11B is a sectional view of the hook member 59.

Returning to FIG. 5, the hook member 59 will be described. The hook member 59 is one member which configures the rotating force transmission member 54, and is a member which is engaged with the driving shaft 70 (refer to FIG. 16A) provided in the apparatus main body 2, and transmits the rotating force to the tip end member 55. FIGS. 10A, 10B, 11A, and 11B are views illustrating this. FIG. 10A is a perspective view of the hook member 59, FIG. 10B is a front view of the hook member 59, FIG. 11A is a side view of the hook member 59, and FIG. 11B is an arrow sectional view illustrated by XIb-XIb in FIG. 10B.

The hook member 59 includes two engagement hooks 60 in the aspect, and a linking piece 61 which links end portions of the two engagement hooks 60 to each other. In addition, on a side opposite to two engagement hooks 60 of the linking piece 61, a holding projection 62 is provided at a position which is the center between the two engagement hooks.

Two engagement hooks 60 are members which stand in the same direction from both end portions of the linking piece 61, and an interval between two engagement hooks 60 is formed so that a tip end of the driving shaft 70 (refer to FIG. 16A) enters the interval, and a rotating force transmission projection 72 of the driving shaft 70 is hooked to the engagement hook 60. In addition, in the aspect, two engagement hooks 60 are formed to become narrower according to the separation from the linking piece 61 as can be ascertained from FIG. 10B. More specifically, opposing surfaces 60d which are surfaces opposing each other in two engagement hooks 60, form a recessed portion 59a having a shape of an arc including the surface of the linking piece 61. This is a shape which corresponds to the tip end portion of the driving shaft 70 (refer to FIG. 16A) of the apparatus main body. However, it is not necessary that the recessed portion 59a has a shape of an arc, and the opposing surface 60d of two engagement hooks 60 may be formed to be inclined (in a tapered shape) in a shape of a straight line to be separated from each other according to the separation from the linking piece 61.

In addition, in two engagement hooks 60, outer surfaces 60a which are surfaces opposite to the recessed portion 59a, are inclined surfaces (hereinafter, there is a case where the outer surface 60a is described as an inclined surface 60a) to approach each other according to the separation from the linking piece 61.

Furthermore, as can be ascertained from FIGS. 11A and 11B, on the surface where the engagement hook 60 is formed, on two surfaces 60b and 60c which link the opposing surface 60d and the inclined surface 60a, the first side surface 60b which is one surface is parallel to the direction in which the engagement hook 60 stands (the direction in which the axis of the rotating shaft 51 extends), and in the aspect, as the second side surface 60c which is the other surface is separated from the linking piece 61, the second side surface 60c is inclined to approach the first side surface 60b. In addition, in the two engagement hooks 60, the first side surface 60b and the second side surface 60c are disposed on opposite sides.

As will be described later, the first side surface 60b is a surface with which the rotating force transmission projection 72 of the driving shaft 70 comes into contact when the rotating force is transmitted from the apparatus main body 2. From the related viewpoint, it is necessary for the first side surface 60b to maintain reliable contact with the rotating force transmission projection 72 when the first side surface 60b receives the rotating force. Therefore, it is preferable that the first side surface 60b is parallel to the direction (the direction in which the axis of the rotating shaft 51 extends) in which the engagement hook 60 stands similar to the aspect, or that the first side surface 60b has an inclined surface which is inclined in the direction in which the second side surface 60c is separated when approaching the tip end.

Meanwhile, in the aspect, the second side surface 60c has the inclined surface to approach the first side surface 60b as described above, but it is not necessary to provide the inclined surface.

The holding projection 62 is a projection which is disposed at a position which is the center between two engagement hooks 60, on the surface opposite to the engagement hook 60 of the linking piece 61. The holding projection 62 is fixed to the hook member elastic member 64. In the aspect, the holding projection 62 is inserted and fixed to the inner side from the end portion of the hook member elastic member 64. Therefore, the holding projection 62 has the size by which the insertion into the hook member elastic member 64 is possible. In addition, in the aspect, the tip end of the holding projection 62 is formed on a hemispherical surface to make the insertion easy.

In addition, in the holding projection 62, a long hole 62a which penetrates the holding projection 62 is provided in the direction orthogonal to the direction in which the two engagement hooks 60 are aligned. The long hole 62a is a long hole which is long in the standing direction of the engagement hook 60, and is short in the direction in which the two engagement hooks 60 are aligned. As will be described later, the pin 65 passes through the long hole 62a.

The shape of the long hole 62a in the penetrating direction is illustrated in FIG. 11B. As can be ascertained from the drawing, the long hole 62a becomes the narrowest at the center in the penetrating direction, and the diameter of the long hole 62a expands to be inclined (to have a tapered shape) so that the hole widens when approaching both ends in the penetrating direction across the entire circumference of the long hole 62a. Accordingly, as will be described later, smooth swing of the hook member 59 is achieved.

Here, in the hook member 59 which will be described later, the size (thickness) of the linking piece 61 illustrated by A in FIG. 11B, is formed to be smaller than the width of the groove 57a illustrated by B in FIG. 9B, from the viewpoint that the linking piece 61 swings being disposed on the inner side of the groove 57a of the tip end member 55 illustrated in FIG. 9B. In addition, the holding projection 62 has the thickness by which insertion into the hole 56a of the tip end member 55 is possible, and the swing on the inner side of the hole 56a is possible.

Returning to FIG. 5, another configuration provided in the shaft member 50 will be described. The rotating shaft elastic member 63 and the hook member elastic member 64 are so-called elastic members, and are made of the coiled spring in the aspect. In addition, the pin 65 is one rod-like member which configures the rotating force transmission member 54. The dispositions and the actions of each member will be described later.

A material which configures each member of the shaft member 50 is not particularly limited, but a resin, such as polyacetal, polycarbonate, or PPS, can be used. However, in order to improve rigidity of the member, glass fibers or the carbon fiber may be mixed into the resin in accordance with the load torque. In addition, by inserting metal into the resin, the rigidity may further be improved, or the entire body may be made of metal. In a case where the metal is used, it is possible to use scraping by cutting, aluminum die cast, zinc die cast, a metal powder injection molding method (so-called MIM method), or a metal powder sintering lamination method (so-called 3D print). In addition, regardless of the quality of material of metal, iron, stainless steel, aluminum, brass, copper, zinc, or an alloy of these materials, may be used. In addition, it is possible to improve functionality (lubricative properties or corrosion resistance) on the front surface by performing various types of plating.

In addition, from the viewpoint of having elasticity, the shaft member 50 and the hook member 59 included in the shaft member 50, may be made by bending a metal plate, or may be made by making the metal, glass, or carbon fiber infiltrate into the resin.

By combining the bearing member 40 and the shaft member 50 with each other as described above, the end member 30 is made. In addition, by describing the combination, the size of each member and part, the structure, or the relationship of the sizes of the members and parts, are further understood.

Figure 12A:
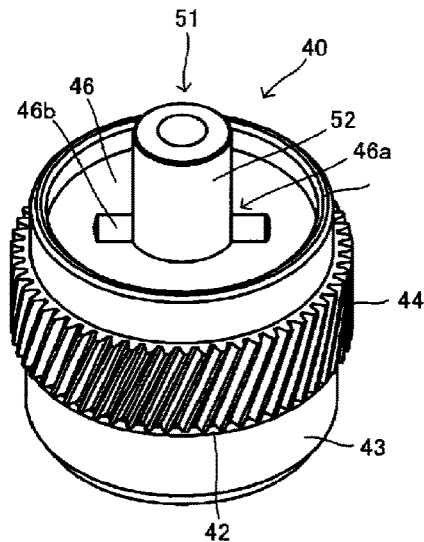
FIG. 12A is a perspective view of the bearing member 40 and the rotating shaft 51 being combined with each other.

First, a combination between the bearing member 40 and the rotating shaft 51 will be described. FIG. 12A is a perspective view in which the rotating shaft 51 is combined with the bearing member 40, FIG. 12B is a plan view thereof, and FIG. 12C is an arrow sectional view illustrated by XIIc-XIIc in FIG. 12B.

Figure 12B:
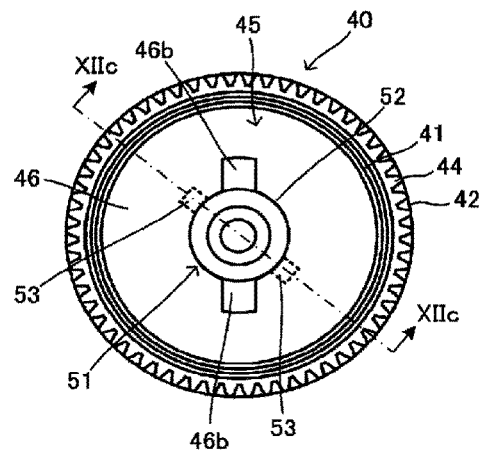
FIG. 12B is a plan view of the bearing member 40 and the rotating shaft 51 being combined with each other.
Figure 12C:
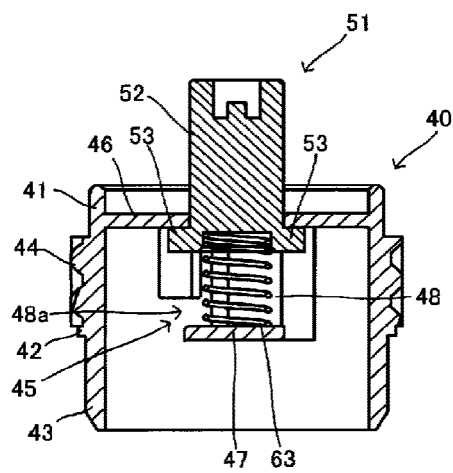
FIG. 12C is a sectional view of the bearing member 40 and the rotating shaft 51 being combined with each other.

As can be ascertained from FIGS. 12A to 12C, the rotating shaft 51 passes through the hole 46a of the rotating shaft holding member 46 of the bearing member 40, an end portion on the side on which the projection 53 is disposed is included in the shaft member holding portion 45, and an end portion on an opposite side is disposed to protrude from the bearing member 40. At this time, the projection 53 is disposed in the end portion on the side blocked by the rotating shaft holding member 46 in the end portion of the slit 48a provided in the guide wall 48, and the rotating shaft 51 is configured not to fall out of the bearing member 40 as being hooked to the rotating shaft holding member 46.

As can be ascertained from FIG. 12C, the rotating shaft elastic member 63 is disposed between the rotating shaft 51 and the support member 47, and the rotating shaft 51 is biased in the direction in which the projection 53 is pressed to the rotating shaft holding member 46. In addition, since a side surface of the projection 53 can be hooked to a slit wall surface of the slit 48a, the projection 53 is hooked to the slit wall surface of the slit 48a, and transmits the rotating force, during the rotation of the rotating shaft 51.

The attachment of the bearing member 40 and the rotating shaft 51 can be performed by inserting the projection 53 of the rotating shaft 51 into the slit 48a from the slit 46b, and by moving the projection 53 in the slit 48a along a dotted line illustrated in FIGS. 7A and 7B.

Next, the combination of another member to the rotating shaft 51 in the shaft member 50, will be described. FIGS. 13A and 13B are views illustrating this. FIG. 13A is an exploded perspective view, and FIG. 13B is a sectional view of the shaft member 50 in the direction along the axis.

As can be ascertained from FIG. 13B, the hook member elastic member 64 is disposed on the inner side of the recessed portion 52a of the main body 52 of the rotating shaft 51. At this time, one end of the hook member elastic member 64 is fixed to be inserted into the holding projection 52b.

As can be ascertained from FIG. 13B, the tip end member 55 is fixed to be disposed to overlap the surface of the base portion 56 of the tip end member 55, on the end surface on the side on which the recessed portion 52a of the rotating shaft 51 is provided. A fixing method is not particularly limited, and a known method using the adhesive or solvent can be used. The tip end member 55 and the rotating shaft 51 may be integrally formed. In addition, at this time, the axis of the main body 52 of the rotating shaft 51 and the axis (center of the hole 56a) of the tip end member 55, are positioned to match each other.

In addition, the holding projection 62 of the hook member 59 is inserted into the hole 56a of the tip end member 55, and the linking piece 61 of the hook member 59 is inserted into the groove 57a of the tip end member 55. At this time, the tip end of the holding projection 62 is fixed to be inserted into the hook member elastic member 64. In addition, the pin 65 passes through the hole 57c of the tip end member 55 and the long hole 62a of the hook member 59, and the hook member 59 is linked to the tip end member 55.

By the combination described above, the axes of each of the bearing member 40 and the shaft member 50 are disposed to match each other.

Figure 14:
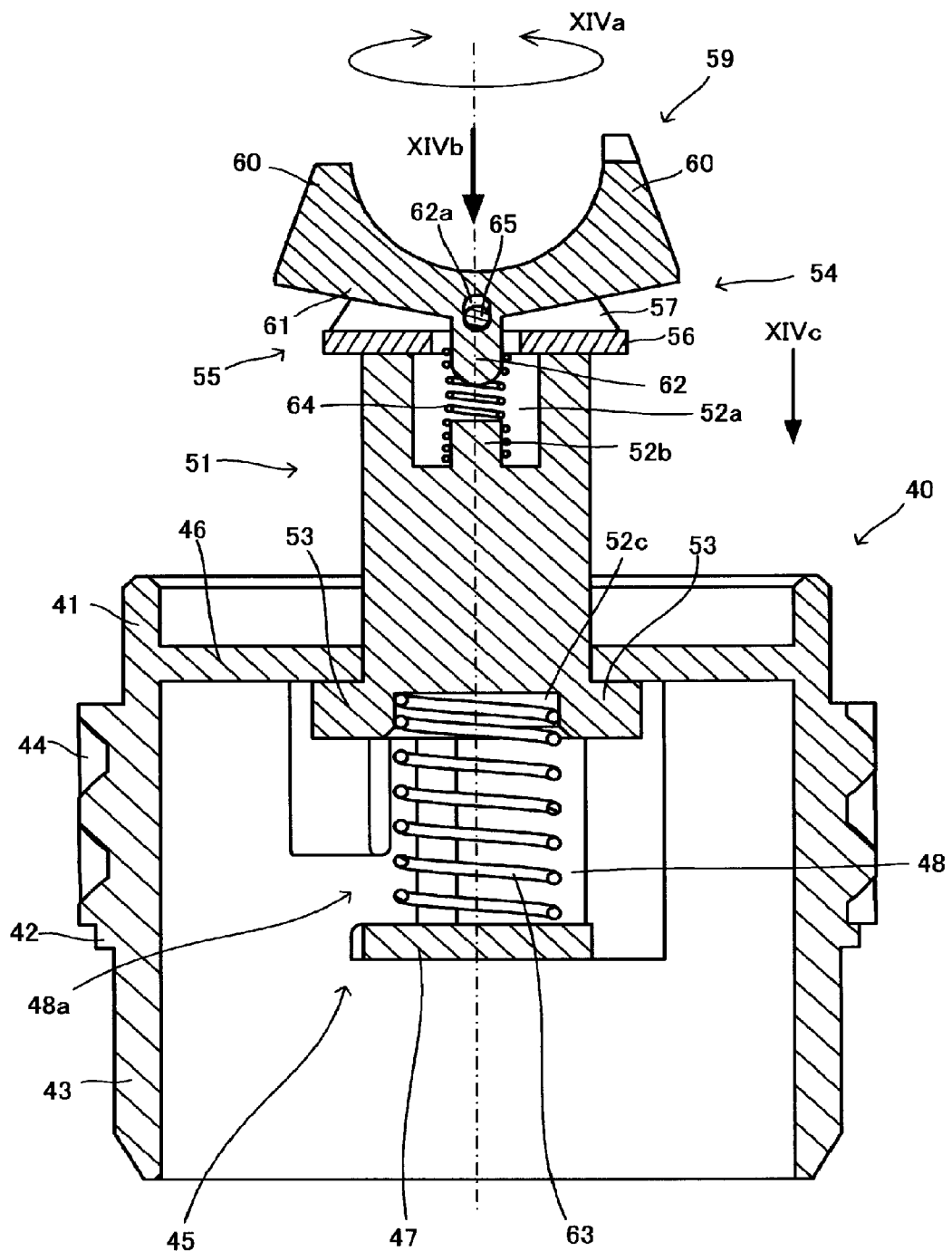
FIG. 14 is a sectional view of the end member 30.

Next, how the end member 30 combined as described above can be deformed, move, and rotate, will be described. FIG. 14 is a sectional view in the direction along the axis in one posture of the end member 30.

In the posture illustrated in FIG. 14, by the rotating shaft elastic member 63, a posture in which the entire shaft member 50 protrudes the most from the bearing member 40 within a possible range, is achieved. When any external force is not applied to the shaft member 50, the end member 30 has this posture.

In this posture, as can be ascertained from FIG. 14, since the linking piece 61 of the hook member 59 is inserted into the groove 57a of the tip end member 55, when the rotating force is applied to the engagement hook 60 of the hook member 59 as illustrated by XIVa in FIG. 14, the hook member 59 is hooked to the holding member 57 of the tip end member 55, or the pin 65 is hooked to the side surface of the long hole 62a, and the rotating force is transmitted. In any aspect, it is possible to appropriately set whether the rotating force is transmitted. In addition, the rotating force is transmitted to the rotating shaft 51, and further, the projection 53 of the rotating shaft 51 presses the slit wall of the slit 48a, and the rotating force is transmitted to the bearing member 40. Therefore, the entire end member 30 rotates by the rotating force received by the engagement hook 60.

In addition, as illustrated by an arrow XIVb in FIG. 14, when a pressing force acts to the hook member 59 toward the bearing member 40 side in the axial direction, the pressing force is transmitted to the tip end member 55 and the rotating shaft 51, and the entire shaft member 50 moves in the direction of being pressed to the bearing member 40 as illustrated by XIVc in FIG. 14 against the biasing force of the rotating shaft elastic member 63.

Figure 15A:
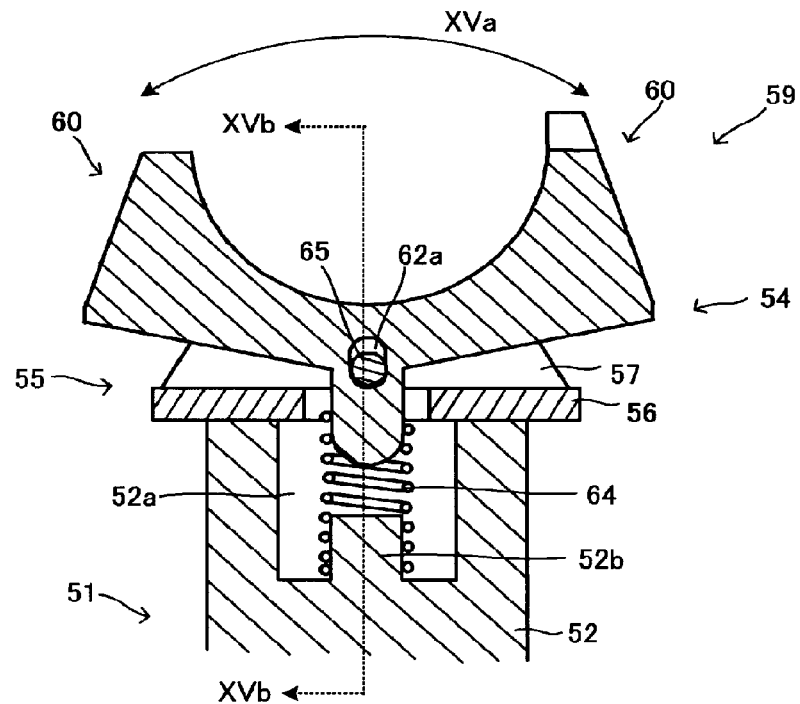
FIG. 15A is a sectional view focusing on the vicinity of a rotating force transmission member 54 in a sectional view of the end member 30.
Figure 15B:
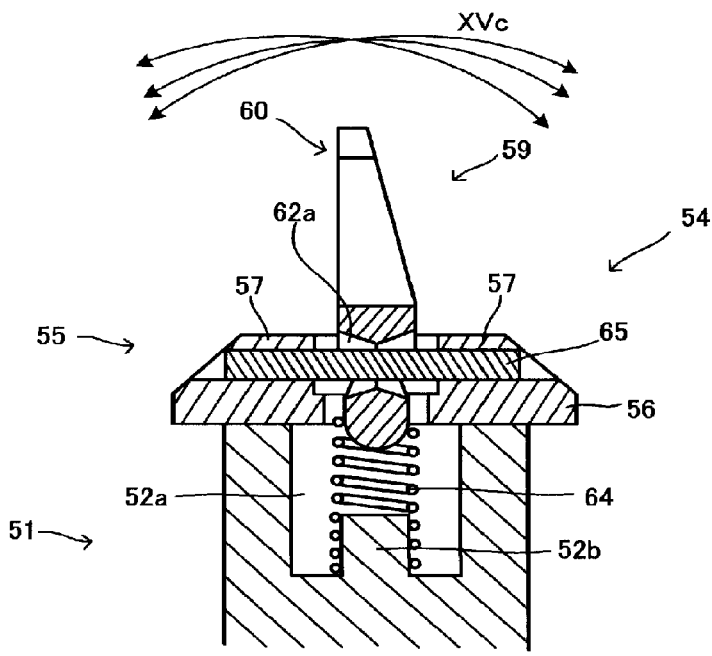
FIG. 15B is another sectional view focusing on the vicinity of the rotating force transmission member 54 in the end member 30.

FIGS. 15A and 15B are enlarged views illustrating the vicinity of the rotating force transmission member 54. FIG. 15A is a view from the same viewpoint as that of FIG. 14, and FIG. 15B is an arrow sectional view from by XVb-XVb in FIG. 15A. When the external force is not applied, the hook member 59 holds the postures illustrated in FIGS. 14, 15A, and 15B by the hook member elastic member 64.

Meanwhile, as the external force is applied, the swing around the pin 65 is possible as illustrated by an arrow XVa in FIG. 15A against an elastic force of the hook member elastic member 64.

Furthermore, as the external force is applied, the hook member 59 can swing in all orientations other than the swing around the pin 65 as illustrated by an arrow XVc in FIG. 15B against the elastic force of the hook member elastic member 64. This is because the long hole 62a of the holding projection 62 is a long hole, and the diameter of the long hole 62a expands (in a tapered shape) to be inclined across the entire both end portions in the penetrating direction.

Therefore, the hook member 59 can swing in all orientations around the axis. In addition, in the aspect, the hook member elastic member 64 is an aspect of a compression spring, but not being limited thereto, may be an aspect of an extension spring.

In addition, in the aspect, the pin 65 which is the shaft of the rotation of the hook member 59 is disposed on the outer side of the bearing member 40. Accordingly, since the swing of the hook member 59 is not restricted by the bearing member 40, a degree of freedom of the shape of the hook member 59 is increased, and more smooth swing is possible.

Furthermore, in the end member 30 of the aspect, while the movement of the shaft member 50 in the axial direction is regulated by the rotating shaft elastic member 63, the hook member elastic member 64 controls the swing of the hook member 59, and the movement and the swing can be designed independently from each other. Therefore, from the related viewpoint, it is possible to improve the degree of freedom of design. In addition, when the swing of the hook member 59 is controlled, it is possible to compactly design since it is not necessary to have a function of regulating the movement in the axial direction, and to improve the degree of freedom of design when disposition is performed in a limited space.

As the end member 30 is illustrated in FIG. 3 (refer to FIG. 17 as well), the fitting portion 43 of the end member 30 is inserted and adheres to one end portion of the photoreceptor drum 11. In addition, it is possible to dispose the lid material 20 in the other end portion of the photoreceptor drum 11, and to consider this as the photoreceptor drum unit 10.

Next, the apparatus main body 2 will be described. In the aspect, the apparatus main body 2 is a main body of a laser printer. In the laser printer, when the above-described process cartridge 3 operates in a posture of being mounted and an image is formed, the photoreceptor drum 11 rotates, and charging is performed by the charging roller unit. In this state, the photoreceptor drum 11 is irradiated with the laser light that corresponds to the image information by using various optical members provided here, and the electrostatic latent image based on the image information is obtained. The latent image is developed by the developing roller unit.

Meanwhile, the recording medium, such as a paper sheet, is set in the apparatus main body 2, and is transported to a transfer position by a sending roller and a transporting roller which are provided in the apparatus main body 2. A transfer roller 1a (refer to FIG. 2) is disposed at the transfer position, the voltage is applied to the transfer roller 1a in accordance with the passage of the recording medium, and the image is transferred to the recording medium from the photoreceptor drum 11. After this, as the heat and the pressure are applied to the recording medium, the image is fixed to the recording medium. In addition, the recording medium on which the image is formed is discharged from the apparatus main body 2 by the discharge roller or the like.

In this manner, in a posture in which the process cartridge 3 is mounted, the apparatus main body 2 imparts the rotation driving force to the photoreceptor drum unit 10. In addition, in a posture in which the process cartridge 3 is mounted, how to impart the rotation driving force to the photoreceptor drum unit 10 from the apparatus main body 2 will be described.

Figure 16A:
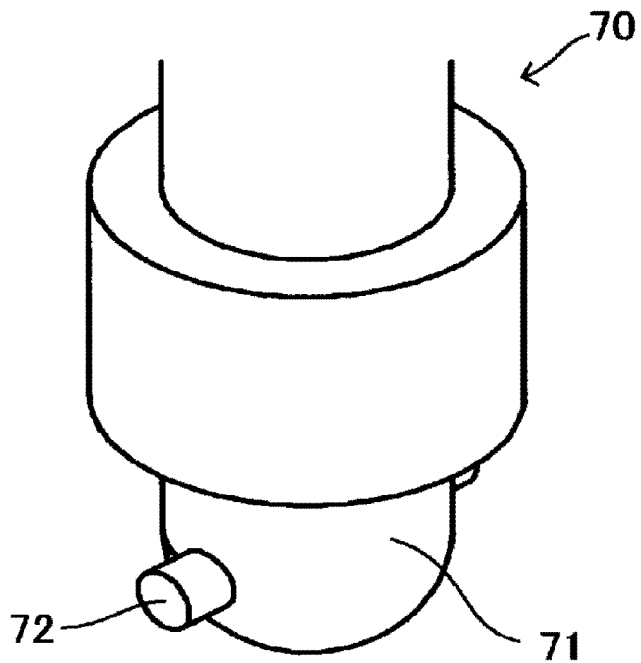
FIG. 16A is a perspective view of a driving shaft 70.
Figure 16B:
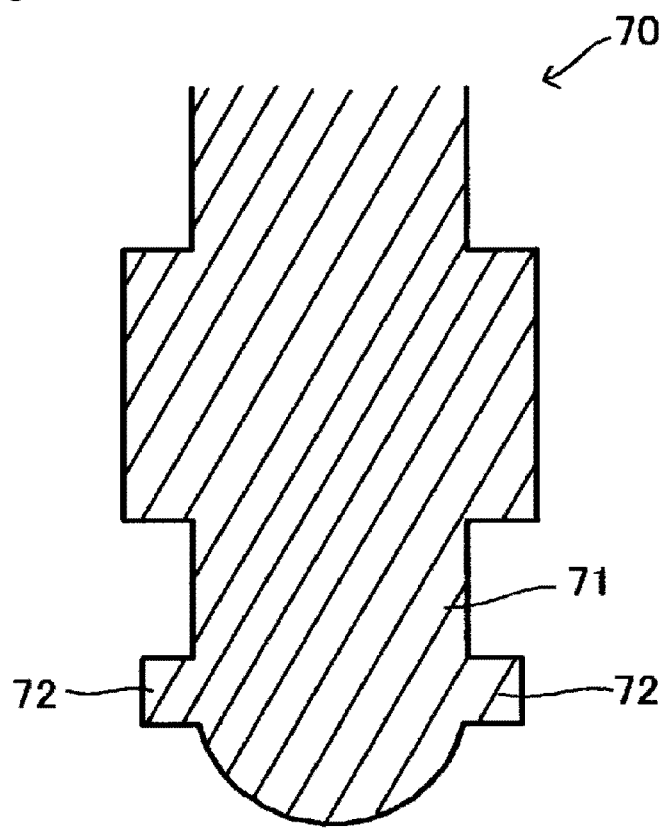
FIG. 16B is a sectional view of the driving shaft 70.

The rotation driving force to the process cartridge 3 is imparted by the driving shaft 70 which functions as a rotating force imparting portion of the apparatus main body 2. FIG. 16A illustrates a perspective view of a shape of the tip end portion of the driving shaft 70. In addition, FIG. 16B illustrates a sectional view along the axial direction of the driving shaft 70. As can be ascertained from the drawings, the driving shaft 70 is configured to include a shaft portion 71 and the rotating force transmission projection 72.

The shaft portion 71 is a shaft member which rotates around the axis. The tip end of the shaft portion 71 has the size by which disposition between the above-described two engagement hooks 60 of the hook member 59 of the shaft member 50 is possible.

In addition, it is preferable that an angle portion of the tip end surface of the shaft portion 71 is removed, and so-called rounding is performed. In the aspect, the tip end surface has a semi-spherical shape. Accordingly, the engagement between the driving shaft 70 and the shaft member 50 is more smoothly performed.

On the side opposite to the tip end side illustrated in FIG. 16A in the shaft portion 71, a gear train is formed so that the shaft portion 71 can be rotated around the axis, and the shaft portion 71 is connected to a motor which is a driving source via the gear train.

The rotating force transmission projections 72 are two projections which are provided to be close to the tip end of the shaft portion 71, and protrude in the direction orthogonal to the axis of the shaft portion 71. The two rotating force transmission projections 72 are aligned on one diameter direction of the section orthogonal to the axis of the shaft portion 71.

Here, the shaft portion 71 of the driving shaft 70 is disposed to protrude substantially perpendicular to the moving direction for attaching and detaching the process cartridge 3 illustrated by I in FIG. 1 to and from the apparatus main body 2. According to this, the shaft portion 71 only rotates without moving in the axial direction. Therefore, in the attachment and detachment of the process cartridge 3, it is necessary to mount and disengage the shaft member 50 to and from the driving shaft 70. In addition, according to the above-described end member 30, the mounting and disengaging of the shaft member 50 and the driving shaft 70 to and from the each other is simple. Specific aspect of the attachment and detachment will be described later.

Figure 17:
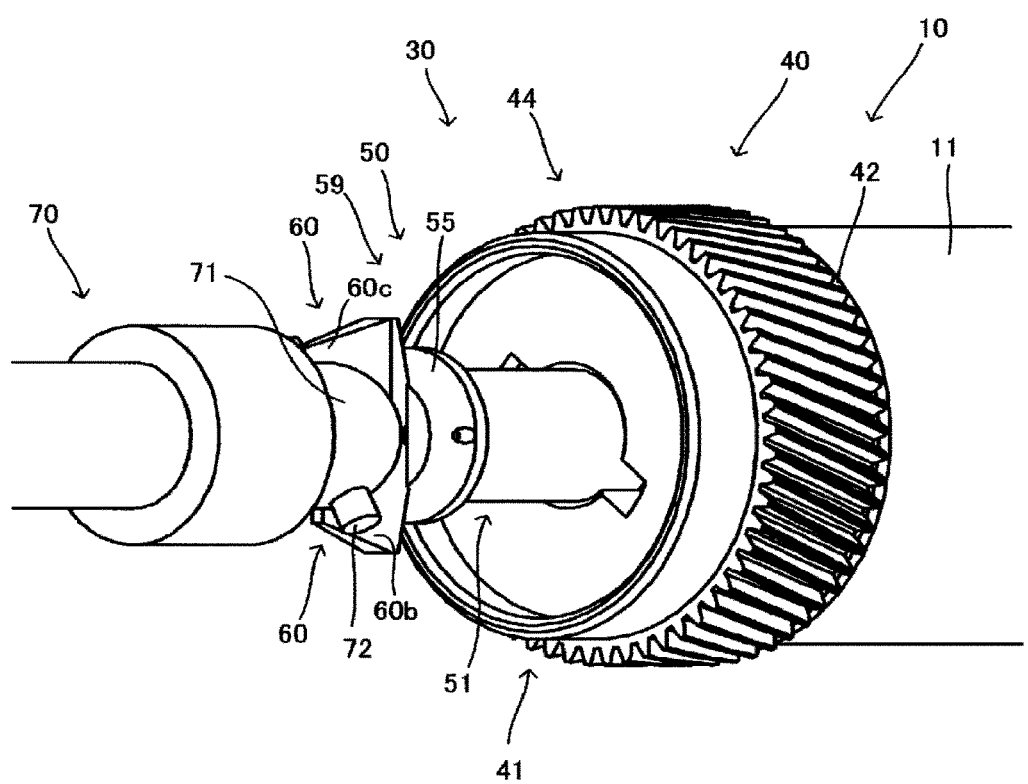
FIG. 17 is a perspective view of a situation in which the driving shaft 70 and the end member 30 are engaged with each other.

In a posture in which the process cartridge 3 is mounted on the apparatus main body 2, the driving shaft 70 and the hook member 59 provided in the shaft member 50 of the end member 30 are engaged with each other, and the rotating force is transmitted. FIG. 17 illustrates a situation in which the hook member 59 of the end member 30 is engaged with the driving shaft 70.

As can be ascertained from FIG. 17, in a posture in which the driving shaft 70 and the hook member 59 are engaged with each other, the axis of the driving shaft 70 and the axis of the shaft member 50 are disposed to face to match each other. At this time, the tip end of the shaft portion 71 of the driving shaft 70 is put into between the two engagement hooks 60 of the hook member 59, and the rotating force transmission projection 72 of the driving shaft 70 is engaged to be hooked to the first side surface 60b which is the side surface of the engagement hook 60. Accordingly, the hook member 59 rotates following the rotation of the driving shaft 70, and the end member 30 and the photoreceptor drum 11, that is, the photoreceptor drum unit 10, rotate.

Next, an example of operations of the driving shaft 70 when mounting the process cartridge 3 is mounted on the apparatus main body 2 and a posture of FIG. 17 is achieved, and the photoreceptor drum unit 10, will be described. FIGS. 18A to 19C illustrate this. FIGS. 18A to 19C illustrate views following an order of a process of engaging the driving shaft 70 with the hook member 59.

Figure 18A:
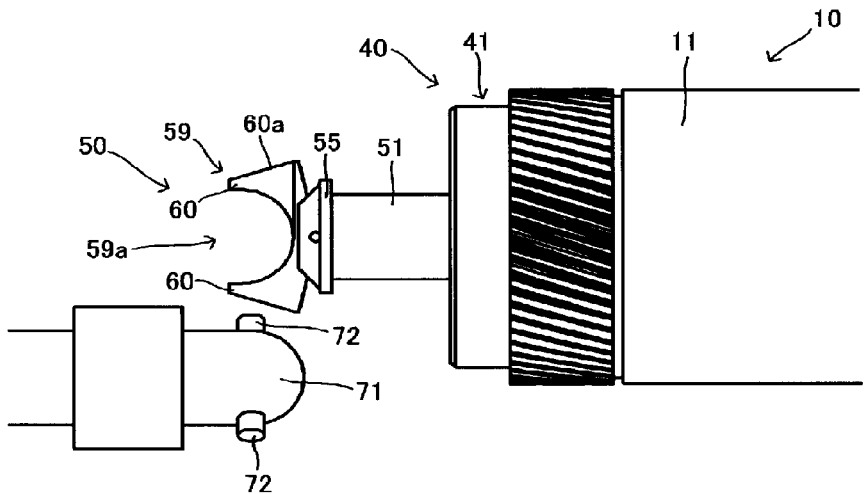
FIG. 18A is a view illustrating a situation in which the driving shaft 70 and the photoreceptor drum unit 10 are engaged with each other.
Figure 18B:
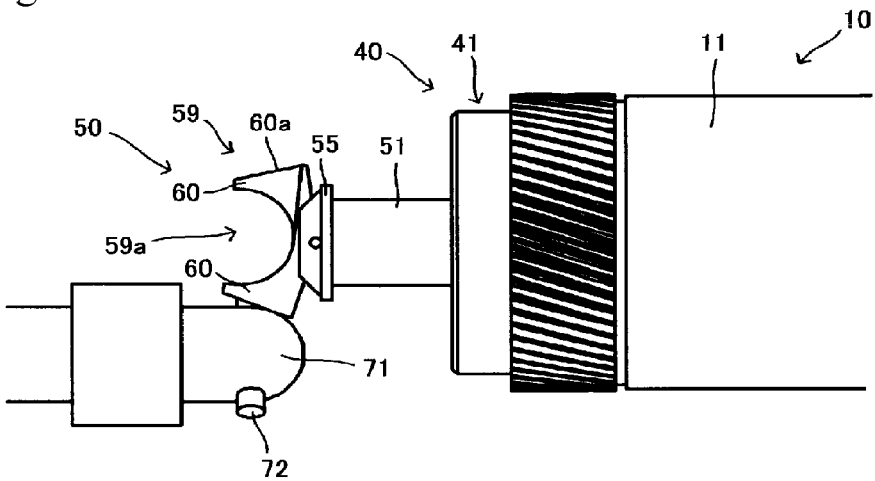
FIG. 18B is a view illustrating another situation in which the driving shaft 70 and the photoreceptor drum unit 10 are engaged with each other.

First, as illustrated in FIG. 18B from a state illustrated in FIG. 18A, the photoreceptor drum unit 10 approaches the driving shaft 70 from the direction orthogonal to the axial direction of the driving shaft 70. At this time, in the photoreceptor drum unit 10, the end member 30 is oriented toward the driving shaft 70 side, and the axis thereof is oriented to become parallel to the axis of the driving shaft 70, and the photoreceptor drum unit 10 approaches the driving shaft 70 while moving in the direction orthogonal to the axis. At this time, the shaft member 50 is in a posture illustrated in FIG. 14.

Figure 18C:
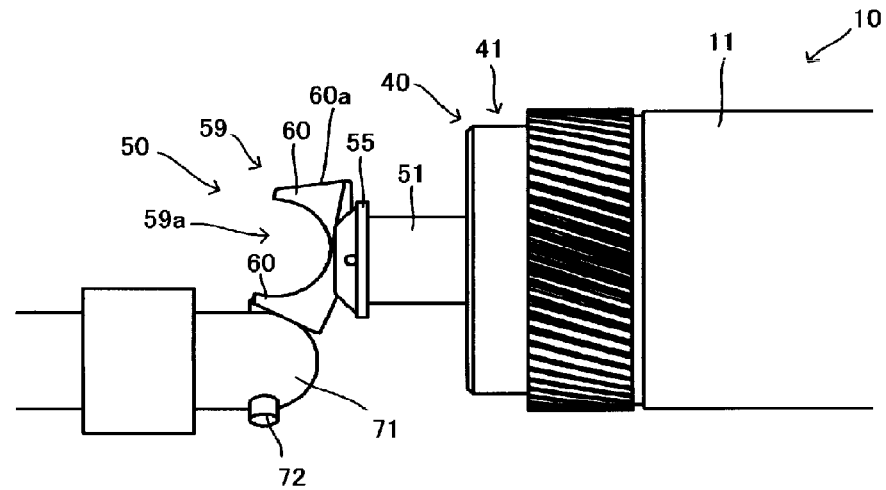
FIG. 18C is a view illustrating another situation in which the driving shaft 70 and the photoreceptor drum unit 10 are engaged with each other.

In a situation illustrated in FIG. 18B, the driving shaft 70 comes into contact with the inclined surface 60a (refer to FIG. 10A) of the engagement hook 60, and the hook member 59 swings around the pin 65 as illustrated in FIG. 18C when the photoreceptor drum unit 10 approaches the driving shaft 70 (refer to FIG. 15A).

Figure 19A:
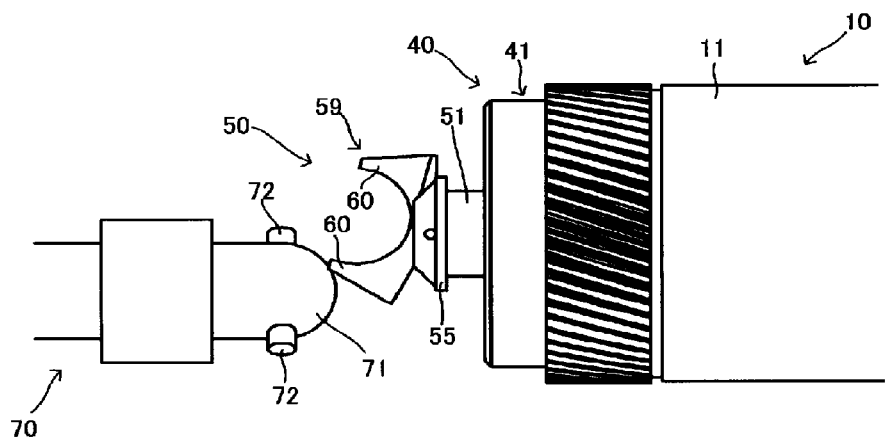
FIG. 19A is a view illustrating a situation in which the driving shaft 70 and the photoreceptor drum unit 10 are engaged with each other.

Furthermore, when the photoreceptor drum unit 10 approaches the driving shaft 70, the tip end of the shaft portion 71 of the driving shaft 70 slides on the inclined surface 60a of the engagement hook 60 which is formed to be inclined (in a tapered shape). At this time, as the inclined surface 60a is the inclined surface (tapered surface), a component of force is generated in the direction of pressing the shaft member 50, and the shaft member 50 moves in the axial direction to be pushed toward the bearing member 40 as illustrated in FIG. 19A (refer to FIG. 14). As the hook member 59 largely swings, the apparent inclination angle of the inclined surface 60a viewed from the shaft member 50 increases, the component of force of pressing the shaft member in the axial direction becomes strong, and thus, smooth engagement is possible.

Figure 19B:
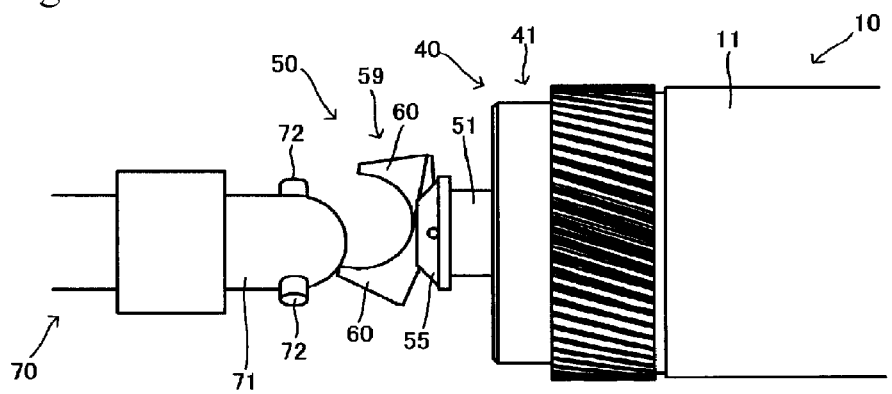
FIG. 19B is a view illustrating another situation in which the driving shaft 70 and the photoreceptor drum unit 10 are engaged with each other.
Figure 19C:
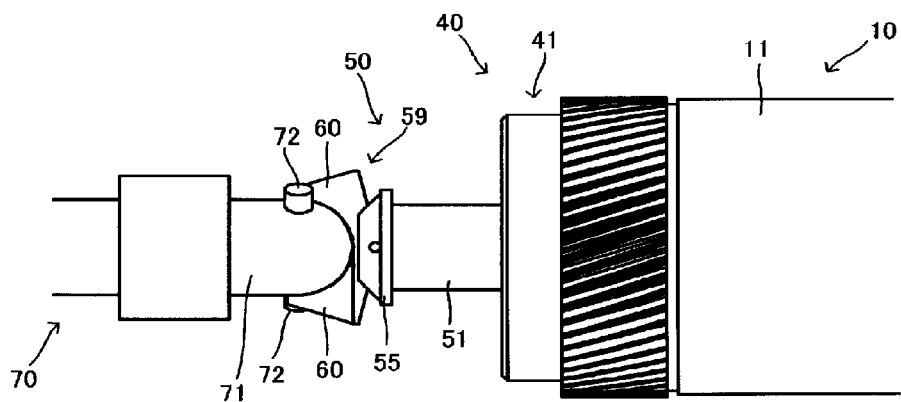
FIG. 19C is a view illustrating another situation in which the driving shaft 70 and the photoreceptor drum unit 10 are engaged with each other.

In addition, as illustrated in FIGS. 19B and 19C, the shaft portion 71 of the driving shaft 70 is embedded between the two engagement hooks 60 (recessed portion 59a) exceeding the engagement hook 60 (refer to FIG. 10B). Accordingly, a posture illustrated in FIG. 17 is achieved finally, and it is possible to transmit the rotation driving force from the driving shaft 70 to the photoreceptor drum 11.

Figure 20A:
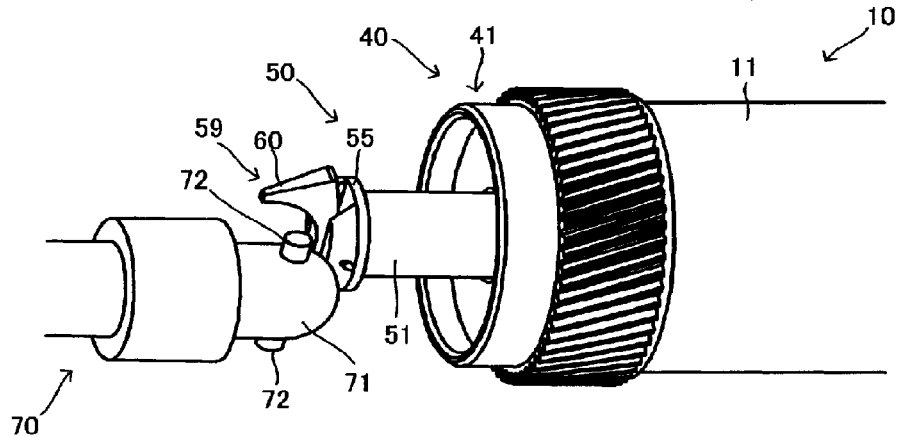
FIG. 20A is a view illustrating a situation in which the driving shaft 70 and the photoreceptor drum unit 10 are engaged with each other.
Figure 20B:
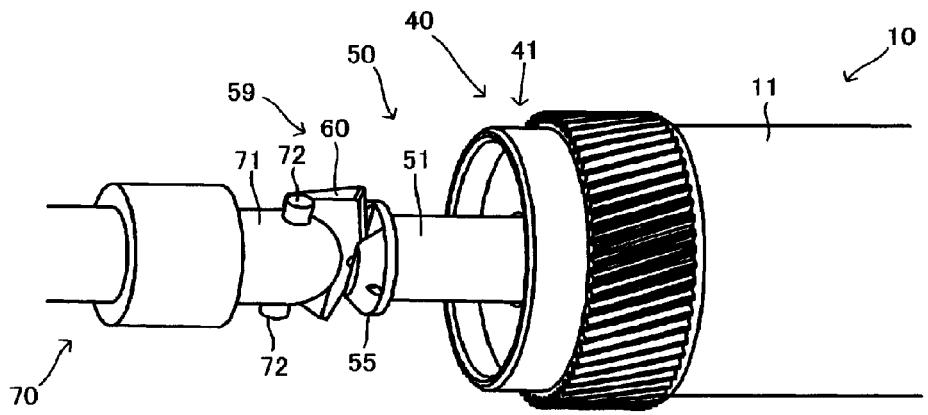
FIG. 20B is a view illustrating another situation in which the driving shaft 70 and the photoreceptor drum unit 10 are engaged with each other.
Figure 20C:
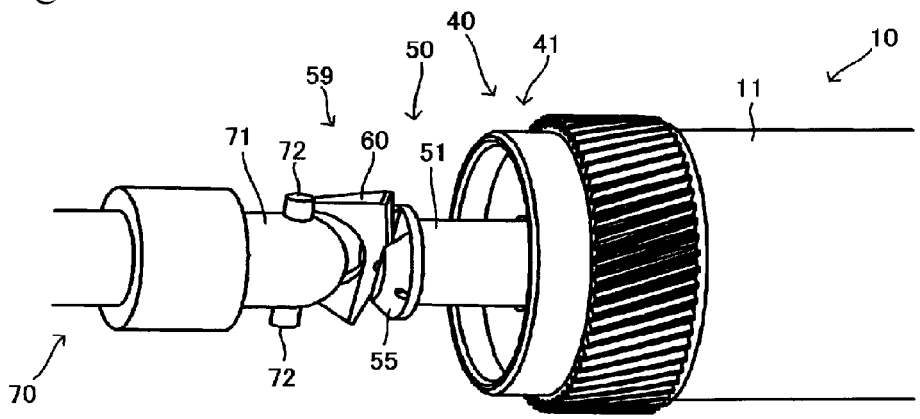
FIG. 20C is a view illustrating another situation in which the driving shaft 70 and the photoreceptor drum unit 10 are engaged with each other.

Meanwhile, in a positional relationship between the driving shaft 70 and the engagement hook 60 of the hook member 59, a case where the shaft portion 71 of the driving shaft 70 is in contact with the engagement hook 60 from the first side surface 60b and the second side surface 60c side of the engagement hook 60. At this time, the engagement is performed as follows. FIGS. 20A to 20C are views illustrating this. In FIGS. 20A to 20C illustrate views following an order of a process of engaging the driving shaft 70 with the hook member 59.

First, as illustrated in FIG. 20B from the state illustrated in FIG. 20A, the photoreceptor drum unit 10 approaches the driving shaft 70 from the direction orthogonal to the axial direction of the driving shaft 70. At this time, in the photoreceptor drum unit 10, the end member 30 is oriented toward the driving shaft 70 side, and the axis thereof is oriented to become parallel to the axis of the driving shaft 70, and the photoreceptor drum unit 10 approaches the driving shaft 70 while moving in the direction orthogonal to the axis. At this time, the shaft member 50 is in a posture illustrated in FIG. 14.

When the driving shaft 70 approaches the shaft member 50 from a state illustrated in FIG. 20A, the tip end of the shaft portion 71 of the driving shaft 70 moves to slide on the inclined surface 57b of the tip end member 55. At this time, since the inclined surface 57b is achieved, the shaft portion 71 of the driving shaft 70 can smoothly move. In addition, as the driving shaft 70 and the shaft member 50 further approach each other, in a situation illustrated in FIG. 20B, one rotating force transmission projection 72 of the driving shaft 70 comes into contact with the first side surface 60b (refer to FIG. 11A) of one engagement hook 60. When the photoreceptor drum unit 10 approaches the driving shaft 70, as the first side surface 60b and/or the second side surface 60c of the engagement hook are pressed, the hook member 59 moves on a surface in the direction in which the pin 65 extends (refer to FIG. 15B). At this time, the component of force of pressing the shaft member 50 is generated, and the shaft member 50 moves in the axial direction to be pressed toward the bearing member 40. In addition, as the hook member 59 largely swings, the apparent inclination angle of the inclined surface 60a viewed from the rotating shaft 51 increases, the component of force of pressing the shaft member in the axial direction becomes strong, and thus, smooth engagement is possible.

When the photoreceptor drum unit 10 further approaches the driving shaft 70 from a posture of FIG. 20B, the axis of the driving shaft 70 and the axis of the shaft member 50 match each other. However, at this point of time, the engagement hook 60 is in a swing posture, and both of the two rotating force transmission projections 72 of the driving shaft 70 are in a state of being on one of the two engagement hooks 60. Therefore, while maintaining this state, a posture in which the rotating force from the driving shaft 70 can be transmitted, is not achieved.

From this posture, the driving shaft 70 starts to rotate for the driving transmission. Accordingly, as illustrated in FIG. 20C, one engagement hook 60 is pressed to one of the two rotating force transmission projections 72, and the hook member 59 more largely swings. In addition, one rotating force transmission projection 72 which presses the engagement hook 60 by the rotation exceeds the engagement hook 60. Accordingly, a force of pressing the hook member 59 is eliminated, and the hook member 59 gets up from a swing posture. Accordingly, a posture illustrated in FIG. 17 is achieved, and the rotating force is transmitted.

As described above, it is possible to mount the process cartridge 3 on the apparatus main body 2 by pushing the process cartridge 3 from the direction different from the axial direction of the driving shaft 70 of the apparatus main body 2. Although detailed behaviors are different, based on the above-described structure of the end member 30, the disengagement is smoothly performed by the swing of the hook member 59, and the movement in the axial direction of the rotating shaft 51 by the component of force in the axial direction generated at this time.

In addition, according to the end member 30, since the member (hook member) which allows the engagement hook to swing and the member (rotating shaft) which moves the engagement hook in the axial direction are formed of different members, certainty of the operation is improved, and an end member having high reliability is achieved.

Furthermore, in the end member 30 of the aspect, while the movement of the shaft member 50 in the axial direction is regulated by the rotating shaft elastic member 63, the hook member elastic member 64 controls the swing of the hook member 59, and the movement and the swing can be designed independently from each other. Therefore, from the related viewpoint, it is possible to improve the degree of freedom of design. In addition, when the swing of the hook member 59 is controlled, it is possible to compactly design since it is not necessary to have a function of regulating the movement in the axial direction, and to improve the degree of freedom of design when disposition is performed in a limited space.

Figure 21A:
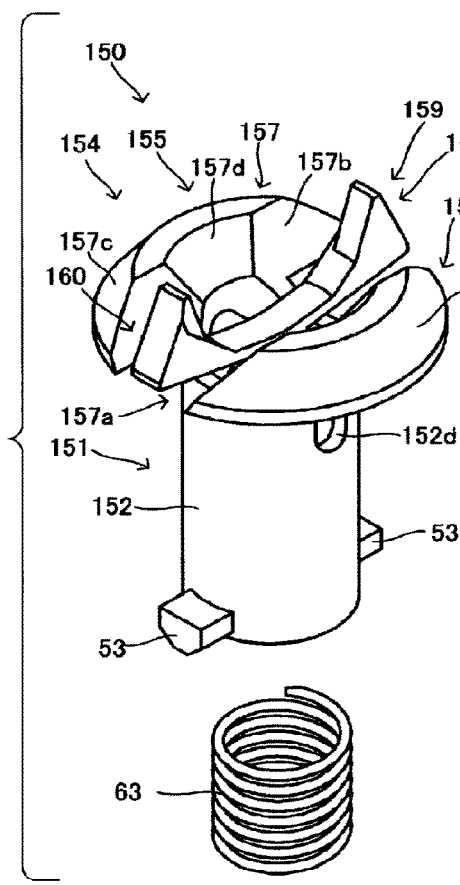
FIG. 21A is a perspective view of a shaft member 150.
Figure 21B:
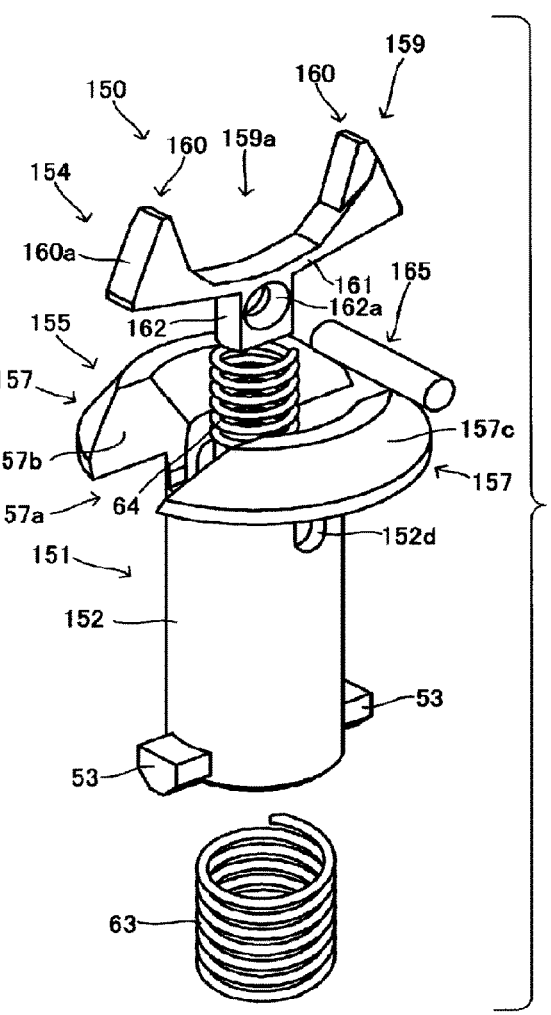
FIG. 21B is an exploded perspective view of the shaft member 150.

FIGS. 21A and 21B are views illustrating a second aspect. FIG. 21A is a perspective view of a shaft member 150 in the end member 130 (refer to FIG. 26) included in the second aspect, and FIG. 21B is an exploded perspective view of the shaft member 150. The end member included in the aspect is an aspect in which the bearing member 40 is the same as that of the end member 30 that has already been described, and is an example in which the shaft member 150 is employed instead of the shaft member 50. Therefore, the configuration of the bearing member 40 will be given the same reference numerals, and the description thereof will be omitted. Hereinafter, the shaft member 150 will be described.

As can be ascertained from FIGS. 21A and 21B, the shaft member 150 is provided with a rotating shaft 151 and a rotating force transmission member 154, and the rotating force transmission member 154 is configured to include a tip end member 155, a hook member 159, and a rod-like pin 165. Furthermore, the shaft member 150 is provided with the rotating shaft elastic member 63 and the hook member elastic member 64. Any of the rotating shaft elastic member 63 and the hook member elastic member 64 of the aspect is the coiled spring, and the same reference numerals as those in the first aspect are given.

Figure 22:
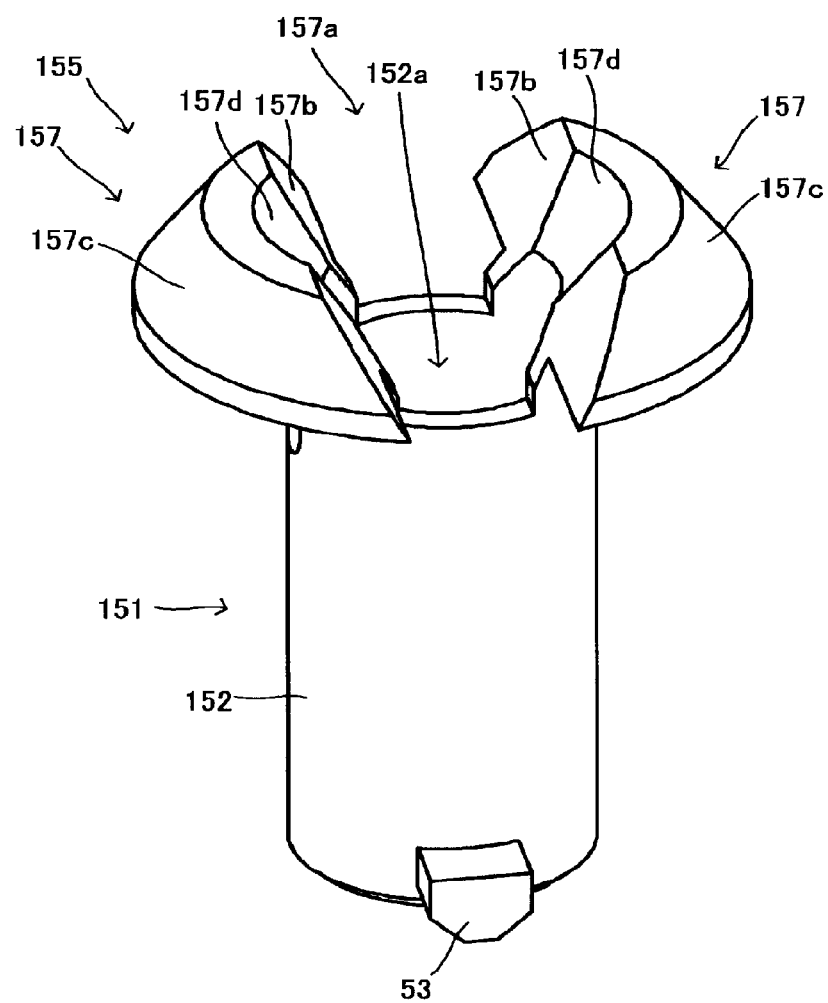
FIG. 22 is a perspective view of a rotating shaft 151 and a tip end member 155.
Figure 23A:
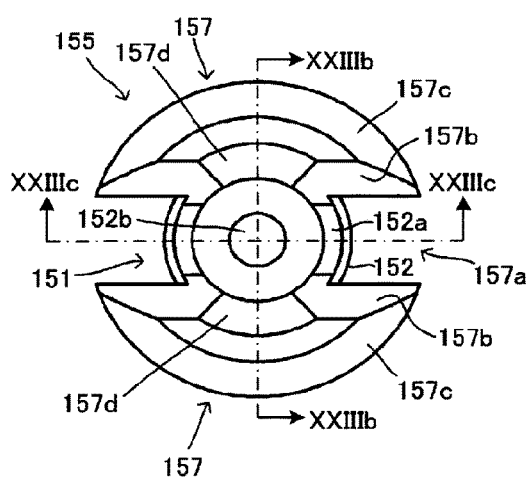
FIG. 23A is a plan view of the rotating shaft 151 and the tip end member 155.
Figure 23B:
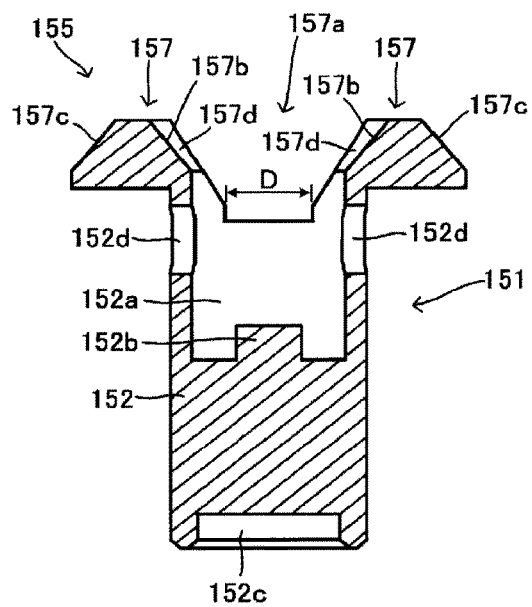
FIG. 23B is one sectional view of the rotating shaft 151 and the tip end member 155.
Figure 23C:
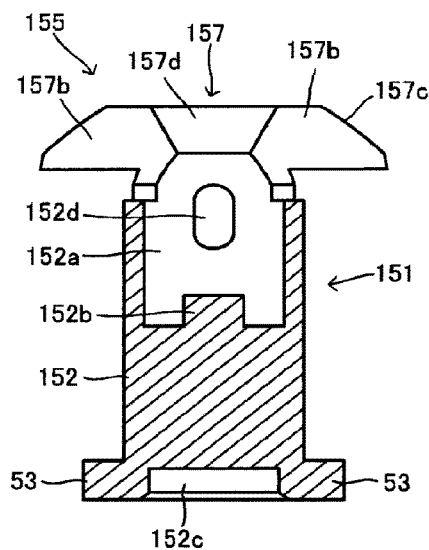
FIG. 23C is another sectional view of the rotating shaft 151 and the tip end member 155.

The rotating shaft 151 is a shaft-like member which transmits the rotating force received by the rotating force transmission member 154 to the bearing member 40. FIG. 22 is a perspective view of the rotating shaft 151, FIG. 23A is a plan view when viewed from a side on which the tip end member 155 is disposed in the rotating shaft 151, FIG. 23B is a sectional view along the axial direction including a line illustrated by XXIIIb-XXIIIb in FIG. 23A, and FIG. 23C is a sectional view along the axial direction including a line illustrated by XXIIIc-XXIIIc in FIG. 23A, respectively. In addition, in the aspect, since the tip end member 155 is integrally disposed in one end portion of the rotating shaft 151, and the tip end member 155 is also illustrated in the drawings.

As can be ascertained from FIGS. 22, and 23A to 23C, the rotating shaft 151 includes a columnar main body 152, and recessed portions 152a and 152c are respectively formed on columnar end surfaces.

The recessed portion 152a is a recessed portion which is formed on one end surface of the main body 152 of the rotating shaft 151, and one end side of the hook member elastic member 64 is inserted thereto. In addition, a holding projection 152b for fixing the hook member elastic member 64 is provided on a bottom portion of the recessed portion 152a. In the aspect, the hook member elastic member 64 is held as the holding projection 152b is inserted into the hook member elastic member 64.

The recessed portion 152c is a recessed portion which is formed on the other end surface of the main body 152 of the rotating shaft 151, that is, on an end surface opposite to the side on which the recessed portion 152a is formed. One end of the rotating shaft elastic member 63 is inserted into the recessed portion 152c, and one end of the rotating shaft elastic member 63 comes into contact with the bottom of the recessed portion 152c. Therefore, the recessed portion 152c is formed to have the size by which one end of the rotating shaft elastic member 63 can be inserted.

Two projections 53 are disposed in the end portion on the side on which the recessed portion 152c is disposed in the outer circumferential portion of the main body 152. Two projections 53 are the same as the projections 53 provided in the main body 52 of the above-described end member 30.

In addition, in the outer circumferential portion of the main body 152, in the end portion on a side on which the recessed portion 152a is disposed, a long hole 152d which penetrates the main body 152 is disposed in the diameter direction of the main body 152. The long hole 152d is a long hole which is long in the axial direction of the main body 152, and is short in the circumferential direction of the main body 152. As will be described later, the pin 165 passes through the long hole 152d. In the aspect, the long hole is employed, but it is not necessary to employ a long hole, and a circular hole or a hole having another shape may be employed.

The tip end member 155 is one member which configures the rotating force transmission member 154, and transmits the rotating force from the hook member 159 to the rotating shaft 151. FIGS. 22 and 23A to 23C illustrate the tip end member 155.

As can be ascertained from FIGS. 21A, 21B, 22, and 23A to 23C, the tip end member 155 in the aspect is configured to include two holding members 157 which are disposed on the end surface on the recessed portion 152a side of the main body 152 of the rotating shaft 151.

The holding members 157 are two members which are disposed on an end surface on the recessed portion 152a side of the main body 152 of the rotating shaft 151, and are disposed to include a predetermined void 157a nipping the axis of the main body 152 of the rotating shaft 151.

Therefore, the recessed portion 152*a* of the main body 152 communicates with the inside and the outside via the void 157*a*.

In addition, surfaces 157*b* and 157*d* which form a side wall of the void 157*a* of a holding member 157, are inclined surfaces (tapered surfaces) to be separated from each other as being separated from the rotating shaft 151. Here, among the surfaces 157*b* and 157*d*, the surfaces 157*b* are planes which are disposed at each of both ends in the direction in which the void 157*a* extends, and the surfaces 157*d* are curved surfaces which are disposed between two surfaces 157*b* and have a shape of an arc in the aspect.

In this manner, as the surfaces 157*b* and 157*d* are inclined surfaces, the swing of the hook member 159 is unlikely to be interrupted, and is smoothly performed as will be described later (refer to FIG. 27B). Furthermore, according to the example of FIG. 17, from the posture in which the driving shaft 70 of the apparatus main body 2 is engaged with the shaft member 150, since the tip end of the shaft portion 71 of the driving shaft 70 slides on the surfaces 157*b* and 157*d* when disengaging the driving shaft 70, and the component of force which presses the shaft member 150 in the axial direction is generated, the shaft member 150 can be moved in the axial direction (direction illustrated by an arrow XXVIc of FIG. 26). Accordingly, smooth disengagement of the driving shaft 70 can be performed.

Meanwhile, as a side surface other than a surface on which the void 157*a* is formed in the holding member 157 is separated from the rotating shaft 151, the inclined surface (tapered surface) 157*c* is formed to approach the axis of the rotating shaft 151. The inclined surface 157*c* acts similar to the inclined surface 57*b* of the holding member 57 which has already been described.

Figure 24A:
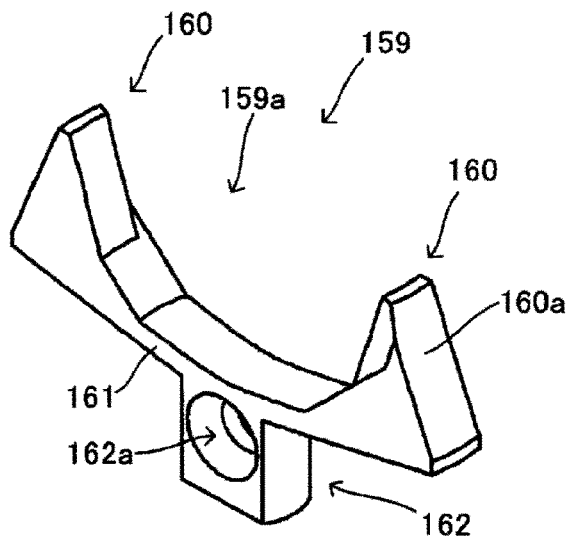
FIG. 24A is a perspective view of a hook member 159.
Figure 24B:
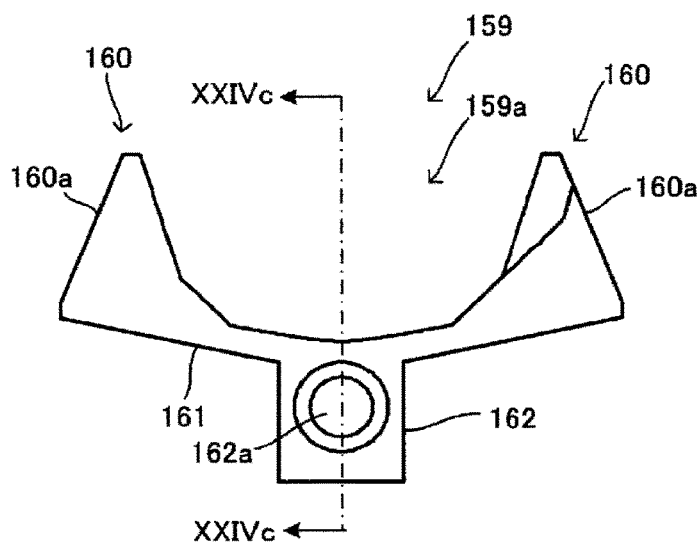
FIG. 24B is a front view of the hook member 159.
Figure 24C:
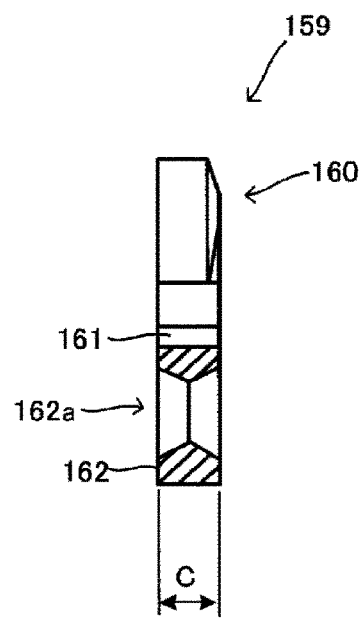
FIG. 24C is a sectional view of the hook member 159.

Returning to FIGS. 21A and 21B, the hook member 159 will be described. The hook member 159 is one member which configures the rotating force transmission member 154, and is a member which is engaged with the driving shaft 70 (refer to FIG. 16A) provided in the apparatus main body 2, and transmits the rotating force to the tip end member 155. FIGS. 24A to 24C are views illustrating this. FIG. 24A is a perspective view of the hook member 159, FIG. 24B is a front view of the hook member 159, and FIG. 24C is an arrow sectional view illustrated by XXIVc-XXIVc in FIG. 24B.

The hook member 159 includes two engagement hooks 160, and a linking piece 161 which links end portions of the two engagement hooks 160 to each other. In addition, on a side opposite to two engagement hooks 160 of the linking piece 161, a holding projection 162 is provided at a position which is the center between the two engagement hooks.

Two engagement hooks 160 are members which stand in the same direction from both end portions of the linking piece 161, and an interval between two engagement hooks 160 is formed so that the tip end of the shaft portion 71 of the driving shaft 70 (refer to FIG. 16A) enters the interval, and the rotating force transmission projection 72 of the driving shaft 70 is hooked to the engagement hook 160. In addition, in the aspect, two engagement hooks 160 are formed to become narrower according to the separation from the linking piece 161 as can be ascertained from FIG. 24B. More specifically, an opposing surface of two engagement hooks 160 includes a surface of the linking piece 161, and a recessed portion 159*a* is formed. In the aspect, an opposing surface of two engagement hooks 160 is formed in an inclined shape (tapered shape) to be separated according to the separation from the linking piece 161.

In addition, in two engagement hooks 160, the surfaces which are opposite to the recessed portion 159*a* arc inclined surfaces 160*a* to approach each other according to the separation from the linking piece 161. The inclined surface 160*a* acts similar to the inclined surface 60*a* of the engagement hook 60 which has already been described.

The holding projection 162 is a projection which is disposed at a position which is the center between two engagement hooks 160, on a surface opposite to the engagement hook 160 of the linking piece 161. As will be described later, the holding projection 162 is fixed to the hook member elastic member 64. In the aspect, since the holding projection 162 is inserted and fixed to the inner side from the end portion of the hook member elastic member 64, the holding projection 162 has the size by which insertion into the hook member elastic member 64 is possible.

In addition, in the holding projection 162, holes 162*a* which penetrate through the holding projection 162 are provided in the direction perpendicular to the direction in which two engagement hooks 160 are aligned. As will be described later, the pin 165 passes through the hole 162*a*.

A shape of the hole 162*a* in the penetrating direction is illustrated in FIG. 24C. As can be ascertained from the drawing, the hole 162*a* is the narrowest at the center in the penetrating direction, and the diameter of the hole expands to have an inclined shape (tapered shape) so that the hole widens when approaching both ends in the penetrating direction across the entire circumference of the hole 162*a*. Accordingly, smooth swing of the hook member 159 is achieved.

Here, in the hook member 159 which will be described later, the size (thickness) of the linking piece 161 illustrated by C in FIG. 24C, is formed to be smaller than the narrowest width of the void 157*a* illustrated by D in FIG. 23B, from the viewpoint that the linking piece 161 swings being disposed on the inner side of the void 157*a* of the tip end member 155 illustrated in FIG. 23B. In addition, the holding projection 162 is also formed to penetrate the void 157*a*.

By combining the bearing member 40 and the shaft member 150 with each other as described above, the end member 130 is made. In addition, by describing the combination, the size of each member and part, the structure, or the relationship of the sizes of the members and parts, are further understood. Here, since the combination between the bearing member 40 and the rotating shaft 151 is the same as that in the example of the end member 30 which has already been described, the description thereof will be omitted.

Figure 25A:
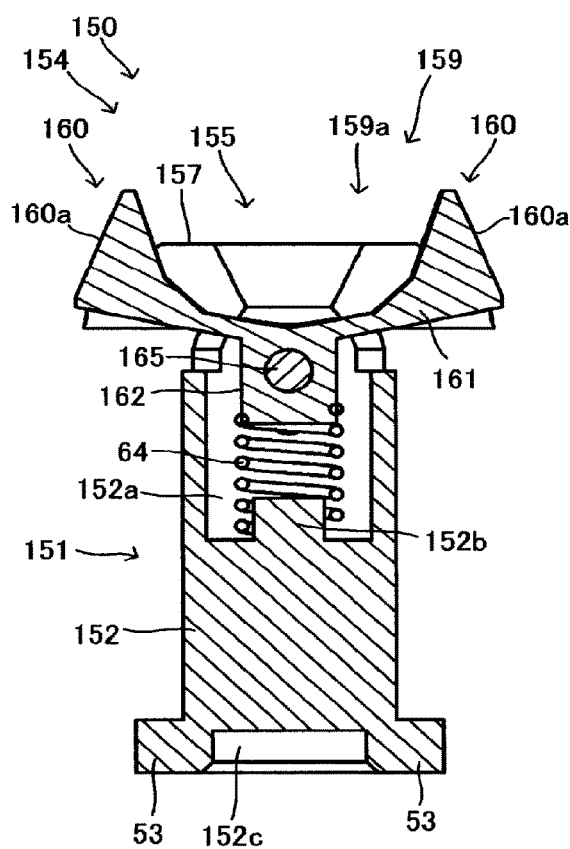
FIG. 25A is one sectional view of the shaft member 150.
Figure 25B:
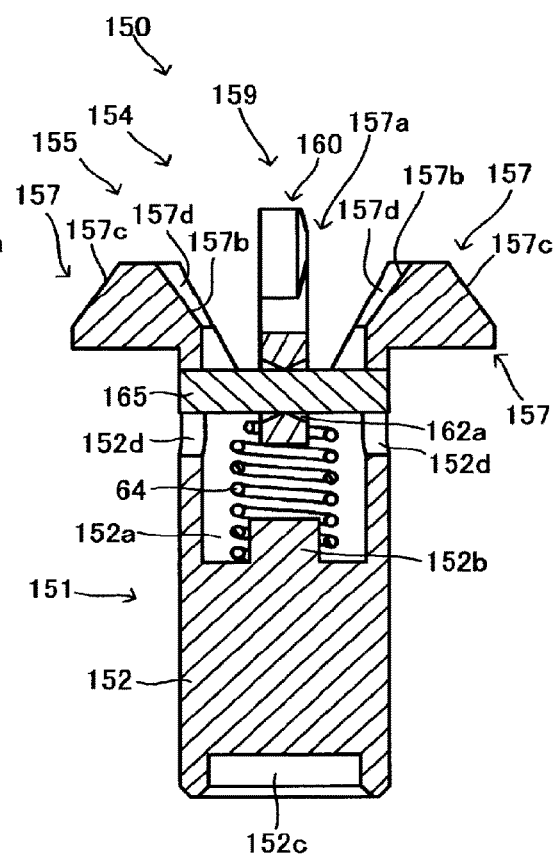
FIG. 25B is another sectional view of the shaft member 150.

The combination of the members with respect to the rotating shaft 151 in the shaft member 150 will be described. FIGS. 25A and 25B are views illustrating this. FIG. 25A is a sectional view along the axis of the shaft member 150 in the direction orthogonal to the axis of the pin 165, and FIG. 25B is a sectional view along the axis of the shaft member 150 in the direction along the axis of the pin 165.

As can be ascertained from FIGS. 21A, 21B, 25A, and 25B, in the aspect, the hook member elastic member 64 is disposed on the inner side of the recessed portion 152*a* of the main body 152 of the rotating shaft 151. At this time, one end of the hook member elastic member 64 is fixed to be inserted into the holding projection 152*b*.

In the aspect, the tip end member 155 is integrally formed on the end surface on the side on which the recessed portion 152*a* of the rotating shaft 151 is provided. However, the end surface is not necessarily integrated, may be formed separately and be bonded by adhering, welding, and other mechanical methods.

In addition, the holding projection 162 of the hook member 159 is inserted into the recessed portion 152*a* of the rotating shaft 151 through the void 157*a* between the holding members 157 of the tip end member 155, and the linking piece 161 of the hook member 159 is disposed in the void 157*a* of the tip end member 155. In addition, as the pin 165 passes through the long hole 152*d* of the rotating shaft 151 and the hole 162*a* of the holding projection 162, the hook member 159 is linked to the rotating shaft 151.

By the combination described above, the axes of each of the bearing member 40 and the shaft member 150 are disposed to match each other.

Figure 26:
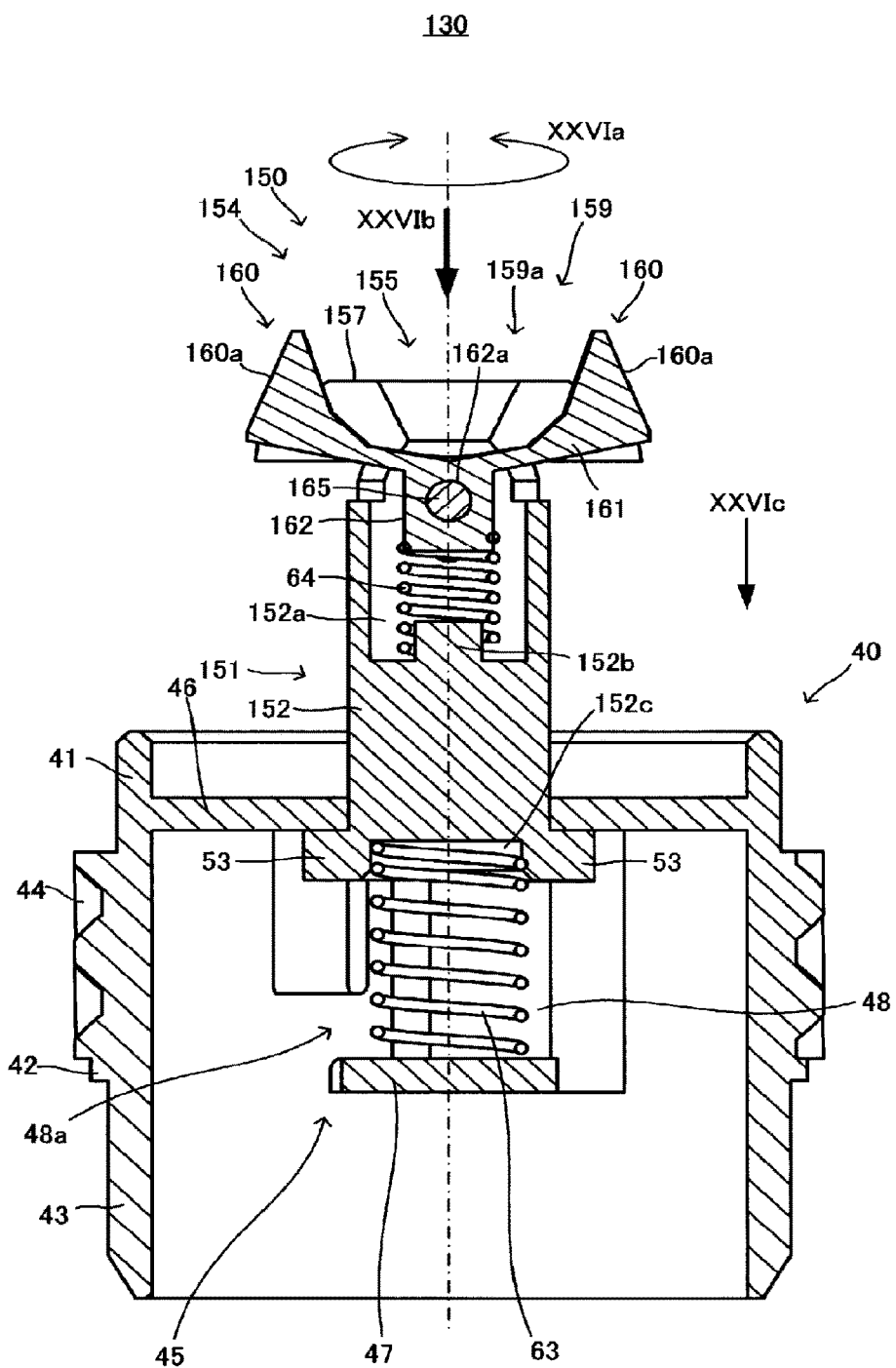
FIG. 26 is a sectional view of an end member 130.

Next, how the combined end member 130 can be deformed, move, and rotate, will be described. FIG. 26 is a sectional view along the axis in one posture of the end member 130 of the aspect.

In the posture illustrated in FIG. 26, by the rotating shaft elastic member 63, a posture in which the entire shaft member 150 protrudes the most from the bearing member 40 within a possible range, is achieved. When any external force is not applied to the shaft member 150, the driving side end member 130 has this posture.

In this posture, as can be ascertained from FIG. 26, since the linking piece 161 of the hook member 159 is disposed on the inner side of the void 157*a* of the tip end member 155, when the rotating force is applied to the engagement hook 160 of the hook member 159 as illustrated by XXVIa in FIG. 26, the hook member 159 is hooked to the holding member 157 of the tip end member 155, or the pin 165 is hooked to the side surface of the hole 162*a*, and the rotating force is transmitted. In any aspect, it is possible to appropriately set whether the rotating force is transmitted. In addition, the rotating force is transmitted to the rotating shaft 151, and further, the projection 53 of the rotating shaft 151 presses the wall of the slit 48*a*, and the rotating force is transmitted to the bearing member 40. Therefore, the entire end member 130 rotates by the rotating force received by the engagement hook 160.

In addition, as illustrated by an arrow XXVIb in FIG. 26, when the pressing force acts to the hook member 159 toward the bearing member 40 side in the axial direction, the pressing force is transmitted to the tip end member 155 and the rotating shaft 151, and the entire shaft member 150 moves in the direction of being pressed to the bearing member 40 as illustrated by XXVIc in FIG. 26 against the biasing force of the rotating shaft elastic member 63.

Figure 27A:
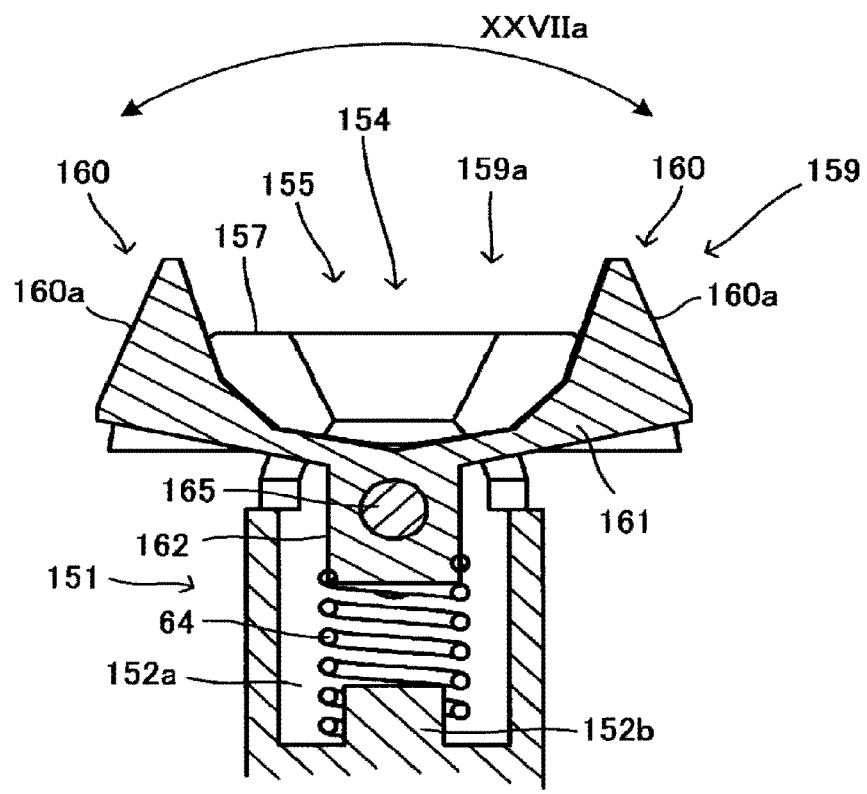
FIG. 27A is one sectional view illustrating the periphery of the hook member 159 in the end member 130.
Figure 27B:
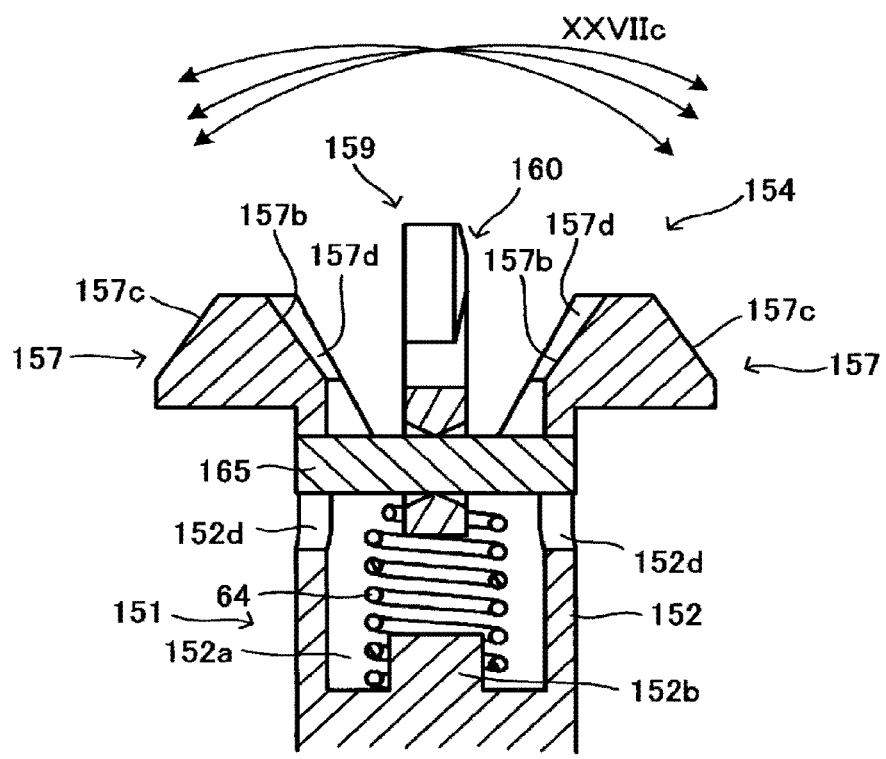
FIG. 27B is another sectional view illustrating the periphery of the hook member 159 in the end member 130.

FIGS. 27A and 27B are enlarged views illustrating the vicinity of the rotating force transmission member 154. FIG. 27A is a view from the same viewpoint as that of FIG. 25A, and FIG. 27B is a view from the same viewpoint as that of FIG. 25B. When the external force is not applied, the hook member 159 holds a basic posture illustrated in FIGS. 27A and 27B by the hook member elastic member 64.

Meanwhile, as the external force is applied, the swing around the pin 165 is possible as illustrated by an arrow XXVIIa in FIG. 27A against an elastic force of the hook member elastic member 64.

Furthermore, as the external force is applied, the hook member 159 can swing in all orientations other than the swing around the pin 165 as illustrated by an arrow XXVIIc in FIG. 27B against the elastic force of the hook member elastic member 64. This is because the diameter of the hole 162*a* of the holding projection 162 expands to be inclined (in a tapered shape) in both end portions in the penetrating direction.

Therefore, the hook member 159 can swing in all directions around the axis. In addition, in the aspect, the hook member elastic member 64 may be an aspect of a compression spring, but not being limited thereto, may be an aspect of an extension spring.

As described above, since the end member 130 can swing and move similar to the above-described end member 30, the end member 130 acts similar to the end member 30, and the effects are achieved.

In addition, in the aspect, since the surfaces 157*b* and 157*d* which form the void 157*a* in the holding member 157 are inclined surfaces (tapered surfaces) as described above, the swing of the hook member 159 illustrated in FIG. 27B is unlikely to be interrupted, and is smoothly performed. Furthermore, according to the example of FIG. 17, from the posture in which the driving shaft 70 of the apparatus main body 2 is engaged with the shaft member 150, since the tip end of the shaft portion 71 of the driving shaft 70 slides on the surfaces 157*b* and 157*d* when disengaging the driving shaft 70, and the component of force which presses the shaft member 150 in the axial direction is generated, the shaft member 150 can be moved in the axial direction in the direction illustrated by the arrow XXVIc in FIG. 26. Accordingly, smooth disengagement of the driving shaft 70 can be performed.

Figure 28:
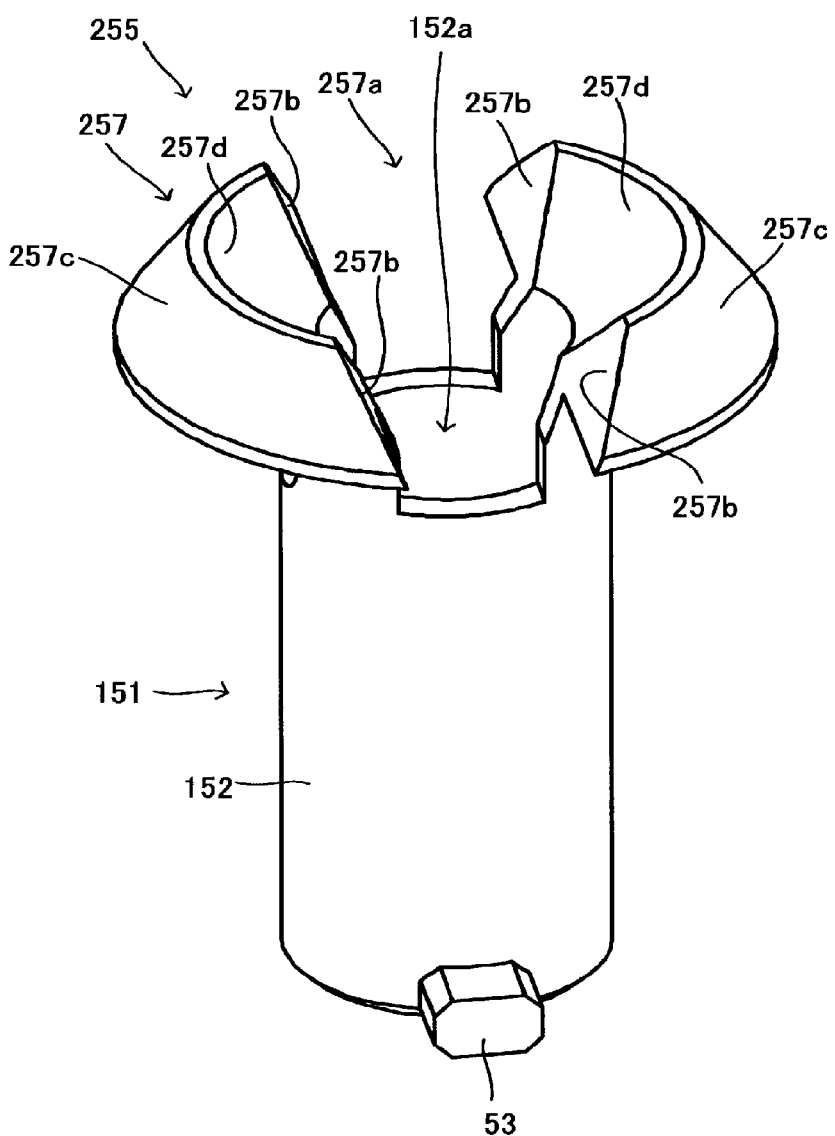
FIG. 28 is a perspective view of the rotating shaft 151 and a tip end member 255.

FIG. 28 is a view illustrating a third aspect. FIG. 28 is a view from the same viewpoint as that of FIG. 22, and is an external perspective view of the rotating shaft 151 and a tip end member 255 disposed in the rotating shaft 151. The aspect is an example in which the tip end member 255 is employed instead of the tip end member 155 of the end member 130 which has already been described. Here, an aspect of the tip end member 255 will be described. Since the aspect regarding other parts is the same, the same reference numerals will be given, and the description thereof will be omitted.

The tip end member 255 in the aspect, is configured to include two holding members 257 which are disposed on the end surface of the recessed portion 152*a* side of the main body 152 of the rotating shaft 151.

The holding members 257 are two members which are disposed on the end surface of the recessed portion 152*a* side of the main body 152 of the rotating shaft 151, and are disposed to include a predetermined void 257*a* nipping the axis of the main body 152 of the rotating shaft 151. Therefore, the recessed portion 152*a* of the main body 152 communicates with the inside and the outside via the void 257*a*.

In addition, surfaces 257*b* and 257*d* which form a side wall of the void 257*a* of a holding member 257, are inclined surfaces (tapered surfaces) to be separated from each other as being separated from the rotating shaft 151. Here, among the surfaces 257*b* and 257*d*, the surfaces 257*b* are planes which are disposed at each of both ends in the direction in which the void 257*a* extends, and the surfaces 257*d* are curved surfaces which are disposed between two surfaces 257*h* and have a shape of an arc in the aspect. In addition, in the aspect, the surface 257*d* is configured to have an area which is greater than that of the surface 157*d* provided in the tip end member 155 of the above-described second aspect.

Meanwhile, a side surface other than a surface on which the void 257*a* of the holding member 257 is formed is separated from the rotating shaft 151, and an inclined surface 257*c* (tapered surface) is formed to approach the axis of the rotating shaft 151. The inclined surface 257*c* acts similar to the inclined surface 57*b* of the holding member 57 which has already been described.

The end member provided with the tip end member 255 also acts similar to the end member 130.

Figure 29A:
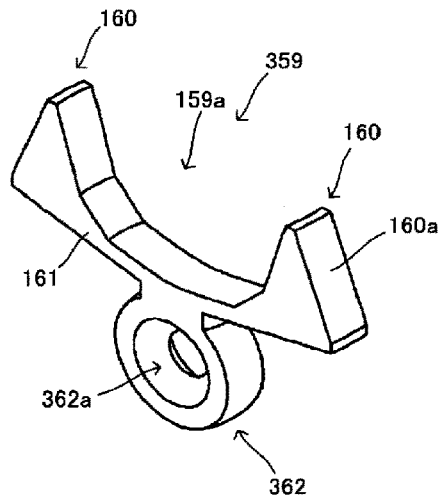
FIG. 29A is a perspective view of a hook member 359.
Figure 29B:
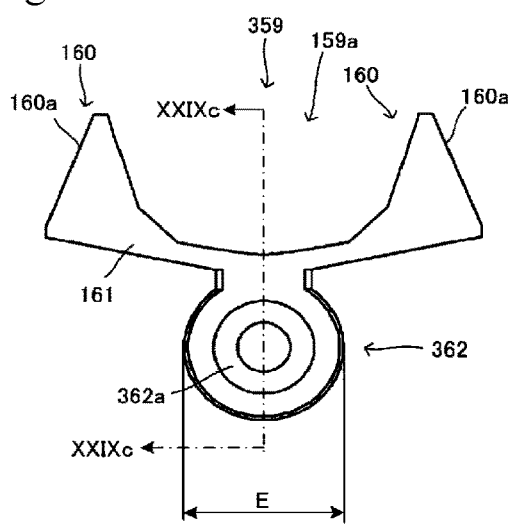
FIG. 29B is a front view of the hook member 359.
Figure 29C:
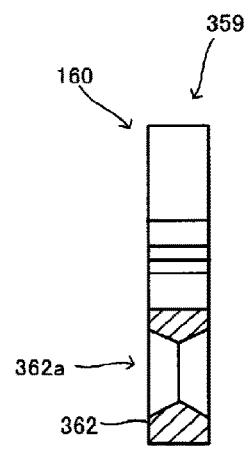
FIG. 29C is a sectional view of the hook member 359.
Figure 30A:
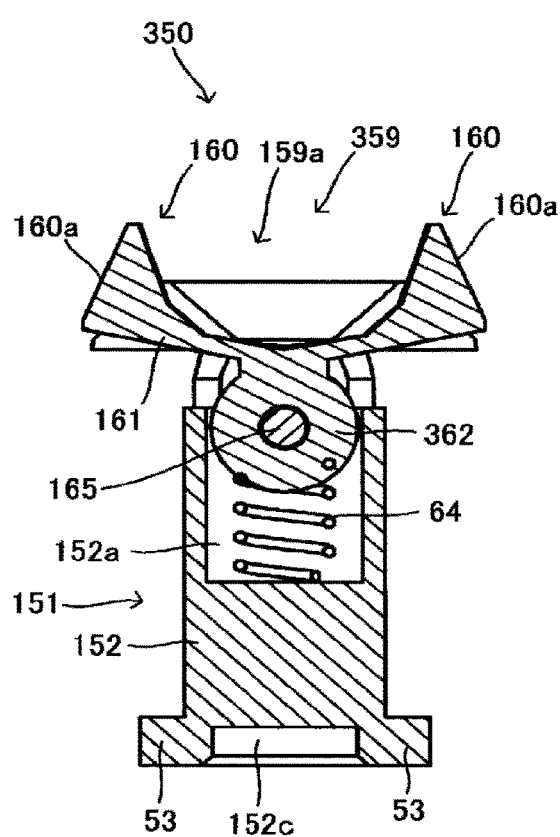
FIG. 30A is one sectional view of a shaft member 350.
Figure 30B:
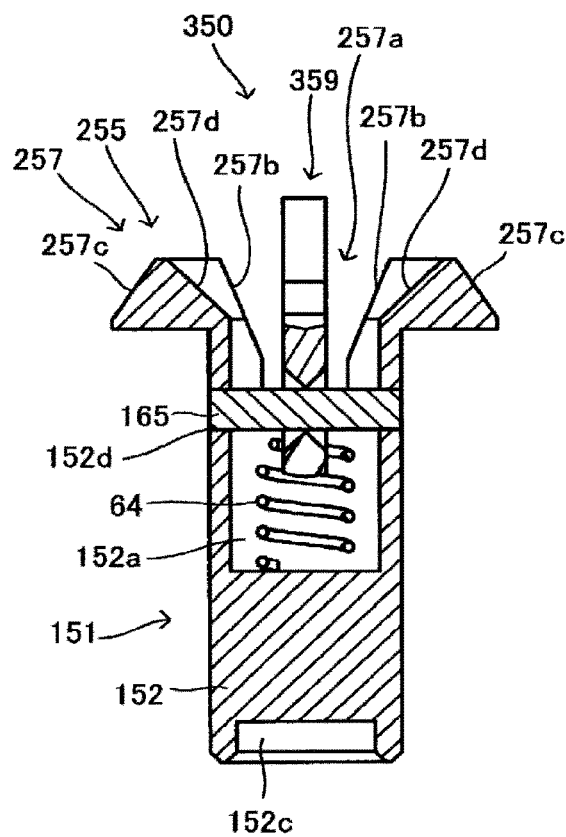
FIG. 30B is another sectional view of the shaft member 350.

In FIGS. 29A to 29C, 30A, and 30B, a fourth aspect will be described. FIGS. 29A to 29C are views from the same viewpoint as that of FIGS. 24A to 24C. FIG. 29A is a perspective view of a hook member 359, FIG. 29B is a front view of the hook member 359, and FIG. 29C is an arrow sectional view illustrated by XXIXc-XXIXc in FIG. 29B. In addition, FIGS. 30A and 30B are sectional views of a shaft member 350. FIG. 30A is a sectional view along the axial direction of the shaft member 350 in the direction orthogonal to the axis of the pin 165, and FIG. 30B is a sectional view along the axial direction of the shaft member 350 in the direction along the axis of the pin 165.

In the aspect, the shaft member 350 includes the rotating shaft 151, the tip end member 255, the hook member 359, the hook member elastic member 64, the rotating shaft elastic member 63 (not illustrated in FIGS. 30A and 30B), and the pin 165. Here, since the aspect is similar to the aspect which has already been described except the hook member 359, the same reference numeral will be given, and the description thereof will be omitted.

The hook member 359 includes two engagement hooks 160, and the linking piece 161 which links end portions of the two engagement hooks 160 to each other. In addition, on a side opposite to two engagement hooks 160 of the linking piece 161, a holding projection 362 is provided at a position which is the center between the two engagement hooks. Here, since the engagement hook 160 and the linking piece 161 are the same as those in the hook member 159, here, the same reference numeral will be given, and the description thereof will be omitted.

In the aspect, the holding projection 362 is a projection which is disposed at a position which is the center between two engagement hooks 160, on the surface opposite to the engagement hook 160 of the linking piece 161. The holding projection 362 of the aspect is a plate-like member of an aspect obtained by cutting the spherical body so as to have the same thickness as that of the linking piece 161. Therefore, the circular outer circumference of the holding projection 362 is a part of the spherical surface. In addition, the width (outer diameter of the holding projection 362) of the holding projection 362 illustrated by E in FIG. 29B is substantially the same as or slightly smaller than the diameter of the recessed portion 152a of the main body 152 of the rotating shaft 151.

The holding projection 362 is fixed to one end of the hook member elastic member 64. A fixing method is not particularly limited, but, for example, it is possible to provide a hole or a groove for fixing the hook member elastic member 64 to the holding projection 362, and to fix the end portion of the holding projection 362 here.

In addition, in the holding projection 362, a hole 362a through which the holding projection 362 penetrates in the direction orthogonal to the direction in which the two engagement hooks 160 are aligned, is provided. The pin 165 passes through the hole 362a.

A shape of the hole 362a in the penetrating direction is illustrated in FIG. 29C. As can be ascertained from the drawing, the hole 362a is the narrowest at the center in the penetrating direction, and the diameter of the hole expands to have an inclined (tapered) shape so that the hole widens when approaching both ends in the penetrating direction across the entire circumference of the hole 362a. Accordingly, smooth swing of the hook member 359 is achieved.

The shaft member 350 which includes the above-described hook member 359 is configured as follows. In addition, as the shaft member 350 is combined with the bearing member 40, the end member of the aspect is made.

In addition, by describing the combination, the size of each member and part, the structure, or the relationship of the sizes of the members and parts, are further understood.

The combination of the members with respect to the rotating shaft 151 in the shaft member 150 will be described. As can be ascertained from FIGS. 29A to 29C, 30A, and 30B, in the aspect, the hook member elastic member 64 is disposed on the inner side of the recessed portion 152a of the main body 152 of the rotating shaft 151. At this time, one end of the hook member elastic member 64 is fixed to the bottom portion of the recessed portion 152a.

In addition, the holding projection 362 of the hook member 359 is inserted into the recessed portion 152a of the rotating shaft 151 through the void 257a between the holding members 157 of the tip end member 155, and the linking piece 161 of the hook member 359 is disposed in the void 257a of the tip end member 256. In addition, as the pin 165 passes through the hole 152d (in the aspect, not a long hole, but a circular hole is preferable) of the rotating shaft 151 and the hole 362a of the holding projection 362, the hook member 359 is linked to the rotating shaft 151. At this time, the holding projection 362 is fixed to the end portion of the hook member elastic member 64.

Here, the hook member elastic member 64 may be any of the compression spring and the extension spring. In the aspect, an aspect of the compression spring is illustrated. However, since the extension spring is likely to maintain the hook member 359 in the basic posture (posture illustrated in FIGS. 30A and 30B), it is preferable to use the extension spring.

By the combination described above, the axes of each of the bearing member 40 and the shaft member 350 are disposed to match each other.

According to the end member made by combining the bearing member 40 and the shaft member 350 with each other, it is possible to transmit the rotating force according to the example in FIG. 26, and to move in the axial direction of the shaft member 350, the hook member 359 can swing according to the example in FIGS. 27A and 27B, and the end member acts similar to the end member of each of the above-described aspects. In addition, in the aspect, by an aspect of the holding projection 362, since the holding projection 362 is unlikely to move in the recessed portion 152a of the rotating shaft 151, the movement of the hook member 359 in the direction orthogonal to the axis of the rotating shaft 151 is regulated, and the basic posture is likely to be maintained. In addition, since the outer circumferential surface of the holding projection 362 is formed by a part of the spherical surface, the smooth swing is performed.

Next, a fifth aspect will be described. FIGS. 31A and 31B are views illustrating the fifth aspect. FIG. 31A is a perspective view of a shaft member 450 of an end member 430 (refer to FIG. 36) included in the fifth aspect, and FIG. 31B is an exploded perspective view of the shaft member 450. The end member 430 included in the aspect has the same bearing member as the bearing member 40 with respect to the end member 30 which has already been described, and is an example in which the shaft member 450 is employed instead of the shaft member 50. Therefore, the configuration of the bearing member 40 will be given the same reference numerals, and the description thereof will be omitted. Hereinafter, the shaft member 450 will be described.

As can be ascertained from FIGS. 31A and 31B, the shaft member 450 is provided with a rotating shaft 451 and a rotating force transmission member 454, and the rotating force transmission member 454 is configured to include a tip end member 455 and a hook member 459. Furthermore, the shaft member 450 is provided with the rotating shaft elastic member 63, a hook member elastic member 464, and a pin 465. Any of the rotating shaft elastic member 63 and the hook member elastic member 464 of the aspect is the coiled spring.

Figure 32:
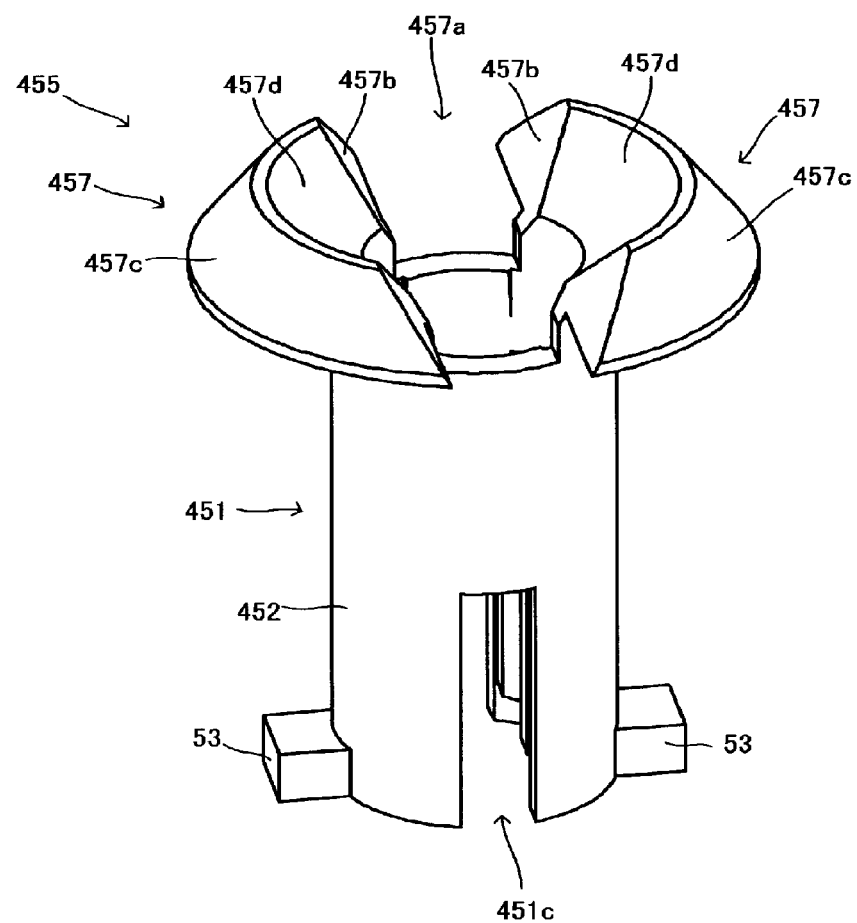
FIG. 32 is a perspective view of a rotating shaft 451 and a tip end member 455.
Figure 33A:
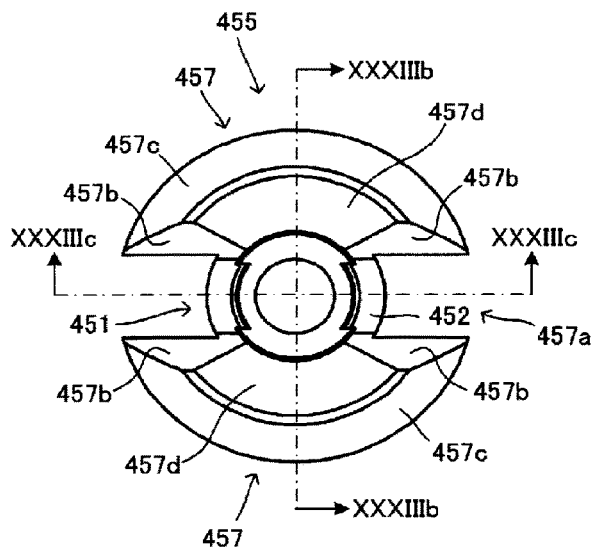
FIG. 33A is a plan view of the rotating shaft 451 and the tip end member 455.
Figure 33B:
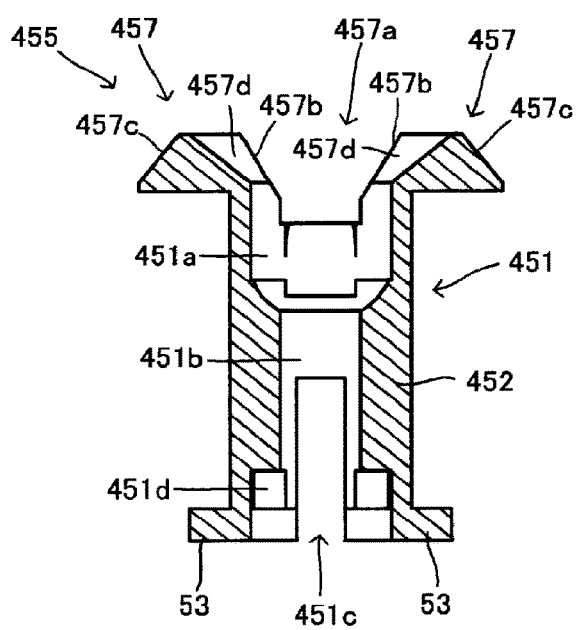
FIG. 33B is one sectional view of the rotating shaft 451 and the tip end member 455.
Figure 33C:
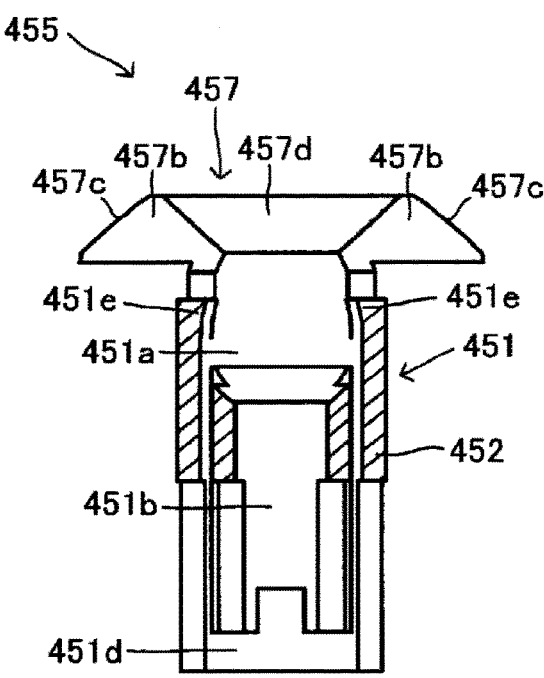
FIG. 33C is another sectional view of the rotating shaft 451 and the tip end member 455.

The rotating shaft 451 is a shaft-like member which transmits the rotating force received by the rotating force transmission member 454 to the bearing member 40. FIG. 32 is a perspective view of the rotating shaft 451, FIG. 33A is a plan view when viewed from a side on which the tip end member 455 is disposed in the rotating shaft 451, FIG. 33B is a sectional view along the axial direction including a line illustrated by XXXIIIb-XXXIIIb in FIG. 33A, and FIG. 33C is a sectional view along the axial direction including a line illustrated by XXXIIIc-XXXIIIc in FIG. 33A, respectively. In addition, in the aspect, since the tip end member 455 is integrally disposed in one end portion of the rotating shaft 451, the tip end member 455 is also illustrated in the drawings.

As can be ascertained from FIGS. 32, and 33A to 33C, the rotating shaft 451 includes a cylindrical main body 452. As can be ascertained from FIGS. 33B and 33C, on the cylindrical inner side, three spaces 451*a*, 451*b*, and 451*d* which have different inner diameters from each other are aligned in the axial direction. The space 451*a* is provided in the end portion on the side on which the tip end member 455 is disposed in the main body 452, the space 451*d* is provided in the end portion opposite thereto, and the space 451*b* is disposed to pass through both spaces 451*a* and 451*d*. In the aspect, since the inner diameter of the space 451*b* is the smallest, a step is generated based on a difference in inner diameters, in a linking portion between the space 451*a* and the space 451*b*, and in a linking portion between the space 451*d* and the space 451*b*, respectively.

In addition, as can be ascertained from FIG. 33C, the space 451*a* is provided with an undercut portion 451*e* which is a part inclined in the direction of slightly nipping an opening in an opening portion on the end surface side of the rotating shaft 451. The undercut portion 451*e* functions as a so-called snap-fit projected portion which is formed so that a holding projection 462 (refer to FIGS. 34A to 34C) which is a sphere of the hook member 459 which will be described later, does not fall out of the space 451*a*. Therefore, the opening portion of the space 451*a* is formed to be narrower than the diameter of the holding projection 462. In the aspect, the undercut portion 451*e* is formed of the inclined surface, but instead of this, an aspect in which a projection protrudes may be employed.

Two projections 53 are disposed in the end portion on the side where the space 451*d* is disposed in the outer circumferential portion of the main body 452. Two projections 53 are the same as the projections 53 provided in the main body 52 of the end member 30 which has already been described.

In addition, in the tubular wall portion of the main body 452, in the end portion on a side on which the space 451*d* is disposed, a slit 451*e* which extends in the axial direction and communicates with the inside and the outside of the main body 452, is provided between two projections 53. In the slit 451*c*, an end portion on one side in the direction in which the slit extends is open on an end surface of the main body 452, and the end portion opposite to the opening reaches the middle part of the space 451*b*.

The tip end member 455 is one member which configures the rotating force transmission member 454, and transmits the rotating force from the hook member 459 to the rotating shaft 451. FIGS. 32, and 33A to 33C illustrate the shape of the tip end member 455.

As can be ascertained from FIGS. 31A, 31B, 32, and 33A to 33C, the tip end member 455 in the aspect is configured to include two holding members 457 which are provided on the end surface on which the space 451*a* of the main body 452 of the rotating shaft 451 is disposed.

The holding members 457 are two members which are provided on an end surface on the side on which the space 451*a* of the main body 452 of the rotating shaft 451 is disposed, and are disposed to have a predetermined void 457*a* nipping the axis of the main body 452 of the rotating shaft 451. Therefore, the space 451*a* of the main body 452 communicates with the inside and the outside via the void 457*a*.

In addition, surfaces 457*b* and 457*d* which form a side wall of the void 457*a* in a holding member 457, are inclined surfaces (tapered surfaces) to be separated from each other according to the separation from the rotating shaft 451. Here, among the surfaces 457*b* and 457*d*, the surfaces 457*b* are planes which are disposed at each of both ends in the direction in which the void 457*a* extends, and the surfaces 457*d* are curved surfaces which are disposed between two surfaces 457*b* and have a shape of an arc in the aspect. In the aspect, similar to the holding member 257 (refer to FIG. 28) which has already been described, the surface 457*d* is formed to be large.

In this manner, as the surfaces 457*b* and 457*d* are inclined surfaces, as will be described later, the swing of the hook member 459 is unlikely to be interrupted, and is smoothly performed (refer to FIG. 37B). Furthermore, according to the example of FIG. 17, from the posture in which the driving shaft 70 of the apparatus main body 2 is engaged with the shaft member 450, since the tip end of the shaft portion 71 of the driving shaft 70 slides on the surfaces 457*b* and 457*d* when disengaging the driving shaft 70, and the component of force which presses the shaft member 150 in the axial direction is generated, the shaft member 450 can be moved in the axial direction (direction illustrated by an arrow XXXVIc of FIG. 36). Accordingly, smooth engagement of the driving shaft 70 can be performed.

Meanwhile, as a side surface other than a surface on which the void 457*a* is formed in the holding member 457 is separated from the rotating shaft 451, an inclined surface (tapered surface) 457*c* is formed to approach the axis of the rotating shaft 451. The inclined surface 457*c* acts similar to the inclined surface 57*b* of the holding member 57 which has already been described.

Figure 34A:
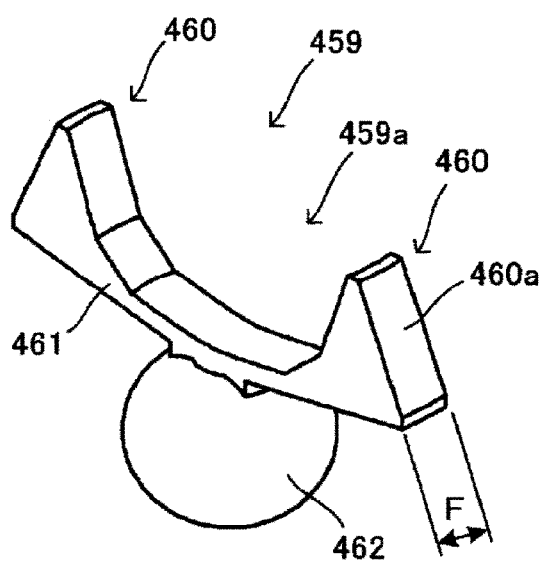
FIG. 34A is a perspective view of a hook member 459.
Figure 34B:
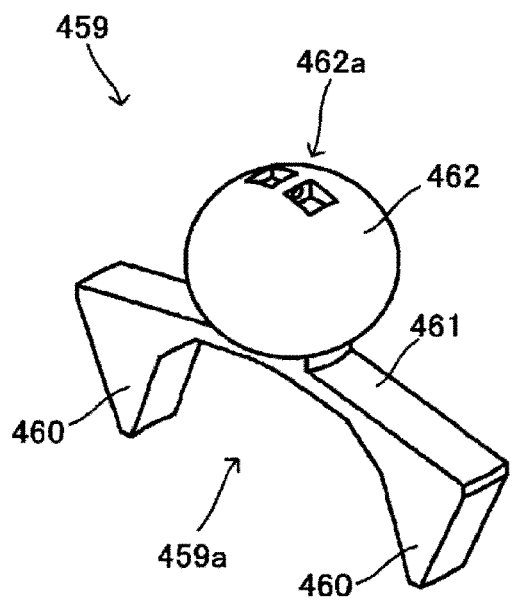
FIG. 34B is a perspective view of the hook member 459 when viewed from the other direction.
Figure 34C:
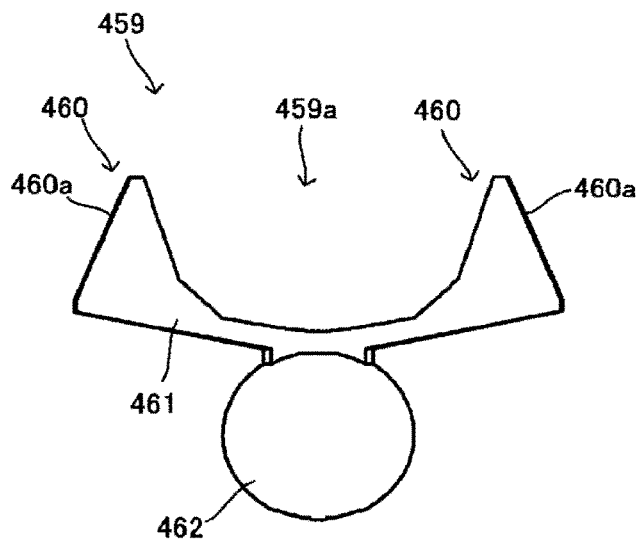
FIG. 34C is a front view of the hook member 459.

Returning to FIGS. 31A and 31B, the hook member 459 will be described. The hook member 459 is one member which configures the rotating force transmission member 454, and is a member which is engaged with the driving shaft 70 (refer to FIG. 16A) provided in the apparatus main body 2, and transmits the rotating force to the tip end member 455. FIG. 34 is a view illustrating this. FIG. 34A is a perspective view of the hook member 459, FIG. 34B is another perspective view of the hook member 459 when viewed from a side opposite to FIG. 34A, and FIG. 34C is a front view of the hook member 459.

The hook member 459 includes two engagement hooks 460, and a linking piece 461 which links end portions of the two engagement hooks 460 to each other. In addition, on a side opposite to two engagement hooks 460 in the linking piece 461, the holding projection 462 is provided at a position which is the center between the two engagement hooks.

Two engagement hooks 460 are members which stand in the same direction from both end portions of the linking piece 461, and an interval between two engagement hooks 460 is formed so that the tip end of the shaft portion 71 of the driving shaft 70 (refer to FIG. 16A) enters the interval, and the rotating force transmission projection 72 of the driving shaft 70 is hooked to the engagement hook 460. In addition, in the aspect, two engagement hooks 460 are formed to become narrower according to the separation from the linking piece 461 as can be ascertained from FIG. 34C. More specifically, an opposing surface of two engagement hooks 460 includes a surface of the linking piece 461, and a recessed portion 459a is formed. In the aspect, an opposing surface of two engagement hooks 460 is formed to be inclined (tapered) to be separated according to the separation from the linking piece 461.

In addition, in two engagement hooks 460, the surfaces opposite to the recessed portion 459a are inclined surfaces 460a to approach each other according to the separation from the linking piece 461. The inclined surface 460a acts similar to the inclined surface 60a of the engagement hook 60 (refer to FIG. 10A or the like) which has already been described.

The holding projection 462 is a projection which is disposed at a position which is the center between two engagement hooks 460, on the surface opposite to the engagement hook 460 in the linking piece 461. In the aspect, the holding projection 462 is a spherical member. In addition, as can be ascertained from FIG. 34B, a hole 462a is formed at a part opposite to the side on which the linking piece 461 is disposed in the holding projection 462. As will be described later, the hook member elastic member 464 is fixed to the hole 462a.

Here, as will be described later, in the hook member 459, the size (thickness) of the linking piece 461 illustrated by F in FIG. 34A, is formed to be smaller than the width of the narrowest part of the void 457a, from the viewpoint that the linking piece 461 swings being disposed on the inner side of the void 457a of the tip end member 455. In addition, in the holding projection 462, the spherical diameter is smaller than the void 457a, and is substantially the same as or slightly smaller than the inner diameter of the space 451a formed in the main body 452 of the rotating shaft 451. However, as described above, the undercut portion 451e (or a projection) is formed in the opening portion on the side on which the holding projection 462 is inserted in the space 451a of the rotating shaft 451, and functions as a falling prevention member. Therefore, the spherical diameter of the holding projection 462 is greater than the opening portion in which the undercut portion 451e is formed.

By combining the bearing member 40 and the shaft member 450 with each other as follows, the end member 430 (refer to FIG. 36) is made. In addition, by describing the combination, the size of each member and part, the structure, or the relationship of the sizes of the members and parts, are further understood. Here, since the combination between the bearing member 40 and the rotating shaft 451 is the same as that in the example of the end member 30, the description thereof will be omitted.

Figure 35A:
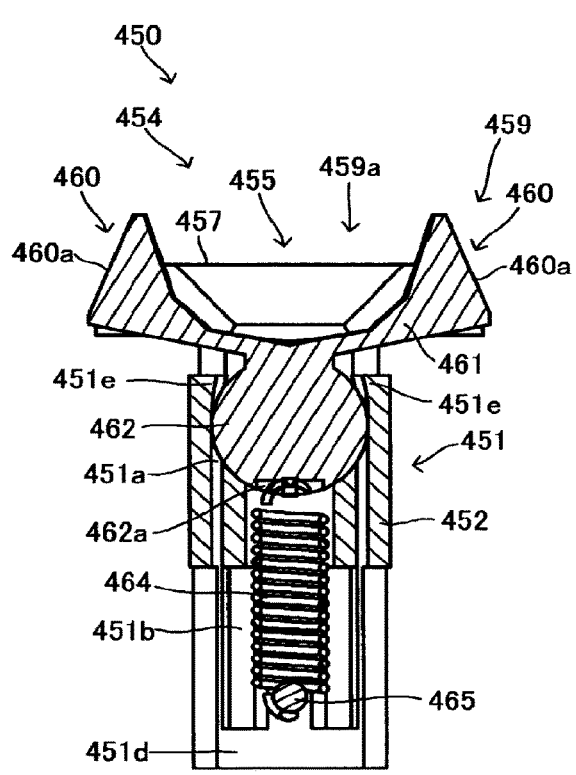
FIG. 35A is one sectional view of the shaft member 450.
Figure 35B:
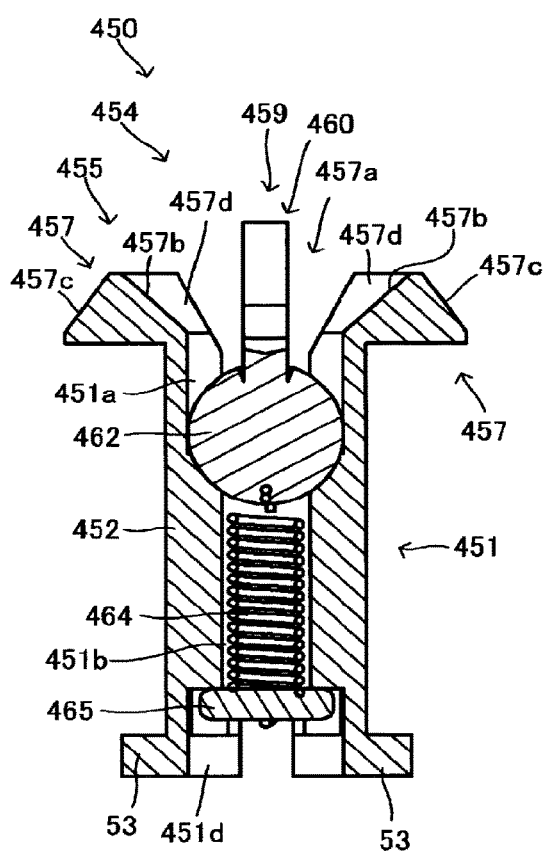
FIG. 35B is another sectional view of the shaft member 450.

The combination of the members with respect to the rotating shaft 451 in the shaft member 450 will be described. FIGS. 35A and 35B are views illustrating this. FIG. 35A is a sectional view along the axis of the shaft member 450 in the direction in which the engagement hooks 460 arc aligned, and FIG. 35B is a sectional view along the axis of the shaft member 450 in the direction orthogonal thereto.

As can be ascertained from FIGS. 31A, 31B, 35A, and 35W in the aspect, the hook member elastic member 464 is disposed in the space 451b of the main body 452 of the rotating shaft 451. At this time, in the hook member elastic member 464, the pin 465 is attached to an end portion on the space 451d side, and the pin 465 is hooked to the step which is formed by the space 451b and the space 451d in the main body 452. Accordingly, the hook member elastic member 464 is held on the inner side of the main body 452. In addition, when the end portion of the hook member elastic member 464 and the pin 465 are attached to each other, it is possible to perform work by inserting or the like a tool into the main body 452 from the slit 451c for appropriately fixing the end portion of the hook member elastic member 464 to the pin 465, and the assembly is easily performed. Here, the hook member elastic member 464 may be any of the compression spring and the extension spring, but in the aspect, an aspect of the extension spring is illustrated. Since the extension spring is likely to maintain the hook member 459 in the basic posture (posture illustrated in FIGS. 35A and 35B), it is preferable to use the extension spring.

Meanwhile, the hook member 459 is inserted from the side on which the tip end member 455 is disposed, in the main body 452 of the rotating shaft 451. In other words, the holding projection 462 of the hook member 459 is inserted into the space 451a of the rotating shaft 451 through the void 457a between the holding members 457 of the tip end member 455, and the linking piece 461 of the hook member 459 is disposed in the void 457a of the tip end member 455. In addition, the holding projection 462 of the hook member 459 is fixed to one end of the hook member elastic member 464 by the hole 462a provided here. At this time, since the undercut portion 451e is formed in the opening portion of the space 451a, by slightly pushing the hook member 459, the holding projection 462 is disposed in the space 451a. When the holding projection 462 enters the space 451a, the holding projection 462 does not fall out of the space 451a by the undercut portion 451e in a normal use.

By the combination described above, the axes of each of the bearing member 40 and the shaft member 450 are disposed to match each other.

Figure 36:
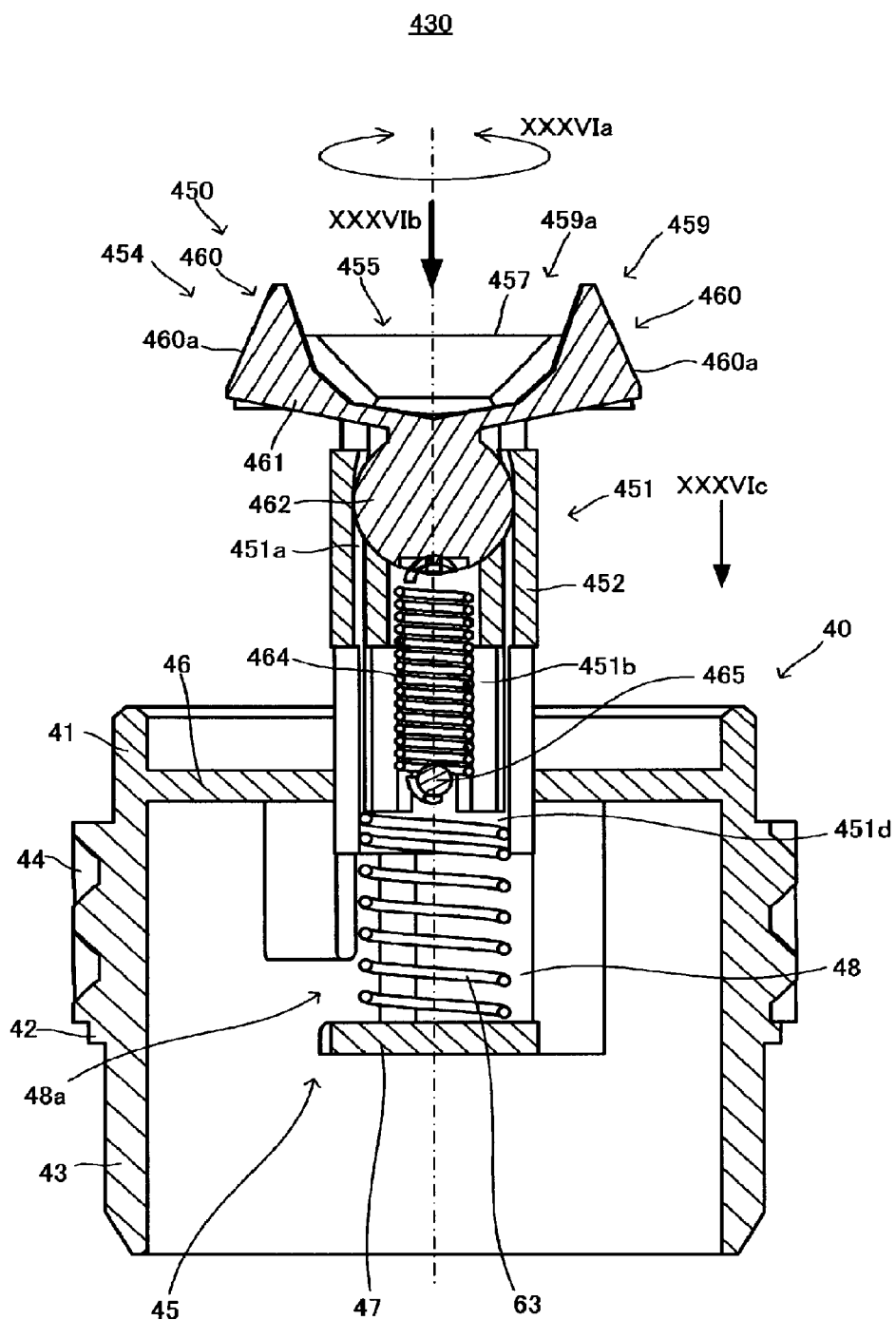
FIG. 36 is a sectional view of an end member 430.

Next, how the end member 430 combined as described above can be deformed, move, and rotate, will be described. FIG. 36 is a sectional view along the axis in one posture of the end member 430 of the aspect.

In the posture illustrated in FIG. 36, by the biasing force of the rotating shaft elastic member 63, a posture in which the entire shaft member 450 protrudes the most from the bearing member 40 within a possible range, is achieved. When any external force is not applied to the shaft member 450, the end member 430 has this posture.

In this posture, as can be ascertained from FIG. 36, since the linking piece 461 of the hook member 459 is disposed on the inner side of the void 457a of the tip end member 455, when the rotating force is applied to the engagement hook 460 of the hook member 459 as illustrated by XXXVIa in FIG. 36, the hook member 459 is hooked to the holding member 457 of the tip end member 455, and the rotating force is transmitted. In addition, the rotating force is transmitted to the rotating shaft 451, and further, the projection 53 of the rotating shaft 451 presses the slit wall of the slit 48a, and the rotating force is transmitted to the bearing member 40. Therefore, the entire end member 430 rotates by the rotating force received by the engagement hook 460.

In addition, as illustrated by an arrow XXXVIb in FIG. 36, when the pressing force acts to the hook member 459 toward the bearing member 40 side in the axial direction, the hook member 459 presses the tip end member 455, and further, this is transmitted to the rotating shaft 451, the entire shaft member 450 moves in the direction of being pressed to the bearing member 40 as illustrated by XXXVIc in FIG. 36 against the biasing force of the rotating shaft elastic member 63.

Figure 37A:
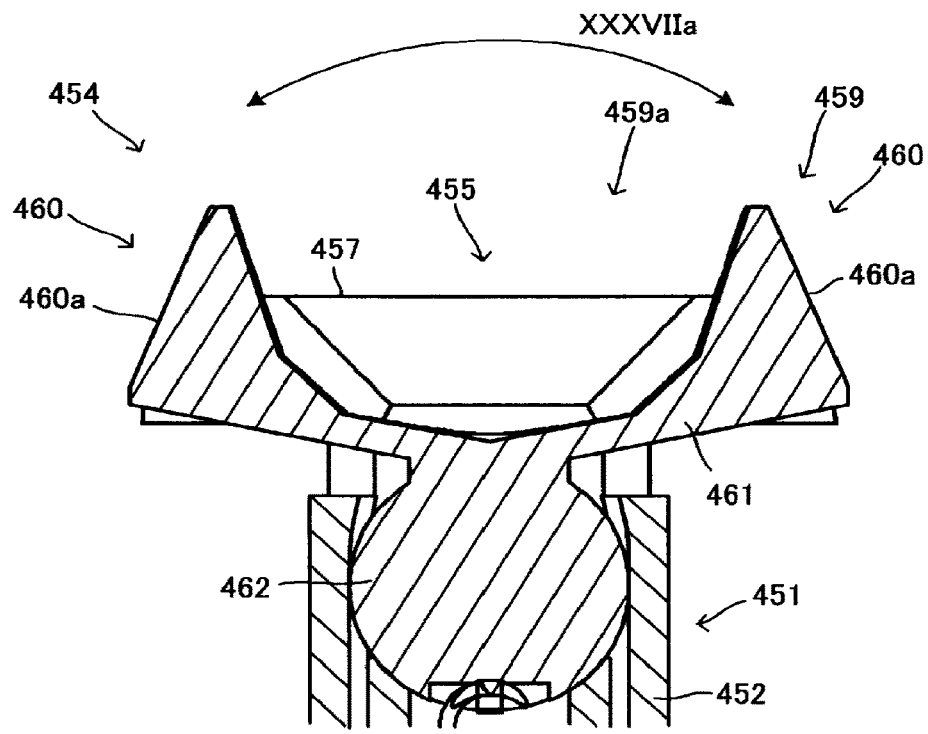
FIG. 37A is one sectional view illustrating the periphery of the hook member 459 in the end member 430.
Figure 37B:
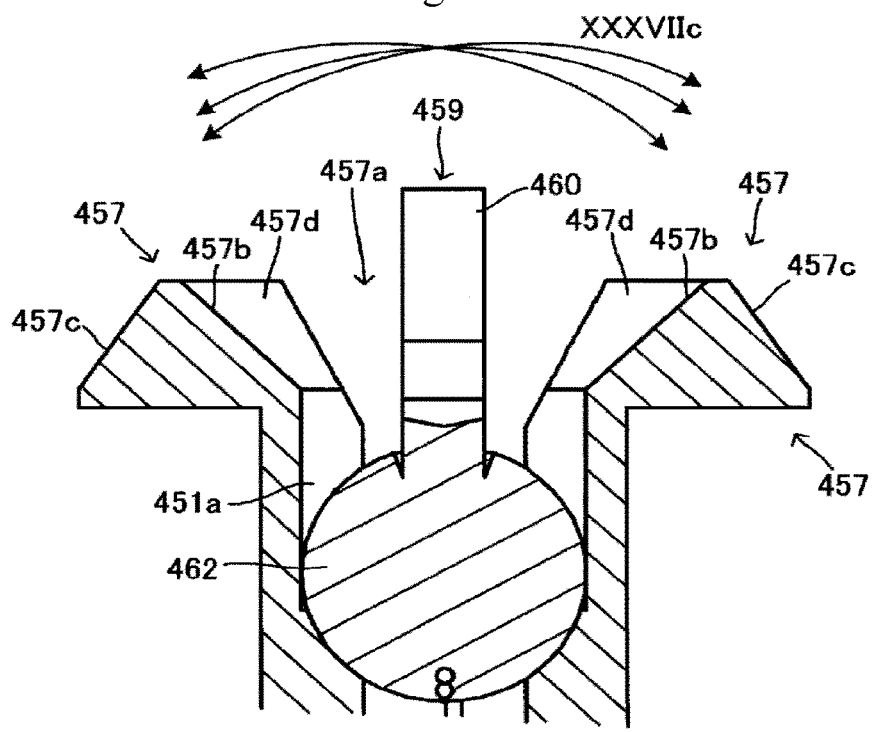
FIG. 37B is another sectional view illustrating the periphery of the hook member 459 in the end member 430.

FIGS. 37A and 37B are enlarged views illustrating the vicinity of the rotating force transmission member 454. FIG. 37A is a view from the same viewpoint as that of FIG. 35A, and FIG. 37B is a view from the same viewpoint as that of FIG. 35B. When the external force is not applied, the hook member 459 holds a basic posture illustrated in FIGS. 37A and 37B by the hook member elastic member 464.

Meanwhile, as the external force is applied, the swing around the spherical holding projection 462 is possible as illustrated by an arrow XXXVIIa in FIG. 37A against the elastic force of the hook member elastic member 464. At this time, since the holding projection 462 is spherical, and the diameter of the holding projection 462 is substantially the same as the inner diameter of the space 451a in which the holding projection 462 is disposed, rattling is suppressed and smooth swing is possible.

Furthermore, as the external force is applied, the hook member 459 can swing in all orientations other than the swing around the spherical holding projection 462 as illustrated by an arrow XXXVIIc in FIG. 37B against the elastic force of the hook member elastic member 464. At this time, when the holding projection 462 is spherical, since the diameter of the holding projection 462 is formed to be substantially the same as the inner diameter of the space 451a in which the holding projection 462 is disposed, rattling is suppressed and smooth swing is possible.

Therefore, the hook member 459 can swing in all directions around the axis.

As described above, since the end member 430 can swing and move similar to the above-described end member 30, the end member 430 acts similar to the end member 30, and the effects are achieved.

In addition, in the aspect, since the holding projection 462 is formed in a spherical shape, rattling is suppressed and smooth swing is possible.

Next, a sixth aspect will be described. FIGS. 38A and 38B are views illustrating the sixth aspect. FIG. 38A is a perspective view of a shaft member 550 in an end member 530 (refer to FIG. 42) included in the sixth aspect, and FIG. 38B is an exploded perspective view of the shaft member 550. The aspect is an example in which the end member 530 included in the aspect is the same as the bearing member 40 of the end member 30 which has already been described, and the shaft member 550 is employed instead of the shaft member 50. Therefore, regarding the configuration of the bearing member 40, the same reference numerals will be given, and the description thereof will be omitted. Hereinafter, the shaft member 550 will be described.

As can be illustrated in FIGS. 38A and 38B, the shaft member 550 is provided with a rotating shaft 551 and a rotating force transmission member 554, and in the aspect, the rotating force transmission member 554 is configured of a hook member 559. Furthermore, the shaft member 550 is provided with the rotating shaft elastic member 63, the hook member elastic member 464, and the pin 465. The rotating shaft elastic member 63, the hook member elastic member 464, and the pin 465, are the same as those in the shaft member 450 described in the fifth aspect.

Figure 39A:
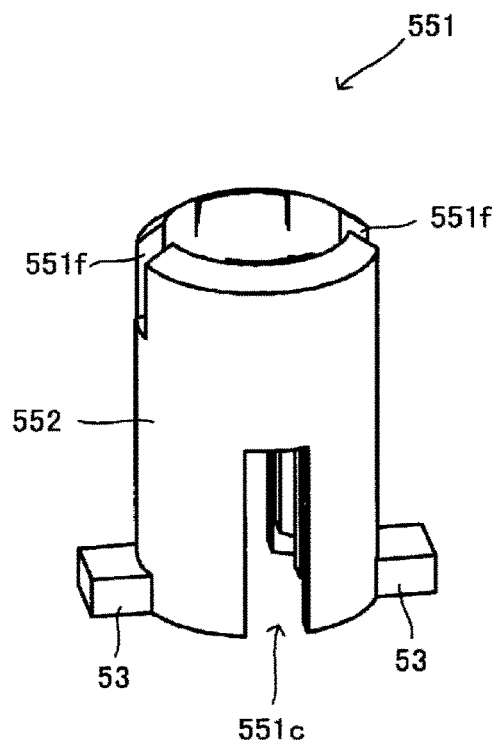
FIG. 39A is a perspective view of a rotating shaft 551.

The rotating shaft 551 is a shaft-like member which transmits the rotating force received by the rotating force transmission member 554 to the bearing member 40. FIG. 39A is a perspective view of the rotating shaft 551, FIG. 39B is a plan view when viewed from a side on which the hook member 559 is disposed in the rotating shaft 451, and FIG. 39C is a sectional view along the axial direction including a line illustrated by XXXIXc-XXXIXc in FIG. 39B, respectively.

Figure 39B:
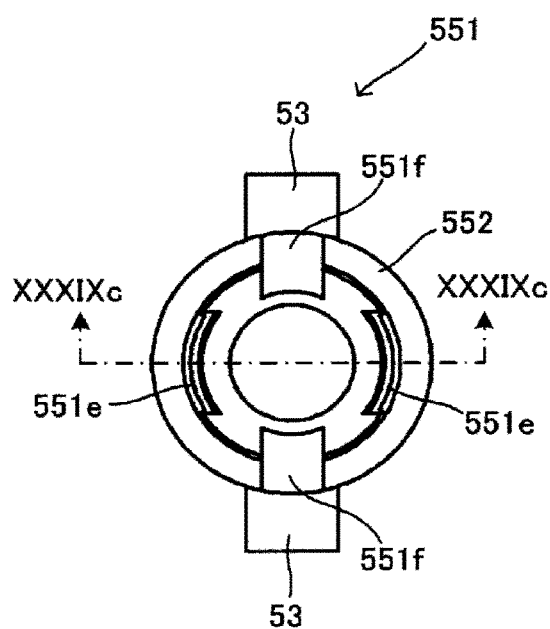
FIG. 39B is a plan view of the rotating shaft 551.
Figure 39C:
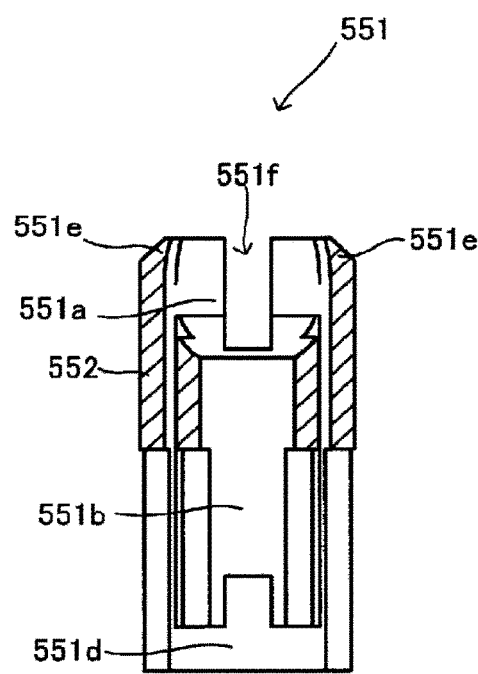
FIG. 39C is a sectional view of the rotating shaft 551.

As can be ascertained from FIGS. 39A to 39C, the rotating shaft 551 includes a cylindrical main body 552. As illustrated in FIG. 39C, on the cylindrical inner side, three spaces 551a, 551b, and 551d which have different inner diameters from each other are aligned in the axial direction. The space 551a is provided in the end portion on the side on which the hook member 559 is disposed in the main body 552, the space 551d is provided in the opposite end portion, and the space 551b is disposed to pass through both spaces 551a and 551d. In the aspect, since the inner diameter of the space 551b is the smallest, a step is generated based on a difference in inner diameters, in a linking portion between the space 551a and the space 551b, and in a linking portion between the space 551d and the space 551b, respectively.

In addition, as can be ascertained from FIGS. 39B and 39C, the space 551a is provided with an undercut portion 551e which is a part inclined in the direction of slightly nipping the opening in an opening portion on the end surface side of the rotating shaft 551. The undercut portion 551e functions as a so-called snap-fit projected portion formed so that a holding projection 562 (refer to FIG. 40) which is a sphere of the hook member 559 which will be described later, does not fall out of the space 551a. Therefore, the opening portion of the space 551a is formed to be narrower than the diameter of the holding projection 562. In the aspect, the undercut portion 551e is formed of the inclined surface, but instead of this, an aspect in which a projection protrudes may be employed.

Two projections 53 are disposed in the end portion on the side where the space 551d is disposed in the outer circumferential portion of the main body 552. Two projections 53 are the same as the projections 53 provided in the main body 52 of the end member 30 which has already been described.

In addition, in the tubular wall portion of the main body 552, in the end portion on a side on which the space 551d is disposed, a slit 551c which extends in the axial direction and communicates with the inside and the outside of the main body 552, is provided between two projections 53. In the slit 551c, an end portion on one side in the direction in which the slit extends is open on an end surface of the main body 552, and the end portion opposite to the opening reaches the middle part of the space 551b.

Furthermore, in the tubular wall portion of the main body 552, two slits 551f are disposed to nip the axis and face each other in the end portion on the side on which the space 551a is disposed. The slit 551f is a slit which extends in the axial direction of the main body 552, and communicates with the inside and the outside of the main body 552, the end portion on one side in the direction in which the slit 551f extends is open on the end surface of the main body 552, and the end portion opposite to the opening has already reached the end portion in the axial direction of the space 551a.

Figure 40A:
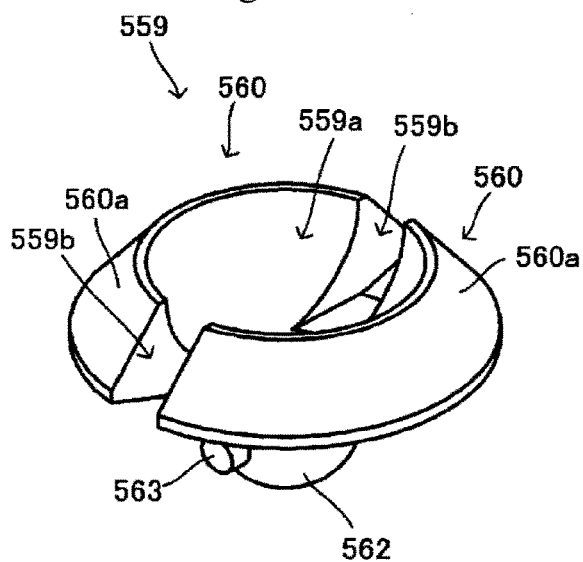
FIG. 40A is a perspective view of a hook member 559.
Figure 40B:
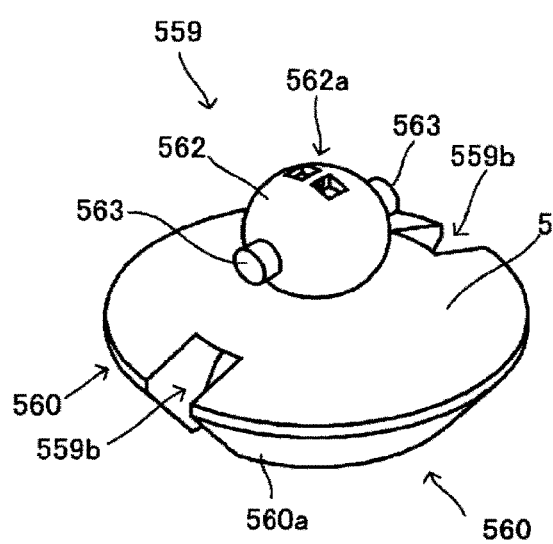
FIG. 40B is a perspective view of the hook member 559 when viewed from the other direction.
Figure 40C:
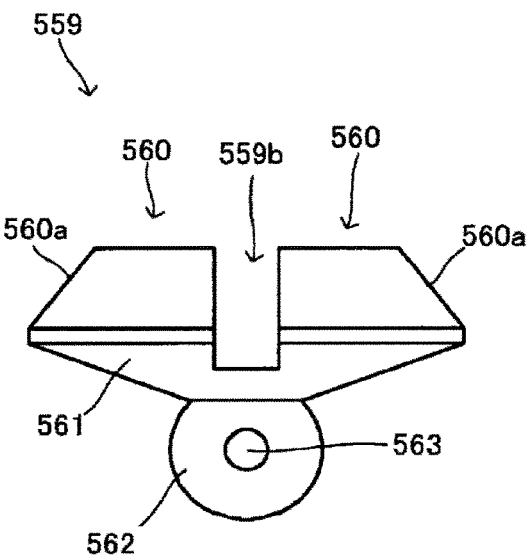
FIG. 40C is a front view of the hook member 559.

Returning to FIGS. 38A and 38B, the hook member 559 will be described. The hook member 559 is a member which configures the rotating force transmission member 554, and is a member which is engaged with the driving shaft 70 (refer to FIG. 16A) provided in the apparatus main body 2, and transmits the rotating force to the rotating shaft 551. FIG. 40 is a view illustrating this. FIG. 40A is a perspective view of the hook member 559, FIG. 40B is another perspective view of the hook member 559 when viewed from the side opposite to FIG. 40A, and FIG. 40C is a front view of the hook member 559.

The hook member 559 includes two engagement hooks 560, and a disk-like linking piece 561 which links end portions of the two engagement hooks 560 to each other. In addition, on a side opposite to the engagement hooks 560 of the linking piece 561, a holding projection 562 is provided at the center of the disk-like linking piece 561.

Two engagement hooks 560 are members which stand in the same direction from an edge of a surface on one side of the disk-like linking piece 561, and forms a wall curved in a shape of an arc. Therefore, a container-like recessed portion 559a which is surrounded by considering the linking piece 561 as a bottom portion and two engagement hooks 560 as walls, is formed. In addition, a void 559b is formed between end portions of two engagement hooks 560. The tip end of the shaft portion 71 of the driving shaft 70 (refer to FIG. 16A) enters the recessed portion 559a, and the shape by which the rotating force transmission projection 72 of the driving shaft 70 can be disposed in the void 559b, is formed.

In addition, in the aspect, two engagement hooks 560 are inclined to be separated from each other according to the separation from the linking piece 561 with respect to the surface (inner surface) on the recessed portion 559a side, and are formed so that the diameter becomes greater according to the separation from the linking piece 561. Meanwhile, in two engagement hooks 560, the outer circumferential surface which is opposite to the recessed portion 559a are inclined surfaces 560a to approach each other according to the separation from the linking piece 561. The inclined surface 560a acts similar to the inclined surface 60a of the engagement hook 60 which has already been described.

On the surface opposite to the engagement hook 560 in the linking piece 561, the holding projection 562 is a projection which is disposed at a position which is the center of the disk-like linking piece 561. In the aspect, the holding projection 562 is a spherical member. In addition, two regulation projections 563 protrude from a surface of the holding projection 562 on one diameter of a sphere in the holding projection 562. It is preferable that the diameter of the sphere in which the regulation projection 563 is disposed, is in parallel (in the aspect) to the direction which is orthogonal to the axis of the end member 530 and in which two voids 559b are aligned, or in the direction orthogonal to the direction in which the voids 559b are aligned. The regulation projection 563 is disposed on the inner side of the slit 551f of the above-described rotating shaft 551.

In addition, as can be ascertained from FIG. 40B, a hole 562a is formed at a part opposite to the side on which the linking piece 561 is disposed in the holding projection 562. As will be described later, a hook member elastic member 564 is fixed to the hole 562a.

Here, as will be described later, the diameter of the sphere of the holding projection 562 of the hook member 559 is substantially the same as or slightly smaller than the inner diameter of the space 551a formed in the main body 552 of the rotating shaft 551. However, as described above, the undercut portion 551e (or a projection) is formed in the opening portion on the side on which the holding projection 562 is inserted in the space 551a of the rotating shaft 551, and functions as a falling prevention member. Therefore, the spherical diameter of the holding projection 562 is greater than the opening portion in which the undercut portion 551e is formed.

By combining the bearing member 40 and the shaft member 550 with each other as follows, the end member 530 is made. In addition, by describing the combination, the size of each member and part, the structure, or the relationship of the sizes of the members and parts, are further understood.

Here, since the combination between the bearing member 40 and the rotating shaft 551 is the same as that in the example of the end member 30, the description thereof will be omitted.

Figure 41A:
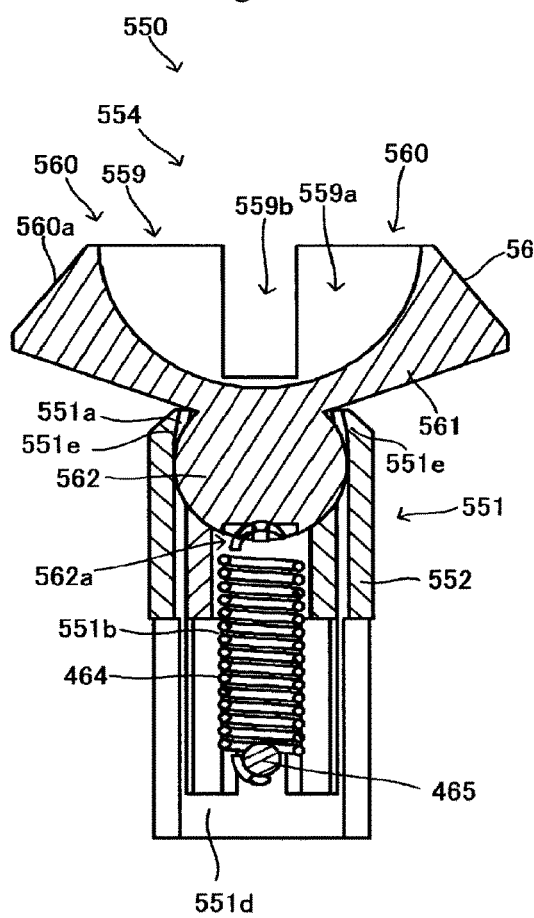
FIG. 41A is one sectional view of the shaft member 550.
Figure 41B:
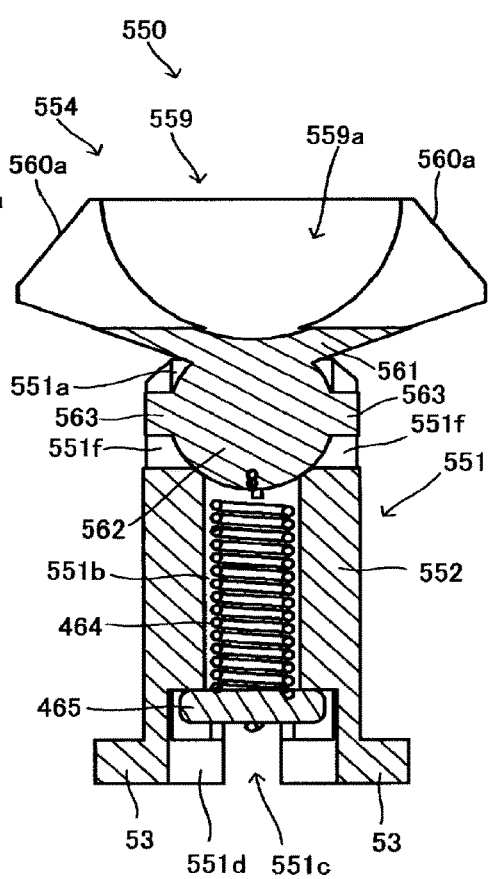
FIG. 41B is another sectional view of the shaft member 550.

The combination of the members with respect to the rotating shaft 551 in the shaft member 550 will be described. FIG. 41 is a view illustrating this. FIG. 41A is a section orthogonal to the diameter direction of the holding projection 562 including two regulation projections 563, and is a sectional view along the axis of the shaft member 550 in the direction in which the engagement hooks 560 are aligned and FIG. 41B is a section along the diameter direction of the holding projection 562 including two regulation projections 563, and is a sectional view along the axis of the shaft member 550 in the direction in which the voids 559b are aligned.

As can be ascertained from FIGS. 38A, 38B, 41A, and 41B, in the aspect, the hook member elastic member 464 is disposed in the space 551b of the main body 552 of the rotating shaft 551. At this time, in the hook member elastic member 464, the pin 465 is attached to the end portion on the space 551d side, and the pin 465 is hooked to the step which is formed by the space 451b and the space 451d in the main body 552. Accordingly, the hook member elastic member 464 is held on the inner side of the main body 552. In addition, when the end portion of the hook member elastic member 464 and the pin 465 are attached to each other, it is possible to perform work by inserting or the like a tool into the main body 552 from the slit 551c for appropriately fixing the end portion of the hook member elastic member 464 to the pin 465, and the assembly is easily performed. Here, the hook member elastic member 464 may be any of the compression spring and the extension spring. In the aspect, an aspect of the extension spring is illustrated. Since the extension spring is likely to maintain the hook member 559 in the basic posture (posture illustrated in FIGS. 41A and 41B), it is preferable to use the extension spring.

Meanwhile, the hook member 559 is inserted from the side on which the space 551a is disposed, in the main body 552 of the rotating shaft 551. In other words, the holding projection 562 of the hook member 559 is inserted into the space 551a of the rotating shaft 551. At this time, the regulation projection 563 is disposed on the inner side of the slit 551f of the main body 552. In addition, the holding projection 462 of the hook member 559 is fixed to one end of the hook member elastic member 464 by the hole 562a provided here. At this time, since the undercut portion 551e is formed in the opening portion of the space 551a, by slightly pushing the hook member 559, the holding projection 562 is disposed in the space 551a. When the holding projection 462 enters the space 551a, the holding projection 562 does not fall out of the space 551a by the undercut portion 551e in a normal use.

By the combination described above, the axes of each of the bearing member 40 and the shaft member 550 are disposed to match each other.

Figure 42:
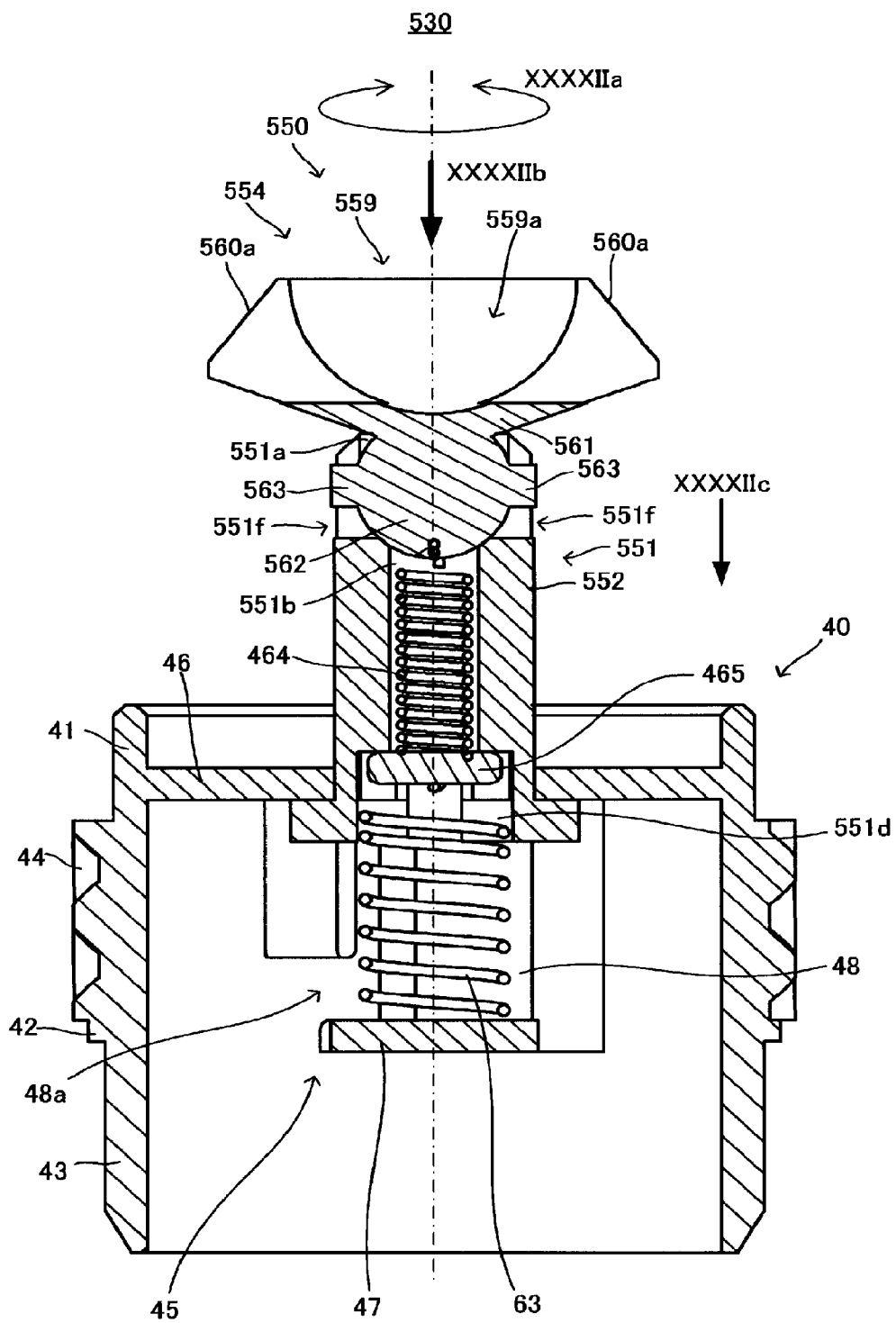
FIG. 42 is a sectional view of an end member 530.

Next, how the end member 530 can be deformed, move, and rotate, will be described. FIG. 42 is a sectional view along the axis in one posture of the end member 530 of the aspect.

In the posture illustrated in FIG. 42, by the biasing force of the rotating shaft elastic member 63, a posture in which the entire shaft member 550 protrudes the most from the bearing member 40 within a possible range, is achieved. When any external force is not applied to the shaft member 550, the end member 530 has this basic posture.

In this posture, as can be ascertained from FIG. 42, since the regulation projection 563 of the hook member 559 is disposed on the inner side of the slit 551f of the rotating shaft 551, when the rotating force is applied to the engagement hook 560 of the hook member 559 as illustrated by XXXXIIa in FIG. 42, the regulation projection 563 of the hook member 559 is hooked to the side surface of the slit 551f of the rotating shaft 551, and the rotating force is transmitted. In addition, the projection 53 of the rotating shaft 551 presses the slit wall of the slit 48a, and the rotating force is transmitted to the bearing member 40. Therefore, the entire end member 530 rotates by the rotating force received by the engagement hook 560.

In addition, as illustrated by an arrow XXXXIIb in FIG. 42, when the pressing force acts to the hook member 559 toward the bearing member 40 side in the axial direction, the hook member 559 presses the rotating shaft 551, and the entire shaft member 550 moves in the direction of being pressed to the bearing member 40 as illustrated by XXXXIIc in FIG. 36 against the biasing force of the rotating shaft elastic member 63.

Figure 43A:
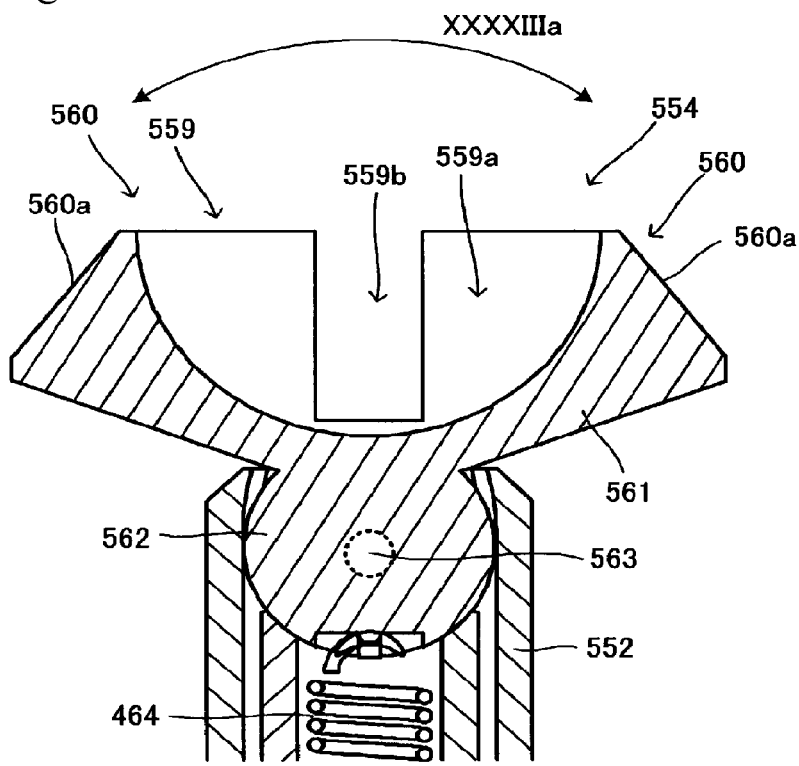
FIG. 43A is one sectional view illustrating the periphery of the hook member 559 in the end member 530.
Figure 43B:
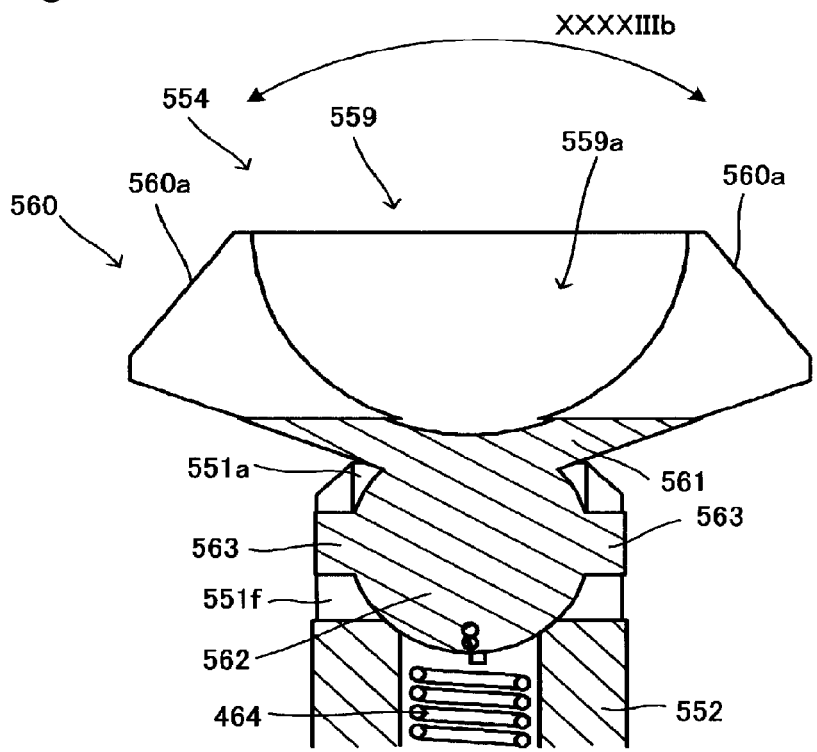
FIG. 43B is another sectional view illustrating the periphery of the hook member 559 of the end member 530.

FIGS. 43A and 43B are enlarged views illustrating the vicinity of the rotating force transmission member 554. FIG. 43A is a view from the same viewpoint as that of FIG. 41A, and FIG. 43B is a view from the same viewpoint as that of FIG. 41B. When the external force is not applied, the hook member 559 holds a basic posture illustrated in FIGS. 43A and 43B by the hook member elastic member 464.

Meanwhile, as the external force is applied, the hook member 559 swings around the axis of the regulation projection 563 as illustrated by an arrow XXXXIIIa in FIG. 43A against the elastic force of the hook member elastic member 464. At this time, since the regulation projection 563 is disposed in the slit of the rotating shaft 551, rattling is suppressed and smooth swing is possible.

Furthermore, as the external force is applied, the hook member 559 can also swing around the spherical holding projection 562 on the surface on which the regulation projection 563 moves within the slit 551f, as illustrated by an arrow XXXXIIIb in FIG. 43B against the elastic force of the hook member elastic member 464. At this time, since the holding projection 562 is spherical, and the diameter of the holding projection 562 is formed to be substantially the same as the inner diameter of the space 551a in which the holding projection 562 is disposed, rattling is suppressed and smooth swing is possible.

Therefore, the hook member 559 can swing in all directions.

Next, an example of operations of the driving shaft 70 when mounting the process cartridge including the photoreceptor drum unit 510 provided with the end member 530 on the apparatus main body 2 and a posture in which the rotating force is transmitted is achieved, and the photoreceptor drum unit 510, will be described. FIGS. 44A to 44C, 45A, and 45B are views illustrating this. FIGS. 44A to 44C, 45A, and 45B illustrate views following an order of a process of engaging the driving shaft 70 with the hook member 559.

Figure 44A:
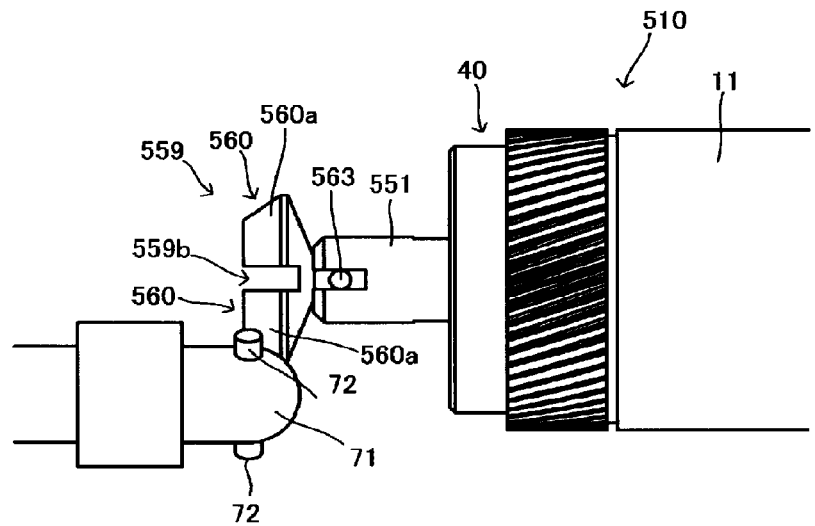
FIG. 44A is a view illustrating a situation in which the driving shaft 70 and a photoreceptor drum unit 510 are engaged with each other.
Figure 44B:
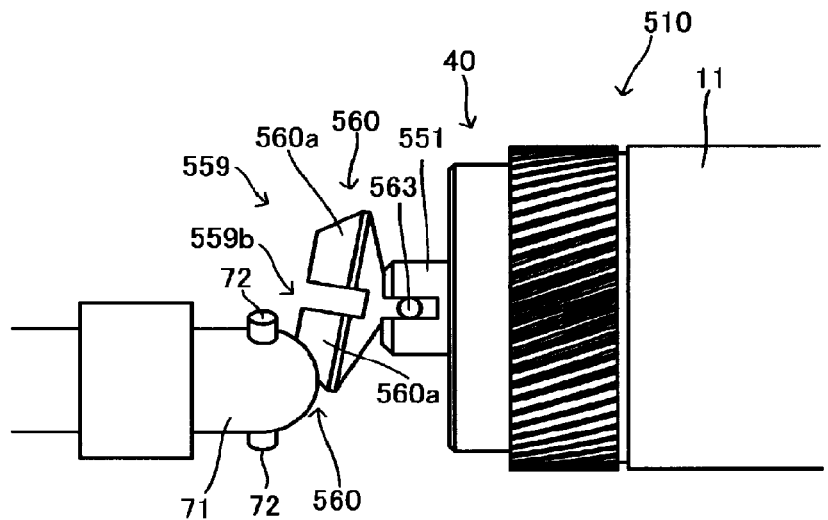

First, as illustrated in FIG. 44B from a state illustrated in FIG. 44A, the photoreceptor drum unit approaches the driving shaft 70 from the direction orthogonal to the axial direction of the driving shaft 70. At this time, in the photoreceptor drum unit 510, the end member 530 is oriented toward the driving shaft 70 side, and the axis thereof is oriented to become parallel to the axis of the driving shaft 70, and the photoreceptor drum unit 510 approaches the driving shaft 70 while moving in the direction orthogonal to the axis. At this time, the shaft member 550 is in a posture illustrated in FIG. 42.

In a situation illustrated in FIG. 44B, the tip end of the shaft portion 71 of the driving shaft 70 comes into contact with the engagement hook 560, the inclined surface 560a of the engagement hook 560 is pressed, and accordingly, the hook member 559 swings. At this time, in the shaft member 550, the component of force of pressing the shaft member 550 in the axial direction is generated, and the shaft member 550 moves in the axial direction to be pressed toward the bearing member 40. In addition, as the hook member 559 largely swings, the apparent inclination angle of the inclined surface 560a viewed from the shaft member 550 increases, the component of force of pressing in the axial direction becomes strong, and thus, the shaft member 550 is further pressed in the axial direction and smooth engagement is possible.

Figure 44C:
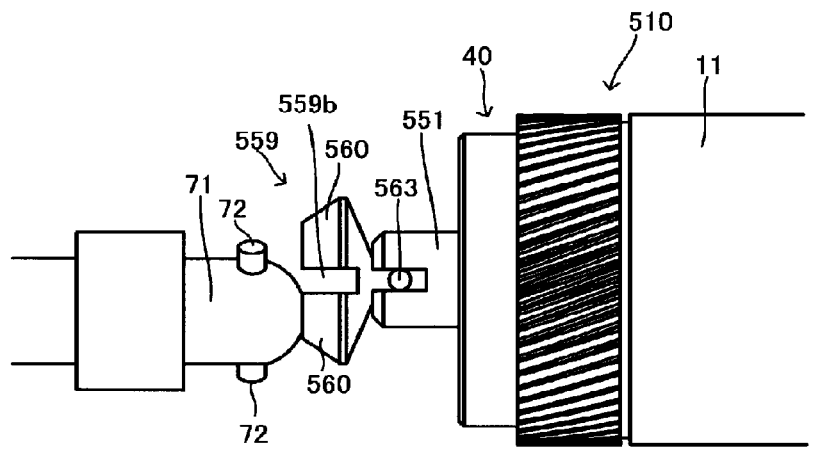
FIG. 44C is a view illustrating another situation in which the driving shaft 70 and the photoreceptor drum unit 510 are engaged with each other.
Figure 45A:
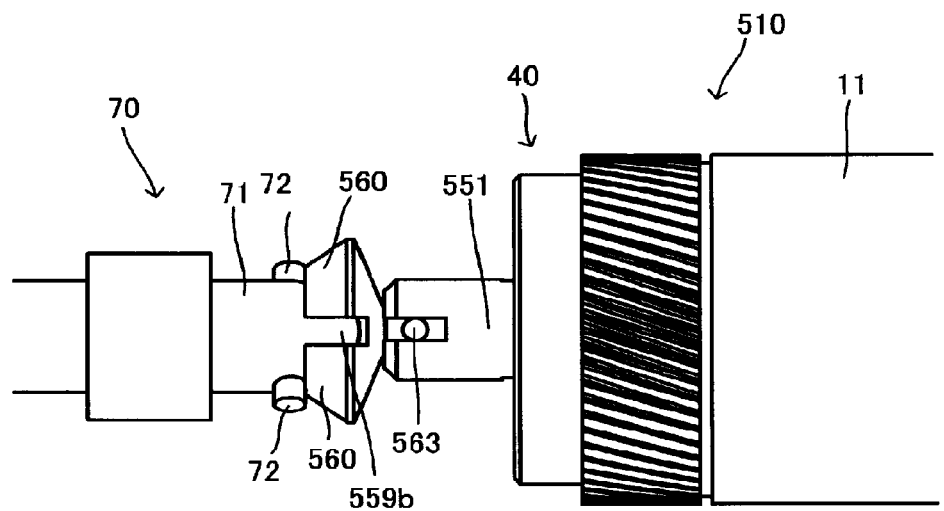
FIG. 45A is a view illustrating a situation in which the driving shaft 70 and the photoreceptor drum unit 510 are engaged with each other.

Furthermore, when the photoreceptor drum unit 510 approaches the driving shaft 70, as illustrated in FIG. 44C, the shaft portion 71 of the driving shaft 70 exceeds the engagement hook 560, and enters the inner side of the recessed portion 559a. However, at this time, the rotating force transmission projection 72 of the driving shaft 70 cannot enter the void 559b, and when the axis of the driving shaft 70 and the axis of the shaft member 550 match each other while maintaining this state, a state of FIG. 45A is achieved. In other words, a state where the rotating force transmission projection 72 of the driving shaft 70 is on an edge of the tip end of the engagement hook 560, is achieved. At this time, a state where the shaft member 550 moves to be pressed to the bearing member 40 side, is achieved. At this point of time, the rotating force from the driving shaft 70 is not transmitted to the hook member 559.

Figure 45B:
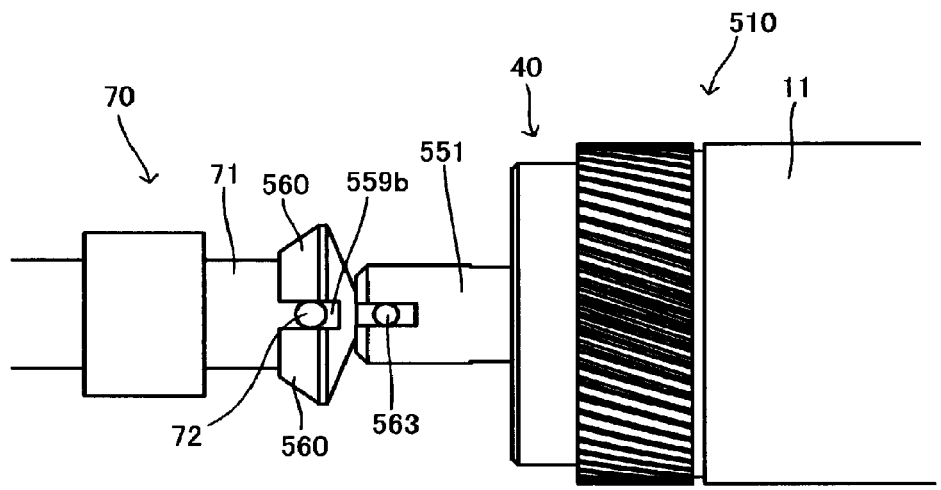
FIG. 45B is a view illustrating another situation in which the driving shaft 70 and the photoreceptor drum unit 510 are engaged with each other.

From this posture, the driving shaft 70 starts to rotate for the driving transmission. Accordingly, as illustrated in FIG. 45B, when the rotating force transmission projection 72 matches the position of the void 559b of the hook member 559, the shaft member 550 moves to the driving shaft 70 side by the biasing force of the rotating shaft elastic member 63, the rotating force transmission projection 72 enters the inner side of the void 559b of the hook member 559, and a posture in which the rotating force can be transmitted, is achieved.

As described above, it is possible to mount the process cartridge 3 on the apparatus main body 2 by pushing the process cartridge 3 from the direction different from the axial direction of the driving shaft 70 of the apparatus main body 2. Although detailed behaviors are different, by the above-described structure, similarly, the disengagement is smoothly performed by the swing of the hook member 559, and the movement in the axial direction of the rotating shaft 551 by the component of force in the axial direction generated at this time.

Figure 46:
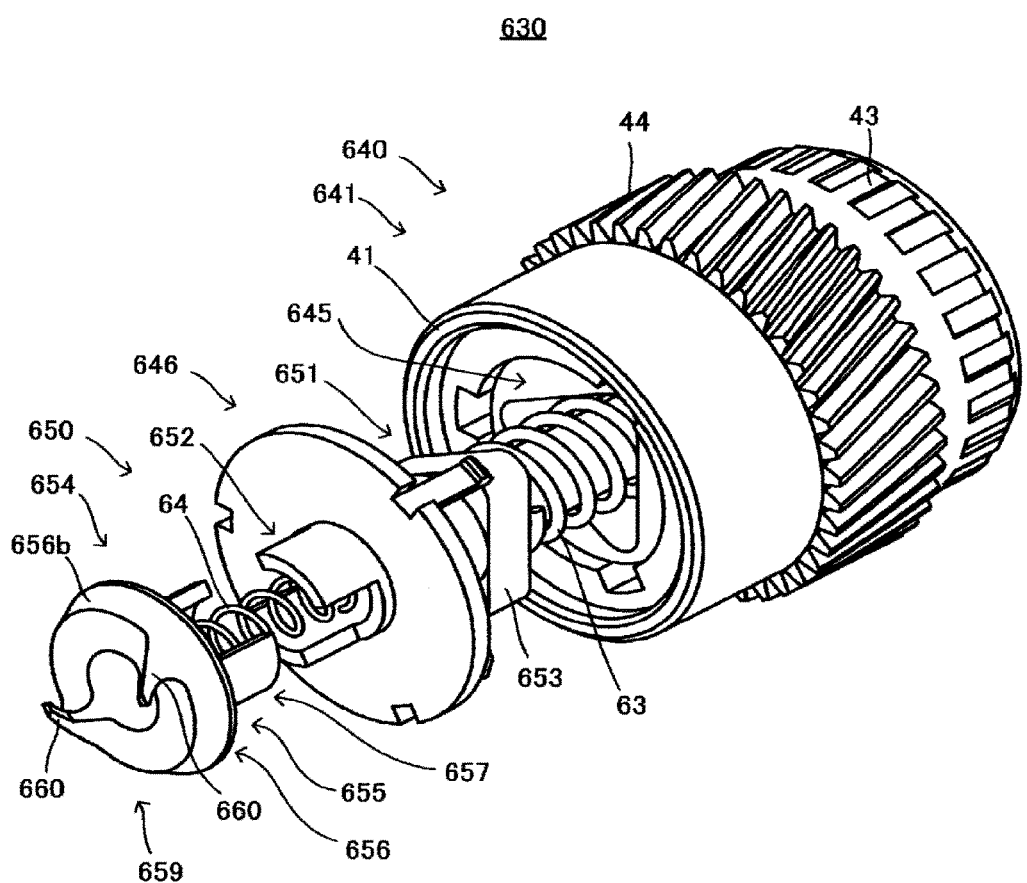
FIG. 46 is an exploded perspective view of an end member 630.
Figure 47:
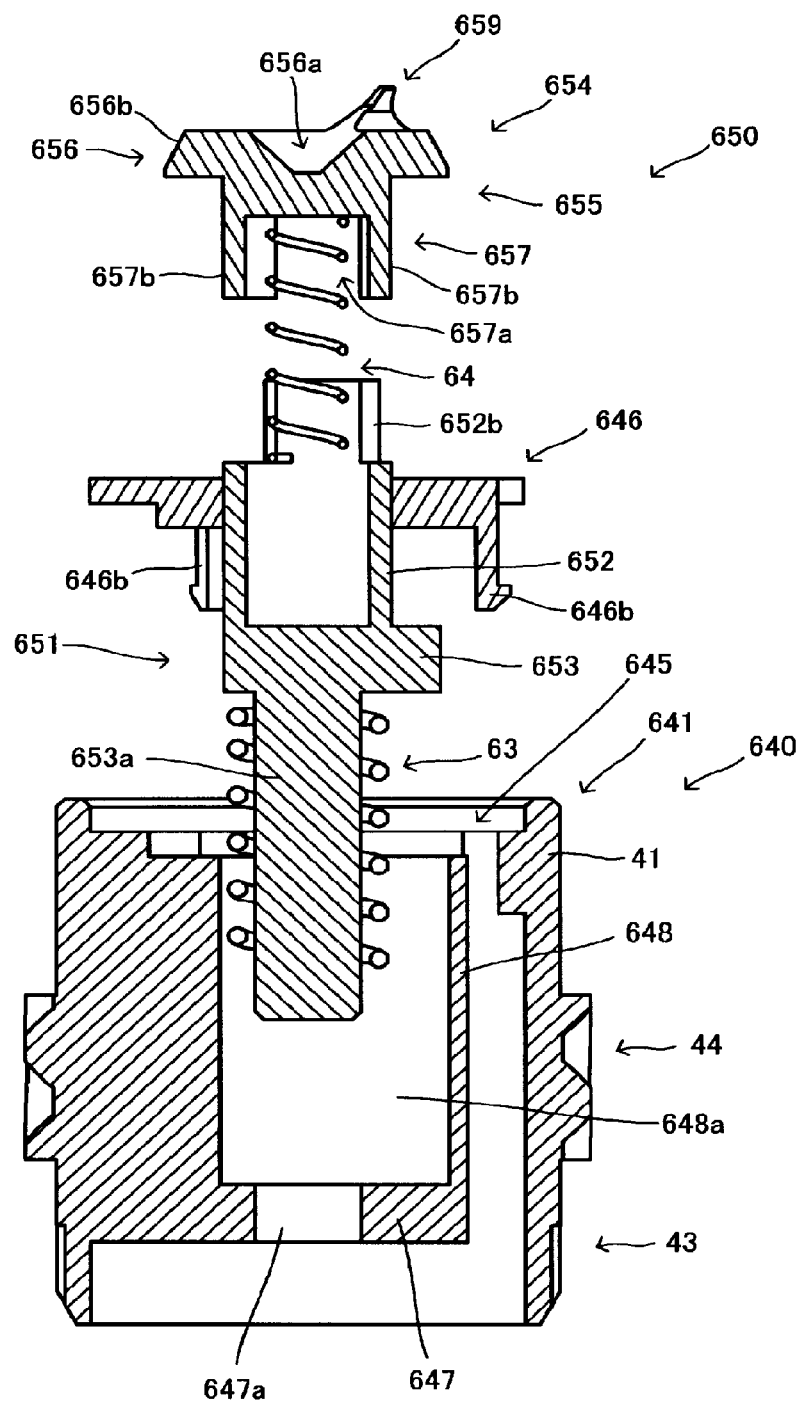
FIG. 47 is an exploded sectional view of the end member 630.

Next, a seventh aspect will be described. FIG. 46 is an exploded perspective view of an end member 630 included in the seventh aspect, and FIG. 47 is an exploded sectional view along the axis of the end member 630. Similar to the end member 30, the end member 630 is a member which is attached to the end portion opposite to the above-described lid material 20 of the tip portion of the photoreceptor drum 11, and is provided with a bearing member 640 and a shaft member 650.

Figure 48:
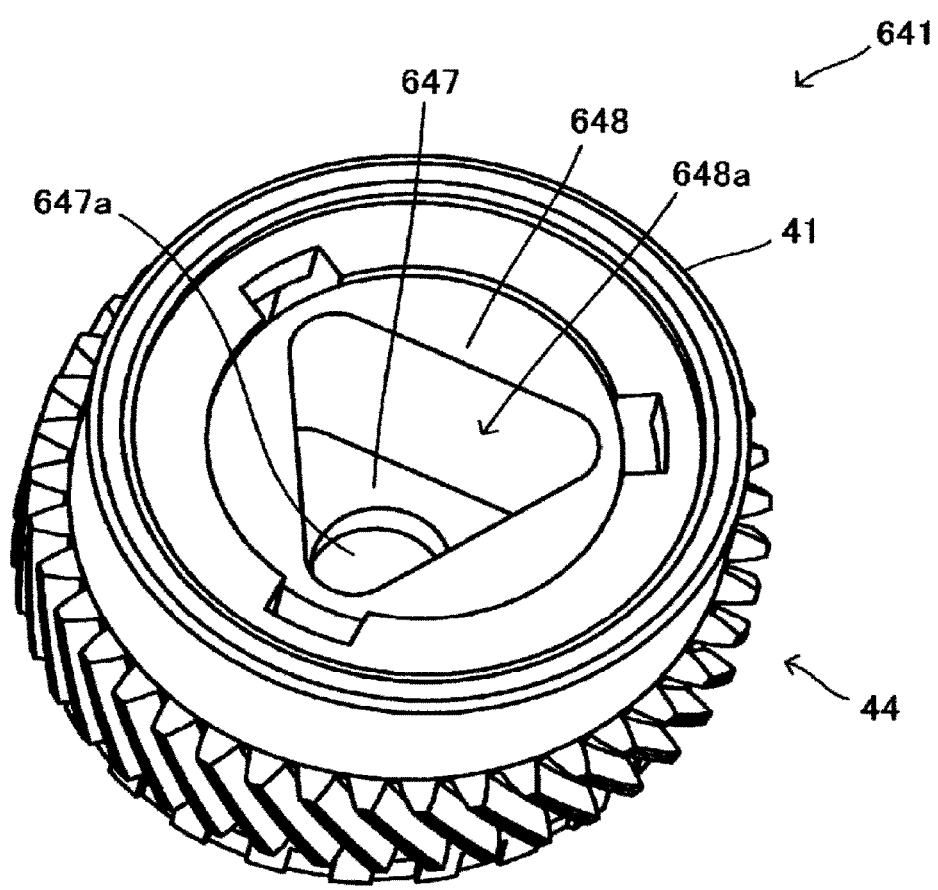
FIG. 48 is a perspective view of a bearing member 640.

The bearing member 640 is a member which is bonded to the end portion of the photoreceptor drum 11 in the end member 630. FIG. 48 is a perspective view of a main body 641 of the bearing member 640. In addition, FIG. 47 is a sectional view in the axial direction of the bearing member 640.

The bearing member 640 includes the main body 641 and a rotating shaft holding member 646, and as can be ascertained from FIGS. 46 to 48, the main body 641 includes the tubular body 41, the fitting portion 43, the gear portion 44, and a shaft member holding portion 645.

Since the tubular body 41, the fitting portion 43, and the gear portion 44 are similar to those of the above-described end member 30, the same reference numerals will be given, and the description thereof will be omitted.

The shaft member holding portion 645 is a part which is formed on the inner side of the tubular body 41, and which has a function of holding the shaft member 650 in the hearing member 640. As can be ascertained from FIGS. 46 and 47, the shaft member holding portion 645 includes the rotating shaft holding member 646, a support member 647, and a guide wall 648.

Figure 49A:
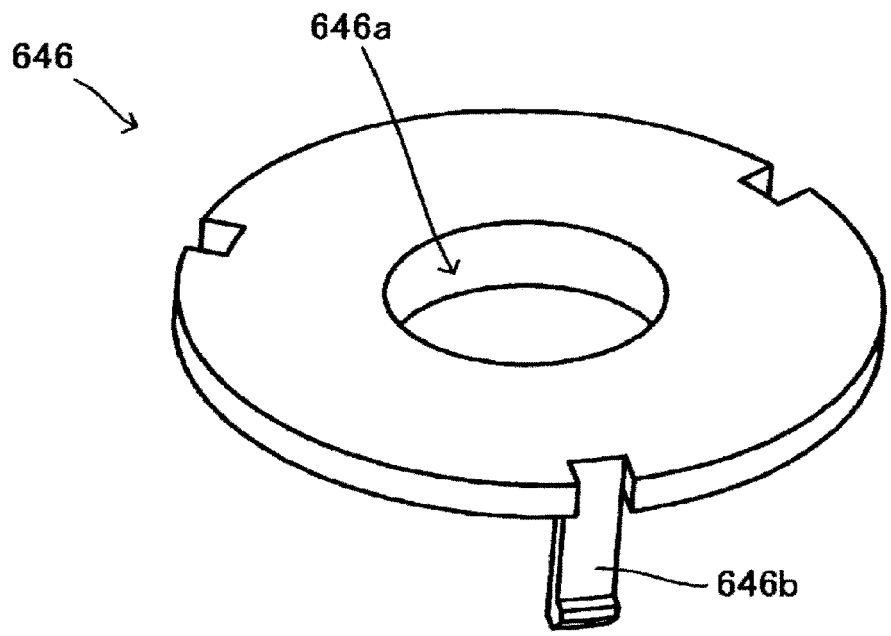
FIG. 49A is one perspective view of a rotating shaft holding member 646.
Figure 49B:
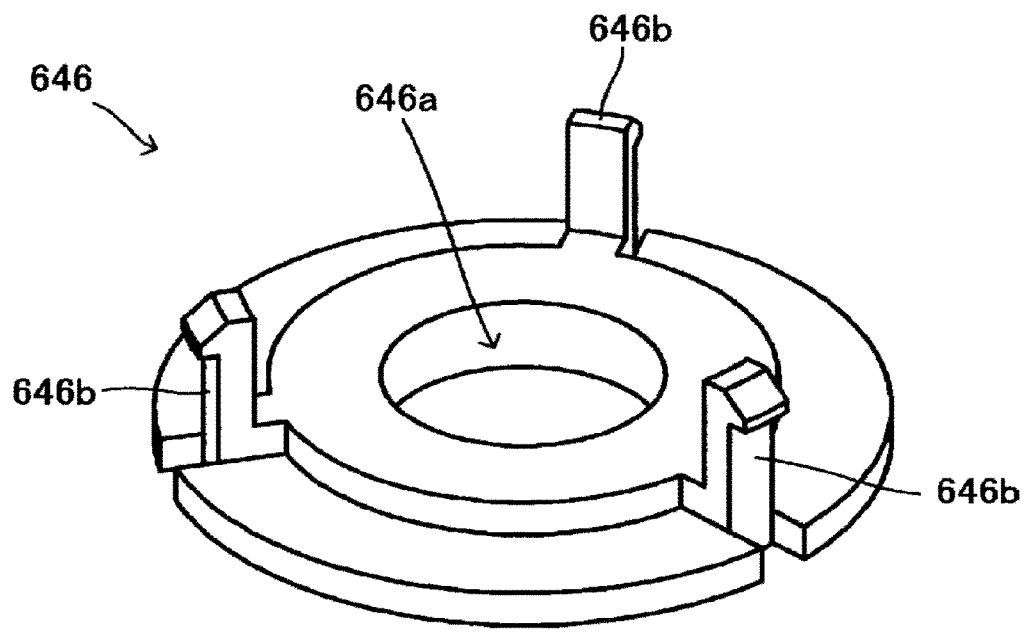
FIG. 49B is another perspective view of the rotating shaft holding member 646.

The rotating shaft holding member 646 is a plate-like member which is formed to block the inner side of the tubular body 41, but is formed in a shape of a lid which is attachable to and detachable from the main body 641 in the aspect. FIG. 49A is one perspective view of the rotating shaft holding member 646, and FIG. 49B is a perspective view when viewed from a surface side opposite to FIG. 49A.

In the rotating shaft holding member 646, a hole 646a which is coaxial to the axis of the tubular body 41 is formed in a posture of being mounted on the main body 641. Since the hole 646a penetrates a rotating shaft 651 as will be described later, the rotating shaft 651 has the size and the shape by which the rotating shaft 651 can penetrate. However, in order to prevent the rotating shaft 651 from falling out, the hole 646a can penetrate a main body 652 of the rotating shaft 651, but cannot penetrate a part on which a projection 653 is disposed. In addition, from the viewpoint of stabilized movement of the rotating shaft 651, it is preferable that the hole 646a has the shape and the size which are substantially the same as the outer circumference of the main body 652 of the rotating shaft 651 within a range in which the hole 646a does not interrupt the movement of the rotating shaft 651 in the axial direction.

In addition, in the aspect, since the rotating shaft holding member 646 is an aspect which is attachable to and detachable from the main body 641, a hook 646b which is engaged with the main body 641 is provided. However, the aspect for attaching the rotating shaft holding member to the main body is not limited thereto, and adhering by the adhesive, or fusion by heat or ultrasonic wave, can be employed.

The support member 647 is a plate-like member which is provided further on the fitting portion 43 side than the rotating shaft holding member 646, and is formed to block at least a part of the inner side of the tubular body 41. The support member 647 is formed in the size and the shape by which at least the rotating shaft elastic member 63 which will be described later can be supported. In addition, in the support member 647 in the aspect, a hole 647a through which an elastic member holding projection 653a provided in the rotating shaft 651 penetrates, is formed.

The guide wall 648 is a tubular member which extends in parallel to the axial direction of the tubular body 41 on the side opposite to the fitting portion 43 from the support member 647. In the aspect, the sectional shape of a space 648a which is formed on the inner side surrounded by the guide wall 648, is substantially triangular (top point takes R in a shape of an arc) as can be ascertained from FIG. 48, and is substantially the same as the shape of the projection 653 of the rotating shaft 651. Therefore, the space 648a surrounded by the guide wall 648 has a shape of a triangular prism which considers the direction along the axis of the bearing member 640 as the height direction.

A material which configures the bearing member 640 is not particularly limited, but it is possible to use a material similar to that of the above-described bearing member 40.

Returning to FIGS. 46 and 47, the shaft member 650 of the end member 630 will be described. As can be ascertained from FIG. 47, the shaft member 650 is provided with the rotating shaft 651 and a rotating force transmission member 654, and the rotating force transmission member 654 is configured to include a tip end member 655 and a hook member 659. In the aspect, the tip end member 655 and the hook member 659 are integrally formed.

Furthermore, the shaft member 650 is provided with the rotating shaft elastic member 63 and the hook member elastic member 64. Any of the rotating shaft elastic member 63 and the hook member elastic member 64 in the aspect is a coiled spring.

Hereinafter, each of the cases will be described.

Figure 50A:
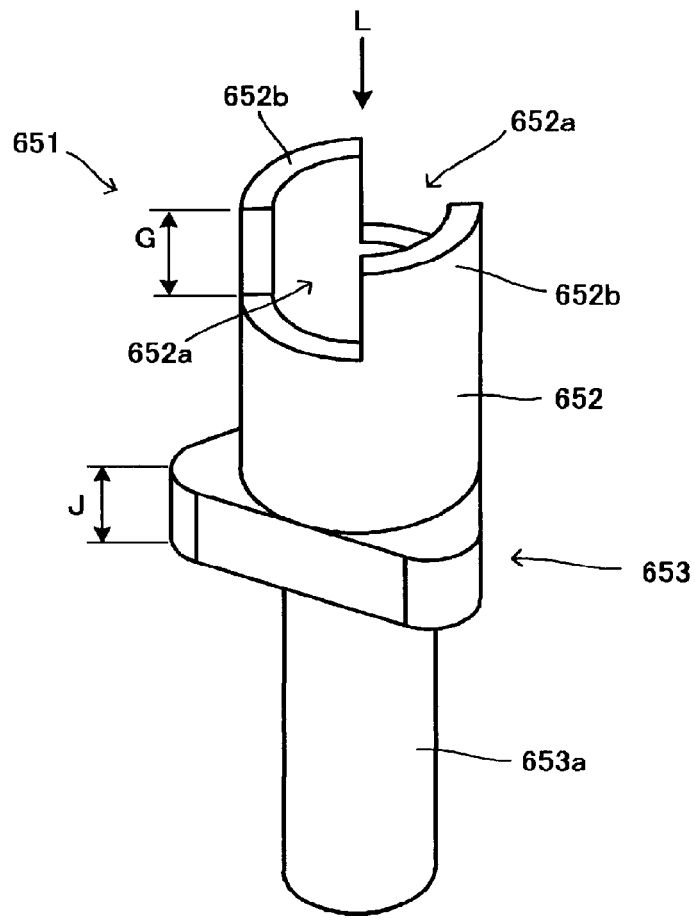
FIG. 50A is a perspective view of a rotating shaft 651.
Figure 50B:
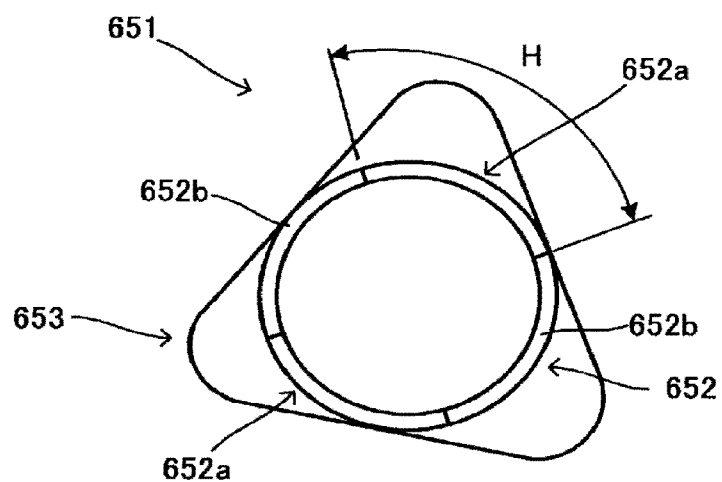
FIG. 50B is a plan view of the rotating shaft 651.

The rotating shaft 651 is a shaft-like member which transmits the rotating force received by the rotating force transmission member 654 to the bearing member 640. FIG. 50A is a perspective view of the rotating shaft 651, and FIG. 50B is a plan view of the rotating shaft when viewed from the direction illustrated by L in FIG. 50A. In addition, FIG. 47 is a sectional view in the axial direction of the rotating shaft 651.

As can be ascertained from FIGS. 47, 50A, and 50B, the rotating shaft 651 includes the cylindrical main body 652, and cutouts 652a at two locations at a predetermined width in the direction along the axis from the end portion on one side in the direction along the axis, in the cylindrical wall portion. In the aspect, the cutout 652a is rectangular in a side view, and the width thereof is the size having 90° of a center angle in a plan view as illustrated by H in FIG. 50B. Therefore, in the aspect, two cutouts 652a having the width which is the size having 90° of the center angle, are provided to face each other nipping the axis. In addition, the size in the direction along the axis of the cutout 652a illustrated by G in FIG. 50A, is a substantial half of the length in the direction along the axis of the main body 652 in the aspect. Accordingly, a projected portion 652b which is the rest of a wall portion of the main body 652 is formed between two cutouts 652a.

One end side of the hook member elastic member 64 is inserted into the tubular inner side of the main body 652.

Among the end portions of the main body 652, in the end portion opposite to the end portion on a side on which the cutout 652a and the projected portion 652b are formed, the projection 653 is disposed. As can be ascertained more particularly from FIG. 50B, in the projection 653, in a plan view of the rotating shaft 651, a part which protrudes toward the outside from the main body 652 is formed. In the aspect, the projection 653 is a substantially triangular (top point takes R in a shape of an arc) plate-like member, and is substantially the same as the sectional view of the space 648a surrounded by the guide wall 648 of the above-described bearing member 640 (refer to FIG. 48). In addition, the thickness of the projection 653 illustrated by J in FIG. 50A, is thinner than the length in the direction along the axis of the guide wall 648. Accordingly, when the projection 653 is disposed in the space surrounded by the guide wall 648, movement in the direction along the axis of the rotating shaft 651 is possible, and the rotating force is transmitted to the bearing member 640 from the rotating shaft 651 with respect to the rotation around the axis.

Furthermore, in the aspect, in the projection 653, on the surface opposite to the side on which the main body 652 is disposed, the columnar elastic member holding projection 653a extends. As will be described later, the elastic member holding projection 653a penetrates the inner side of the rotating shaft elastic member 63, and further, a tip end thereof passes through the hole 647a of the support member 647. Accordingly, stability of the movement in the direction along the axis of the rotating shaft 651 is improved.

It is preferable that the axis of the above-described main body 652, the center of gravity of the projection 653, and the axis of the elastic member holding projection 653a, are disposed coaxially.

Figure 51A:
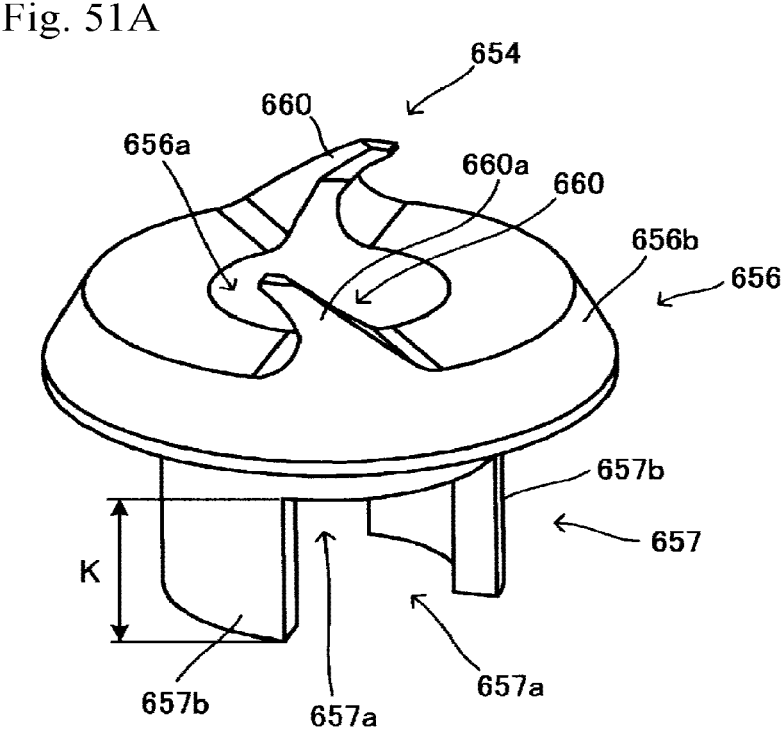
FIG. 51A is a perspective view of a rotating force transmission member 654.
Figure 51B:
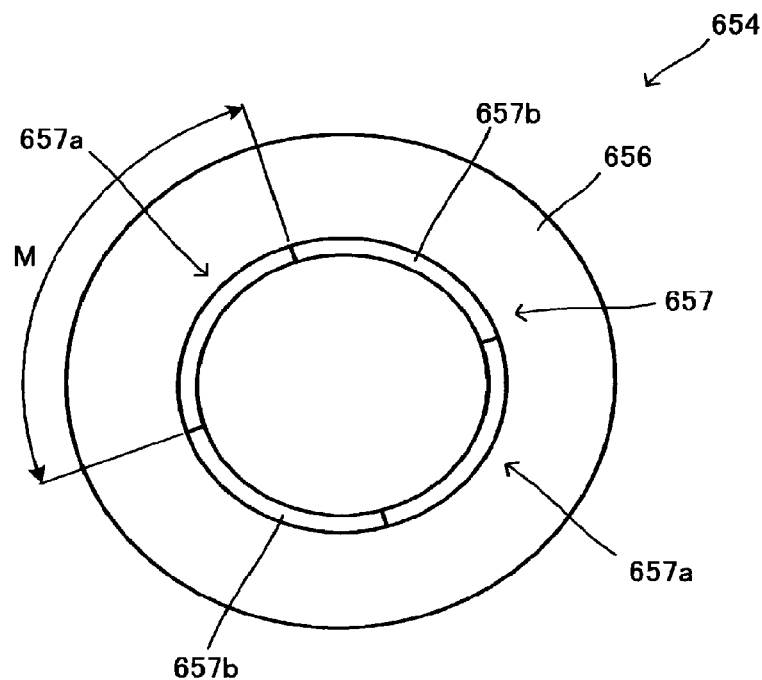
FIG. 51B is a plan view of the rotating force transmission member 654.

Returning to FIGS. 46 and 47, other members will be continuously described. In the aspect, the rotating force transmission member 654 is integrally configured with the tip end member 655 and the hook member 659. The tip end member 655 is a member which holds an engagement hook 660 (in the aspect, the hook member 659 is configured only of the engagement hook 660) to be swingable, and transmits the rotating force from the engagement hook 660 to the rotating shaft 651. FIG. 51A is a perspective view of the rotating force transmission member 654, and FIG. 51B is a bottom view of the rotating force transmission member 654 when viewed from the side opposite to the side on which the engagement hook 660 is disposed. In addition, FIG. 47 is a sectional view along the axis of the rotating force transmission member 654.

As can be ascertained from the drawings, the tip end member 655 is configured to include a disk-like base portion 656 and a rotating shaft linking portion 657 which extends on one surface of the base portion 656.

In the aspect, the base portion 656 has a shape of a disk, and a recessed portion 656a is provided at the center of the surface opposite to the rotating shaft linking portion 657 on the plate surface. A tip end part of the above-described driving shaft 70 is disposed in the recessed portion 656a.

In addition, on the outer circumferential surface of the base portion 656, an inclined surface 656b is formed so that the diameter becomes smaller according to the separation from the rotating shaft linking portion 657. The inclined surface acts similar to the inclined surface 57b (refer to FIG. 9A) of the above-described holding member 57.

The rotating shaft linking portion 657 is a cylindrical part which extends from the surface opposite to the recessed portion 656a in the base portion 656, and the center shaft of the base portion 656 and the axis of the rotating shaft linking portion 657 are formed coaxially. In addition, the rotating shaft linking portion 657 is provided with cutouts 657a at two locations at a predetermined width in the direction along the axis from the end portion on the side opposite to the base portion 656, in the cylindrical wall portion. In the aspect, the cutout 657a is rectangular in a side view, and the width thereof is the size having 90° of a center angle in a plan view as illustrated by M in FIG. 51B. Therefore, in the aspect, two cutouts 657a having the width which is the size having 90° of the center angle, are provided to face each other nipping the axis. In addition, the size in the direction along the axis of the cutout 657a illustrated by K in FIG. 51A, is the same as the size (G in FIG. 50A) of the cutout 652a provided in the main body 652 of the above-described rotating shaft 651 in the aspect. Accordingly, a projected portion 657b which is the rest of a wall portion of the rotating shaft linking portion 657 is formed between two cutouts 657a.

One end side of the hook member elastic member 64 is inserted into the tubular inner side of the rotating shaft linking portion 657.

In addition, as will be described later, as the projected portion 652b of the main body 652 of the above-described rotating shaft 651 is inserted into the cutout 657a of the rotating shaft linking portion 657, and the projected portion 657b of the rotating shaft linking portion 657 is inserted into the cutout 652a provided in the main body 652 of the rotating shaft 651, the rotating shaft linking portion 657 and the rotating shaft 651 are linked to each other. Therefore, the outer diameter and the inner diameter of both cylinders can be linked to each other in this manner.

The hook member 659 is a member which is engaged with the driving shaft 70 (refer to FIG. 16A) provided in the apparatus main body 2, and transmits the rotating force to the tip end member 655.

In the aspect, the hook member 659 is made of two engagement hooks 660, and the engagement hook 660 is disposed on the surface opposite to the side on which the rotating shaft linking portion 657 is disposed in the base portion 656 of the tip end member 655. Two engagement hooks 660 are provided to face the outer edge portion on the surface of the base portion 656, and the recessed portion 656a provided in the base portion 656 is positioned between two engagement hooks 660.

In addition, in the engagement hook 660, the surface which is continuous to the inclined surface 656b of the base portion 656, is an inclined surface 660a which is inclined to extend the inclined surface 656b. The inclined surface 660a acts similar to the inclined surface (outer surface 60a, refer to FIG. 10A or the like) of the above-described engagement hook 60.

Returning to FIGS. 46 and 47, other configuration provided in the shaft member 650 will be illustrated. The rotating shaft elastic member 63 and the hook member elastic member 64 are so-called elastic members, and are made of the coiled spring in the aspect. In addition, the dispositions and the actions of each member will be described later.

A material which configures each member of the shaft member 650 is not particularly limited, but a material similar to that of the above-described shaft member 50 can be used.

Figure 52:
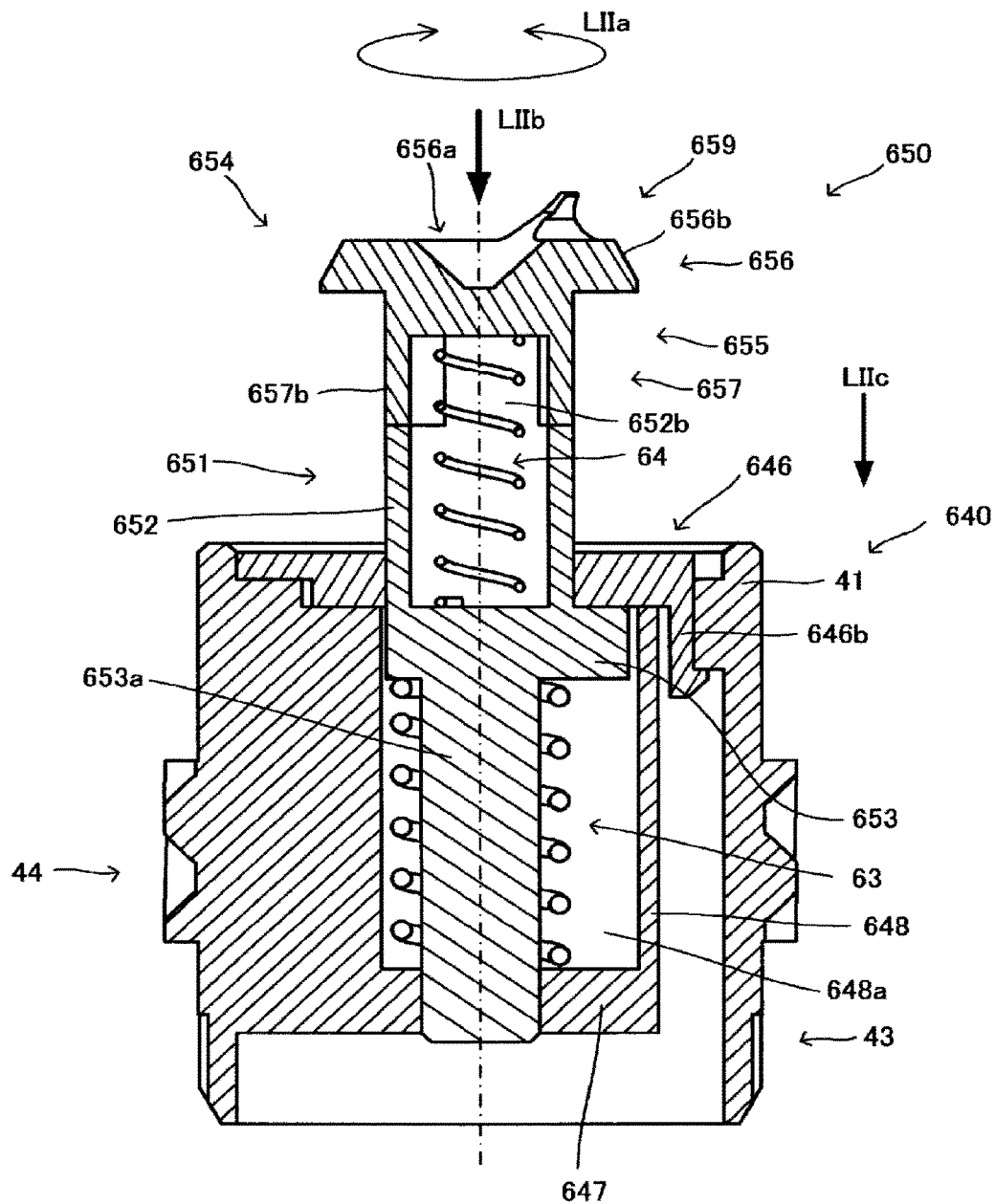
FIG. 52 is a sectional view of the end member 630.

By combining the bearing member 640 and the shaft member 650 with each other as described above, the end member 630 is made. In addition, by describing the combination, the size of each member and part, the structure, or the relationship of the sizes of the members and parts, are further understood. FIG. 52 is sectional view along axis of the end member 630.

As can be ascertained from FIG. 52, in a posture in which the rotating shaft holding member 646 is mounted in the main body 641 in the bearing member 640, the rotating shaft 651 passes through the hole 646a of the rotating shaft holding member 646 of the bearing member 640, the end portion on the side on which the projection 653 is disposed is included on the inner side of the shaft member holding portion 645, the end portion on the opposite side is disposed to protrude from the bearing member 640. At this time, since the projection 653 is disposed in the space surrounded by the guide wall 648, and cannot pass through the hole 646a, the projection 653 is hooked to the rotating shaft holding member 646, the rotating shaft 651 is configured not to fall out of the bearing member 640.

In addition, at this time, the elastic member holding projection 653a of the rotating shaft 651 passes through the inner side of the rotating shaft elastic member 63, and the tip end thereof is disposed to penetrate the hole 647a of the support member 647. Accordingly, the rotating shaft elastic member 63 is disposed between the projection 653 and the support member 647, and the rotating shaft 651 is biased in the direction in which the projection 653 is pressed to the rotating shaft holding member 646. In addition, as the elastic member holding projection 653a passes through the hole 647a, stability of the movement in the direction along the axis of the rotating shaft 651 is improved.

In addition, since the projection 653 and the guide wall 648 are substantially triangular as described above, the projection 653 presses the guide wall 648 and transmits the rotating force during the rotation around the axis of the rotating shaft 651.

Meanwhile, one end of the hook member elastic member 64 is inserted and fixed to the tubular inner side of the main body 652 of the rotating shaft 651.

The tip end member 655 is disposed so that the rotating shaft linking portion 657 abuts against the main body 652 of the rotating shaft 651. At this time, the projected portion 652b of the main body 652 of the above-described rotating shaft 651 is inserted into the inner side of the cutout 657a of the rotating shaft linking portion 657, the projected portion 657b of the rotating shaft linking portion 657 is inserted into the cutout 652a provided in the main body 652 of the rotating shaft 651. Accordingly, the rotating shaft linking portion 657 and the rotating shaft 651 are linked to each other, and the rotation driving force around the axis can be transmitted. At this time, the other end of the hook member elastic member 64 is disposed on the tubular inner side of the rotating shaft linking portion 657, and is fixed thereto.

By the combination described above, the axes of each of the bearing member 640 and the shaft member 650 are disposed to match each other.

Figure 53:
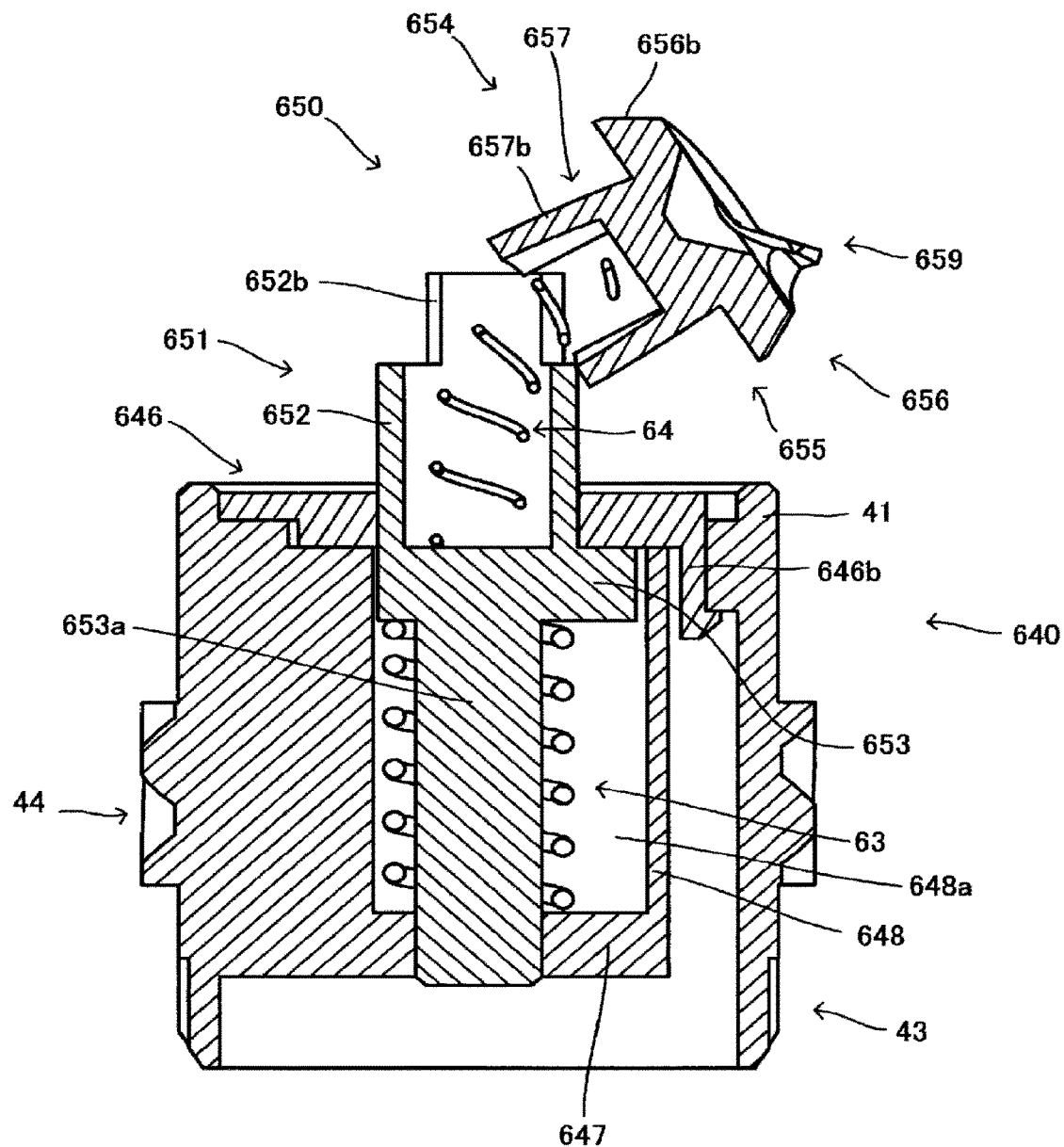
FIG. 53 is another sectional view of the end member 630.

Next, how the end member 630 combined as described above, can be deformed, move, and rotate, will be described. FIG. 53 illustrates a posture when the end member 630 is deformed from the same viewpoint as that of FIG. 52.

In the posture illustrated in FIG. 52, by the rotating shaft elastic member 63, a posture in which the entire shaft member 650 protrudes the most from the bearing member 640 within a possible range, is achieved. When any external force is not applied to the shaft member 650, the end member 630 has this basic posture.

In this posture, when the rotating force is applied to the engagement hook 660 of the hook member 659 as illustrated by an arrow LIIa in FIG. 52, the rotating force is transmitted to the tip end member 655 in which the hook member 659 is integrally formed. In addition, the rotating force is transmitted to the rotating shaft 651, and further, the projection 653 of the rotating shaft 651 presses the guide wall 648, and the rotating force is transmitted to the bearing member 640. Therefore, the entire end member 630 rotates by the rotating force received by the engagement hook 660.

In addition, as illustrated by an arrow LIIb in FIG. 52, when the pressing force acts to the hook member 659 toward the bearing member 640 side in the axial direction, the pressing force is transmitted to the tip end member 655 and the rotating shaft 651, and the entire shaft member 650 moves in the direction of being pressed to the bearing member 640 as illustrated by LIIc in FIG. 52 against the biasing force of the rotating shaft elastic member 63.

Meanwhile, as the external force which is equal to or greater than a predetermined force is applied to the rotating force transmission member 654 from the direction different from the axial direction, the rotating force transmission member 654 is deformed to swing as illustrated in FIG. 53 against the elastic force of the hook member elastic member 64. This is because the rotating shaft linking portion 657 is in the above-described linked state where the rotating shaft linking portion 657 and the main body 652 are linked to each other.

As described above, since the end member 630 also swings and moves similar to the end member 30 which has been already described, the end member 30 similarly acts, and the effects are achieved.

In addition, returning from the posture illustrated in FIG. 52 to the posture illustrated in FIG. 53, may be manually performed, or may be performed by the elastic force of the hook member elastic member 64.

Figure 54:
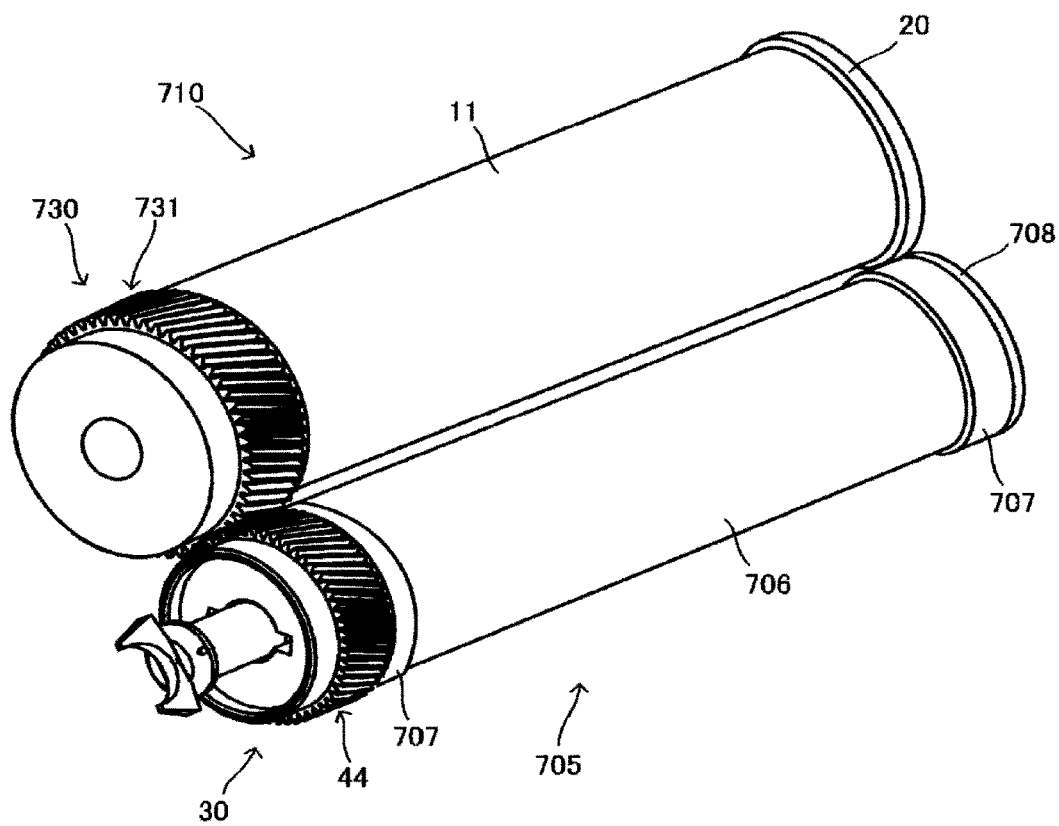
FIG. 54 is a view illustrating an aspect in which the end member 30 is provided in a developing roller unit 705.

Above, an embodiment in which all of the described end members are disposed in the end portion of the photoreceptor drum 11, and accordingly, the photoreceptor drum unit is formed, is described. Meanwhile, as described in FIG. 2, the developing roller unit or the charging roller unit which is provided with a columnar rotating body is additionally provided in the process cartridge. Here, instead of disposing all of the end members according to the above-described embodiment and the modification example, in the photoreceptor drum, the rotation driving force can be received from the apparatus main body by employing the members in the developing roller unit or the charging roller unit. In FIG. 54, the developing roller unit 705 provided with the end member 30 is illustrated as one embodiment. In FIG. 54, a perspective view of a photoreceptor drum unit 710 which is disposed to match the developing roller unit 705 and be adjacent thereto, is also illustrated.

The developing roller unit 705 is provided with a developing roller 706, a spacer ring 707, a lid material 708, a magnetic roller (not illustrated), and the end member 30. The end member 30 is described above. In addition, known members can be employed as the other members, but for example, members having the following configuration is provided.

The developing roller 706 is a member which coats a developing layer on the outer circumferential surface of the columnar rotating body. In the embodiment, the developing roller 706 is a conductive cylinder, such as aluminum, or here, the developing roller 706 is configured to be coated with a material which configures the developing layer.

The spacer ring 707 is an annular member which is disposed to be wound on the outer circumferential surface of each of the both ends of the developing roller 706, and accordingly, a void between the developing roller 706 and the photoreceptor drum 11 is held to be constant. The thickness of the spacer ring 707 is approximately from 200 μm to 400 μm.

Similar to the above-described lid material 20, the lid material 708 is disposed on one end side of the developing roller 706, and at the one end of the developing roller unit 705, the developing roller 706 becomes a bearing for the rotation around the axis.

The magnetic roller is not illustrated in FIG. 54 since the magnetic roller is disposed on the inner side of the developing roller 706, but a plurality of magnetic poles are disposed along the axis by the roller formed of a magnetic body and the resin including a magnetic body. Accordingly, by using a magnetic force, the developer can be adsorbed to the front surface of the developing roller 706.

The end member 30 is as described above, but the end member 30 is disposed in the end portion opposite to the end portion in which the lid material 708 is disposed among the end portions of the developing roller 706. Here, an example in which the end member 30 is employed is illustrated, but not being limited thereto, any of the end members described above can also be employed.

In addition, at this time, the photoreceptor drum unit 710 can be configured as follows, for example. In other words, the photoreceptor drum unit 710 is provided with the photoreceptor drum 11, and the lid materials 20 and 730 which are bearings that rotate the photoreceptor drum 11 around the axis at each of the both ends of the photoreceptor drum 11. At this time, in one lid material 730, a gear portion 731 which meshes with the gear portion 44 of the end member 30 disposed in the developing roller unit 705 and receives the rotating force, is provided.

As described above, each end member may be a configuration member which is included in the developing roller unit, and even in this case, each end member acts similar to that when the end member is included in the photoreceptor drum unit.

The present application is based on Japanese Patent Application No. 2014-119070 filed on Jun. 9, 2014, and Japanese Patent Application No. 2014-159782 filed on Aug. 5, 2014, and the contents thereof are included here for reference.

REFERENCE SIGNS LIST

1 IMAGE FORMING APPARATUS
2 IMAGE FORMING APPARATUS MAIN BODY (APPARATUS MAIN BODY)
3 PROCESS CARTRIDGE
10 PHOTORECEPTOR DRUM UNIT
11 PHOTORECEPTOR DRUM (COLUMNAR ROTATING BODY)
20 LID MATERIAL
30 END MEMBER
40 BEARING MEMBER
50 SHAFT MEMBER
51 ROTATING SHAFT
54 ROTATING FORCE TRANSMISSION MEMBER
55 TIP END MEMBER
59 HOOK MEMBER
60 engagement hook
705 developing roller unit
706 developing roller (columnar rotating body)

The invention claimed is:

1. An end member which is disposed in an end portion of a columnar rotating body mounted on an image forming apparatus main body, the end member comprising:
a tubular bearing member; and
a shaft member held by the bearing member,
wherein the shaft member includes
a rotating shaft which is disposed in the bearing member and moves in an axial direction, and
a rotating force receiving member which is provided with an engagement hook that is disposed in one end portion of the rotating shaft, swings with respect to an axis of the rotating shaft, and is engaged with a driving shaft of the image forming apparatus main body.

2. The end member according to claim 1, further comprising:
a rotating shaft elastic member which biases the rotating shaft in the axial direction; and
a hook member elastic member which is separated from the rotating shaft elastic member and biases the engagement hook in a swing direction.

3. The end member according to claim 1, wherein the rotating force receiving member swings in all directions with respect to the axis of the rotating shaft.

4. The end member according to claim 1,
wherein the rotating force receiving member includes a tip end member disposed in one end portion of the rotating shaft, and a hook member which is held by the tip end member and is provided with the engagement hook, and
wherein the hook member swings while being held by the tip end member.

5. The end member according to claim 4, wherein the hook member is biased by an elastic member in the axial direction and swings while being held by the tip end member, with a pin passing through a hole provided in the hook member and a hole provided in the tip end member.

6. The end member according to claim 5, wherein the pin is disposed on the outside of the bearing member.

7. The end member according to claim 1,
wherein two engagement hooks which extend in one direction are formed to have a predetermined interval,
wherein each engagement hook has an opposing surface with which the two engagement hooks face each other, an outer surface opposite to the opposing surface, a first side surface which is one of two side surfaces that link the opposing surface and the outer surface, and a second side surface opposite to the first side surface, and
wherein the first side surface extends in parallel to a direction in which the axis of the rotating shaft extends, or is inclined in a direction of being separated from the second side surface toward a tip end.

8. A photoreceptor drum unit, comprising:
a photoreceptor drum; and
the end member according to claim 1 which is attached to at least one end portion in an axial direction of the photoreceptor drum,
wherein the photoreceptor drum is the columnar rotating body.

9. A developing roller unit, comprising:
a developing roller; and
the end member according to claim 1 which is attached to at least one end portion in an axial direction of the developing roller,
wherein the developing roller is the columnar rotating body.

10. A process cartridge, comprising:
a housing; and
the photoreceptor drum unit according to claim 8 which is held by the housing.

11. A process cartridge, comprising:
a housing; and
the developing roller unit according to claim 9 which is held by the housing.

12. A shaft member which is provided in an end member disposed in an end portion of a columnar rotating body, comprising:
a rotating shaft which moves in an axial direction; and
a rotating force receiving member which is provided with an engagement hook that is disposed in one end portion of the rotating shaft, swings with respect to an axis of the rotating shaft, and is engaged with a driving shaft of an image forming apparatus main body.

13. The shaft member according to claim 12, further comprising:
a rotating shaft elastic member which biases the rotating shaft in the axial direction; and a hook member elastic member which is separated from the rotating shaft elastic member and biases the engagement hook in a swing direction.

14. The shaft member according to claim 12, wherein the rotating force receiving member swings in all directions with respect to the axis of the rotating shaft.

15. The shaft member according to claim 12,
wherein the rotating force receiving member includes a tip end member disposed in one end portion of the rotating shaft, and a hook member which is held by the tip end member and is provided with the engagement hook, and
wherein the hook member swings while being held by the tip end member.

16. The shaft member according to claim 12,
wherein two engagement hooks which extend in one direction are formed to have a predetermined interval,
wherein each engagement hook has an opposing surface with which the two engagement hooks face each other, an outer surface opposite to the opposing surface, a first side surface which is one of two side surfaces that link the opposing surface and the outer surface, and a second side surface opposite to the first side surface, and
wherein the first side surface extends in parallel to a direction in which the axis of the rotating shaft extends, or is inclined in a direction of being separated from the second side surface toward a tip end.

\* \* \* \* \*